US012789385B2

(12) United States Patent
Luan et al.

(10) Patent No.: US 12,789,385 B2
(45) Date of Patent: Nov. 10, 2026

(54) AUTONOMOUS SOLAR INSTALLATION USING ARTIFICIAL INTELLIGENCE

(71) Applicant: The AES Corporation, Arlington, VA (US)

(72) Inventors: Scott T. Luan, Brighton, NY (US); Michael Jason Piper, Pittsford, NY (US); Bardh Rushiti, Rochester, NY (US); Deise Yumi Asami, Reston, VA (US); Alexander Avery, Victor, NY (US); Jacob Kiggins, Avon, NY (US); John Christopher Shelton, Vienna, VA (US)

(73) Assignee: The AES Corporation, Arlington, VA (US)

( * ) Notice: Subject to any disclaimer, the term of this patent is extended or adjusted under 35 U.S.C. 154(b) by 277 days.

(21) Appl. No.: 18/232,965

(22) Filed: Aug. 11, 2023

(65) Prior Publication Data

US 2024/0051146 A1 Feb. 15, 2024

Related U.S. Application Data

(60) Provisional application No. 63/397,125, filed on Aug. 11, 2022.

(51) Int. Cl.
*B25J 9/16* (2006.01)
*B25J 11/00* (2006.01)
(Continued)

(52) U.S. Cl.
CPC ............. *B25J 9/1697* (2013.01); *B25J 9/161* (2013.01); *B25J 9/1679* (2013.01); *B25J 9/1687* (2013.01);
(Continued)

(58) Field of Classification Search
CPC ...... B25J 9/1697; B25J 9/161; B25J 15/0052; G06N 3/0464; G06N 3/09; H02S 20/10; G06V 20/50; Y02E 10/50
See application file for complete search history.

(56) References Cited

U.S. PATENT DOCUMENTS 6,247,999 B1 6/2001 Tokiwa
8,240,109 B2 8/2012 Cusson et al.
(Continued)

FOREIGN PATENT DOCUMENTS

CA 3079669 A1 5/2019
CN 114952853 A 8/2022
(Continued)

OTHER PUBLICATIONS

International Search Report and Written Opinion issued on Dec. 13, 2021 in International Patent Application No. PCT/US2021/047849.
(Continued)

*Primary Examiner* — Wade Miles
*Assistant Examiner* — Mohammed Yousef Abuelhawa
(74) *Attorney, Agent, or Firm* — Lempia Summerfield Katz LLC

(57) ABSTRACT

A system and method for installing solar panels are provided. The method includes obtaining images of solar panels an installation structure during installation. The method also includes pre-processing the images by compensating for camera intrinsics or distortions, rectifying the images, and/or determining depth information. The method also includes detecting the solar panels by inputting the images into neural networks. The method also includes a first post-processing to compute a first panel pose based on an output of the neural networks. The method also includes generating control signals, based on the first panel pose, for operating a robotic controller for installing the solar panels. In some embodi-
(Continued)

ments, the method also includes homography transforms to obtain a second panel pose, based on the first panel pose and visual patterns or fiducials on a solar panel, and generating the control signals further based on the second panel pose.

26 Claims, 75 Drawing Sheets

(51) Int. Cl.

| | |
|---|---|
| ***G05B 19/4155*** | (2006.01) |
| ***G06N 3/0464*** | (2023.01) |
| ***G06T 5/10*** | (2006.01) |
| ***G06T 7/12*** | (2017.01) |
| ***G06T 7/194*** | (2017.01) |
| ***G06T 7/50*** | (2017.01) |
| ***G06T 7/73*** | (2017.01) |
| ***G06V 10/26*** | (2022.01) |
| ***G06V 10/44*** | (2022.01) |
| ***G06V 10/82*** | (2022.01) |
| ***G06V 20/50*** | (2022.01) |
| ***H02S 20/10*** | (2014.01) |
| ***H02S 50/00*** | (2014.01) |

(52) U.S. Cl.

CPC ......... *B25J 11/008* (2013.01); *G05B 19/4155* (2013.01); *G06N 3/0464* (2023.01); *G06T 5/10* (2013.01); *G06T 7/12* (2017.01); *G06T 7/194* (2017.01); *G06T 7/50* (2017.01); *G06T 7/73* (2017.01); *G06T 7/74* (2017.01); *G06V 10/26* (2022.01); *G06V 10/44* (2022.01); *G06V 10/82* (2022.01); *G06V 20/50* (2022.01); *H02S 20/10* (2014.12); *H02S 50/00* (2013.01); *G05B 2219/36439* (2013.01); *G06T 2207/20021* (2013.01); *G06T 2207/20061* (2013.01); *G06T 2207/20084* (2013.01); *G06T 2207/30184* (2013.01)

(56) References Cited

U.S. PATENT DOCUMENTS

| | | | | |
|---|---|---|---|---|
| 8,590,223 | B2 | 11/2013 | Kilgore et al. | |
| 8,657,991 | B2 | 2/2014 | Potter et al. | |
| 8,813,460 | B2 | 8/2014 | Cinnamon et al. | |
| 9,136,411 | B2 | 9/2015 | Jolley | |
| 9,362,442 | B2 | 6/2016 | Kacandes | |
| 9,473,066 | B2 | 10/2016 | Stephan et al. | |
| 9,625,180 | B2 | 4/2017 | King | |
| 9,647,433 | B2 | 5/2017 | Meine et al. | |
| 9,660,570 | B2 | 5/2017 | Stephan et al. | |
| 9,831,817 | B2 | 11/2017 | Rothschild | |
| 10,011,022 | B1 | 7/2018 | Lin et al. | |
| 10,088,201 | B2 | 10/2018 | Stephan et al. | |
| 10,157,452 | B1 * | 12/2018 | Tighe | G06T 5/80 |
| 10,461,682 | B2 | 10/2019 | Schuit et al. | |
| 10,769,318 | B2 | 9/2020 | Wachman et al. | |
| 10,801,755 | B1 | 10/2020 | Nemat et al. | |
| 10,845,093 | B2 | 11/2020 | Stephan et al. | |
| 11,012,023 | B2 | 5/2021 | Stearns et al. | |
| 11,410,362 | B1 | 8/2022 | Soltani et al. | |
| 11,919,149 | B2 | 3/2024 | Zhou et al. | |
| 11,951,617 | B2 | 4/2024 | Zhou et al. | |
| 11,964,860 | B2 | 4/2024 | Bailey | |
| 12,184,231 | B2 | 12/2024 | Shelton et al. | |
| 12,334,868 | B2 | 6/2025 | Shelton et al. | |
| 12,466,066 | B2 | 11/2025 | Smith | |
| 2008/0096291 | A1 | 4/2008 | Takai et al. | |
| 2009/0185241 | A1 | 7/2009 | Nepomniachtchi | |
| 2010/0012819 | A1 | 1/2010 | Graham | |
| 2010/0314843 | A1 | 12/2010 | Beck | |
| 2011/0000520 | A1 | 1/2011 | West | |
| 2011/0240740 | A1 | 10/2011 | Li et al. | |
| 2011/0284057 | A1 | 11/2011 | Swahn et al. | |
| 2012/0027550 | A1 | 2/2012 | Bellacicco et al. | |
| 2012/0152877 | A1 * | 6/2012 | Tadayon | F24S 25/10 901/30 |
| 2012/0199266 | A1 | 8/2012 | Potter et al. | |
| 2012/0325761 | A1 | 12/2012 | Kübsch et al. | |
| 2013/0108409 | A1 | 5/2013 | Wu et al. | |
| 2013/0133172 | A1 | 5/2013 | Kiener et al. | |
| 2013/0146123 | A1 | 6/2013 | Park | |
| 2013/0272833 | A1 | 10/2013 | Hendrix et al. | |
| 2013/0334151 | A1 | 12/2013 | Kanczuzewski et al. | |
| 2014/0246257 | A1 | 9/2014 | Jacobsen et al. | |
| 2015/0059158 | A1 | 3/2015 | Kacandes | |
| 2015/0059827 | A1 | 3/2015 | Reed et al. | |
| 2015/0214085 | A1 | 7/2015 | Jin et al. | |
| 2016/0087578 | A1 | 3/2016 | Cinnamon et al. | |
| 2016/0368135 | A1 | 12/2016 | Tadayon | |
| 2017/0106534 | A1 | 4/2017 | Nakamoto et al. | |
| 2017/0366132 | A1 * | 12/2017 | Meine | F24S 25/61 |
| 2018/0204111 | A1 | 7/2018 | Zadeh et al. | |
| 2018/0241343 | A1 | 8/2018 | Jiang et al. | |
| 2018/0253622 | A1 | 9/2018 | Chen et al. | |
| 2018/0331654 | A1 * | 11/2018 | Gostein | G01N 21/9501 |
| 2019/0134822 | A1 | 5/2019 | Clemenzi et al. | |
| 2019/0156210 | A1 | 5/2019 | He et al. | |
| 2019/0308825 | A1 | 10/2019 | Ge et al. | |
| 2020/0086504 | A1 | 3/2020 | Caron L'ecuyer et al. | |
| 2020/0184278 | A1 | 6/2020 | Zadeh et al. | |
| 2020/0198131 | A1 | 6/2020 | Tachi et al. | |
| 2020/0244211 | A1 | 7/2020 | Kim et al. | |
| 2020/0336099 | A1 | 10/2020 | DeBartolo, III et al. | |
| 2020/0350850 | A1 * | 11/2020 | Di Stefano | H02S 20/23 |
| 2020/0358395 | A1 | 11/2020 | Ke et al. | |
| 2021/0039264 | A1 | 2/2021 | Ishizuka et al. | |
| 2021/0049780 | A1 | 2/2021 | Westmacot et al. | |
| 2021/0078265 | A1 | 3/2021 | Miller | |
| 2021/0111665 | A1 | 4/2021 | Van De Sande | |
| 2021/0205997 | A1 | 7/2021 | Zhou et al. | |
| 2021/0206003 | A1 | 7/2021 | Zhou et al. | |
| 2021/0211096 | A1 | 7/2021 | Clemenzi et al. | |
| 2021/0214908 | A1 * | 7/2021 | West | E02D 5/28 |
| 2021/0216766 | A1 | 7/2021 | Luo et al. | |
| 2021/0264141 | A1 | 8/2021 | Chojnacki | |
| 2021/0337734 | A1 | 11/2021 | Jeanty et al. | |
| 2021/0379757 | A1 * | 12/2021 | Schneider | G05D 1/0293 |
| 2021/0386482 | A1 | 12/2021 | Gera et al. | |
| 2022/0069770 | A1 | 3/2022 | Shelton et al. | |
| 2022/0072712 | A1 | 3/2022 | Tang et al. | |
| 2022/0121884 | A1 | 4/2022 | Zadeh et al. | |
| 2022/0164983 | A1 | 5/2022 | Rousseau | |
| 2022/0411245 | A1 | 12/2022 | Bailey | |
| 2023/0005115 | A1 * | 1/2023 | Bedrich | B64D 47/08 |
| 2023/0015330 | A1 | 1/2023 | Schuknecht et al. | |
| 2023/0094619 | A1 | 3/2023 | Shelton et al. | |
| 2023/0238919 | A1 | 7/2023 | Kunz et al. | |
| 2024/0051145 | A1 | 2/2024 | Asami et al. | |
| 2024/0051146 | A1 | 2/2024 | Luan et al. | |
| 2024/0051152 | A1 | 2/2024 | Tadepalli et al. | |
| 2024/0189978 | A1 | 6/2024 | Asmari et al. | |
| 2024/0228195 | A1 | 7/2024 | Smith | |
| 2024/0238989 | A1 | 7/2024 | Asmari et al. | |
| 2025/0054183 | A1 | 2/2025 | Murcott et al. | |

FOREIGN PATENT DOCUMENTS

| | | | |
|---|---|---|---|
| CN | 115709373 | A | 2/2023 |
| CN | 218771921 | U | 3/2023 |
| CN | 218771936 | U | 3/2023 |
| CN | 116276979 | A | 6/2023 |
| CN | 116442285 | A | 7/2023 |
| CN | 116448094 | A | 7/2023 |
| CN | 116449876 | A | 7/2023 |
| CN | 116645413 | A | 8/2023 |
| CN | 116719315 | A | 9/2023 |
| CN | 116833190 | A | 10/2023 |
| CN | 116840869 | A | 10/2023 |
| CN | 116843713 | A | 10/2023 |
| CN | 219791691 | U | 10/2023 |

(56) References Cited

FOREIGN PATENT DOCUMENTS

| | | | |
|---|---|---|---|
| CN | 219834050 | U | 10/2023 |
| CN | 117011387 | A | 11/2023 |
| CN | 220145954 | U | 12/2023 |
| CN | 116276979 | B | 1/2026 |
| FR | 3094159 | B1 | 11/2021 |
| WO | 2010145844 | A2 | 12/2010 |
| WO | 2012167130 | A2 | 12/2012 |
| WO | 2014108196 | A1 | 7/2014 |
| WO | 2019097348 | A1 | 5/2019 |
| WO | 2020188077 | A1 | 9/2020 |
| WO | 2021132829 | A1 | 7/2021 |

OTHER PUBLICATIONS

HyperTracker [Online]. Ita Scuola Politecnica, Nov. 2020 [retrieved on Mar. 28, 2022]. Retrieved from the Internet: <URL: https://www.asp-poli.it/projects/hypertracker/>.

International Search Report and Written Opinion issued on Mar. 22, 2023 in International Patent Application No. PCT/US2022/051899.

Horschel, "Automatic Solar Installation" Oct. 25, 2012 (Oct. 25, 2012) entire YouTube video, in particular screenshots pp. 1-4 <retrieved from the internet: https://youtu.be/ebLam_3_Vko>.

Spencer, et al., "The monocular depth estimation challenge, in Proceedings of the IEEE/CVF Winter Conference on Applications of Computer Vision" (pp. 623-632) (2023).

Hirschmuller, "Stereo Processing by Semiglobal Matching and Mutual Information, in IEEE Transactions on Pattern Analysis and Machine Intelligence", vol. 30, No. 2, pp. 328-341, Feb. 2008, doi: 10.1109/TPAMI.2007.1166.

Patil et al., "A Comparative Evaluation of SGM Variants (including a New Variant, tMGM) for Dense Stereo Matching", ArXiv, abs/1911.09800 (2019).

O'Mahony et al., "Deep learning vs. traditional computer vision, in Advances in Computer Vision: Proceedings of the 2019 Computer Vision Conference (CVC)", Springer Nature Switzerland AG, vol. 11 (pp. 128-144) (2020).

International Search Report and Written Opinion issued on Nov. 17, 2023 in International Patent Application No. PCT/US2023/030048.

International Search Report and Written Opinion issued on Jan. 26, 2024 in International Patent Application No. PCT/US2023/030050.

Saurav, Kumar, and Seul Jung. "Robust detection of the coordinate of a solar panel using deep learning algorithm." 2019 19th international conference on control, automation and systems (ICCAS). (pp. 1116-1119) IEEE, 2019.

Belova, Irina A., Miroslav V. Martinovich, and Vladimir A. Skolota. "Application of photovoltaic cells with an intelligent control system for railway transport." 2016 13th International Scientific-Technical Conference on Actual Problems of Electronics Instrument Engineering (APEIE). vol. 3. IEEE, 2016.

Kramer, Evan L., William E. Parker, and Rebecca A. Masterson. "Vision-based spacecraft relative pose estimation in variable lighting conditions." 2022 IEEE Aerospace Conference (AERO). IEEE, 2022.

Lukas Bommes, Claudia Buerhop-Lutz, Tobias Pickel, Jens Hauch, Christoph Brabec, Ian Marius Peters, Georeferencing of Photovoltaic Modules from Aerial Infrared Videos using Structure-from-Motion (Year: 2022).

T. Janthori, B. Lertpornsuksawat and T. Sapsaman, "Automatic Data Collection for Ariel Thermographic Inspections of Photovoltaic Modules," 2022 Research, Invention, and Innovation Congress: Innovative Electricals and Electronics (RI2C), Bangkok, Thailand, 2022, pp. 278-283 (Year: 2022).

Tani, Eiichiro, et al. "Development of the tightening nut task skill using a power distribution line maintenance experimental robot." 2015 IEEE/SICE International Symposium on System Integration (SII). IEEE, 2015 (pp. 558-563).

Vlaminck, Michiel, et al. "Region-based CNN for anomaly detection in PV power plants using aerial imagery." Sensors 22.3 (2022): 1244.

Non-Final Rejection mailed in application No. U.S. Appl. No. 18/229,693 mailed on Mar. 23, 2026 (50 pages).

Li, Xiaoxia, et al. "Deep learning based module defect analysis for large-scale photovoltaic farms." IEEE Transactions 1 on Energy Conversion 34.1 (2018): 520-529.

* cited by examiner

3526

4502

4500

Laser Line Generation: Vertical (Tube) and Horizontal (Clamp)

Camera Uses Leser Lines to Locate Tube and Clamp, and Uses Ring Light (Below) to Locate Nut.

FIG. 56
5600
5602
5604
5606
5608
Range
Signal
Near-IR
Reflectivity

6200

AUTONOMOUS SOLAR INSTALLATION USING ARTIFICIAL INTELLIGENCE

RELATED APPLICATION DATA

This application is based on and claims priority under 35 U.S.C. § 119 to U.S. Provisional Application No. 63/397,125, filed Aug. 11, 2022, the entire contents of which is incorporated herein by reference.

BACKGROUND

Field of the Invention

The present disclosure generally relates to a solar panel handling system, and more particularly, to a system and method for installation of solar panels on installation structures.

Discussion of the Related Art

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Installation of a photovoltaic array typically involves affixing solar panels to an installation structure. This underlying support provides attachment points for the individual solar panels, as well as assists with routing of electrical systems and, when applicable, any mechanical components. Because of the fragile nature and large dimensions of solar panels the process of affixing solar panels to an installation structure poses unique challenges. For example, in many instances the solar panels of a photovoltaic array are installed on a rotatable structure which can rotate the solar panels about an axis to enable the array to track the sun. In such instances, it is difficult to ensure that all of the solar panels in an array are coplanar and leveled relative to the axis of the rotatable structure. Additionally, the installation costs for photovoltaic array can be a considerable portion of the total build cost for the photovoltaic array. Thus, there is a need for a more efficient and reliable solar panel handling system for installing solar panels in photovoltaic array. Conventional computer vision techniques may be used when the environment is ideal. However, glare, over- or under-exposure can negatively affect object detection algorithms.

SUMMARY

Accordingly, the present invention is directed to a solar panel handling system that substantially obviates one or more of the problems due to limitations and disadvantages of the related art.

The solar panel handling system disclosed herein facilitates the installation of solar panels of a photovoltaic array on a pre-existing installation structure such as, for example, a torque tube. Installing solar panels can be made more efficient and reliable by combining tooling for handling the solar panel with components that enable mating of the solar panel to the solar panel support structure. Some embodiments use machine learning techniques to overcome environmental inconsistencies. The system can learn from examples with glare and illumination issues, and can generalize to new data during inference.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a system for installing a solar panel may comprise an end of arm assembly tool comprising a frame and suction cups coupled to the frame, and a linear guide assembly coupled to the end of arm assembly tool, wherein the linear guide assembly includes: a linearly moveable clamping tool including an engagement member configured to engage a clamp assembly slidably coupled to an installation structure, a force torque transducer configured to move the clamping tool along the installation structure, and a junction box coupled to the frame and including a controller configured to control the force torque transducer and the suction cups, and a power supply.

In another aspect, a method of installing a solar panel may comprise engaging an end of arm assembly tool with a solar panel, the end of arm assembly tool comprising a frame and suction cups coupled to the frame, positioning the solar panel relative to an installation structure having a clamp assembly slidably coupled thereto, engaging a linear guide assembly coupled to the end of arm assembly tool with the clamp assembly, the linear guide assembly comprising a linearly moveable clamping tool including an engagement member configured to engage the clamp assembly and a force torque transducer configured to move the clamping tool along the installation structure, and actuating the force torque transducer to move the clamp assembly along the installation structure so as to engage with a side of the solar panel, thereby fixing the solar panel relative to the installation structure.

In another aspect, a method of training a neural network for autonomous solar installation, according to some embodiments. The method includes obtaining one or more images during installation. The one or more images includes an image of one or more solar panels and an installation structure. The method also includes pre-processing the one or more images including one or more of compensating for camera intrinsics or distortions, rectifying the images, and determining depth information. The method also includes detecting the one or more solar panels by inputting the one or more images into one or more neural networks that are trained to detect solar panels. The method also includes a first post-processing to compute a first panel pose based on an output of the one or more neural networks. The method also includes generating control signals, based on the first panel pose, for operating a robotic controller for installing the one or more solar panels. In some embodiments, the method also includes a second post-processing including one or more homography transforms to obtain a second panel pose for the one or more solar panels, based on the first panel pose. The second post-processing compensates or corrects for inaccuracies in the first panel pose based on visual patterns or fiducials on a solar panel. The control signals for operating the robotic controller for installing the one or more solar panels is further based on the second panel pose.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated herein and form part of the specification, illustrate the present invention and, together with the description, further serve to explain principles of the invention and to enable a person skilled in the relevant arts to make and use the invention. The exemplary embodiments are best understood from the following detailed description when read in conjunction with the accompanying drawings. It is emphasized that, according to common practice, the various features of the drawings are not to scale. On the contrary, the dimensions of the various features are arbitrarily expanded or reduced for clarity. Included in the drawings are the following figures.

Figure 1:
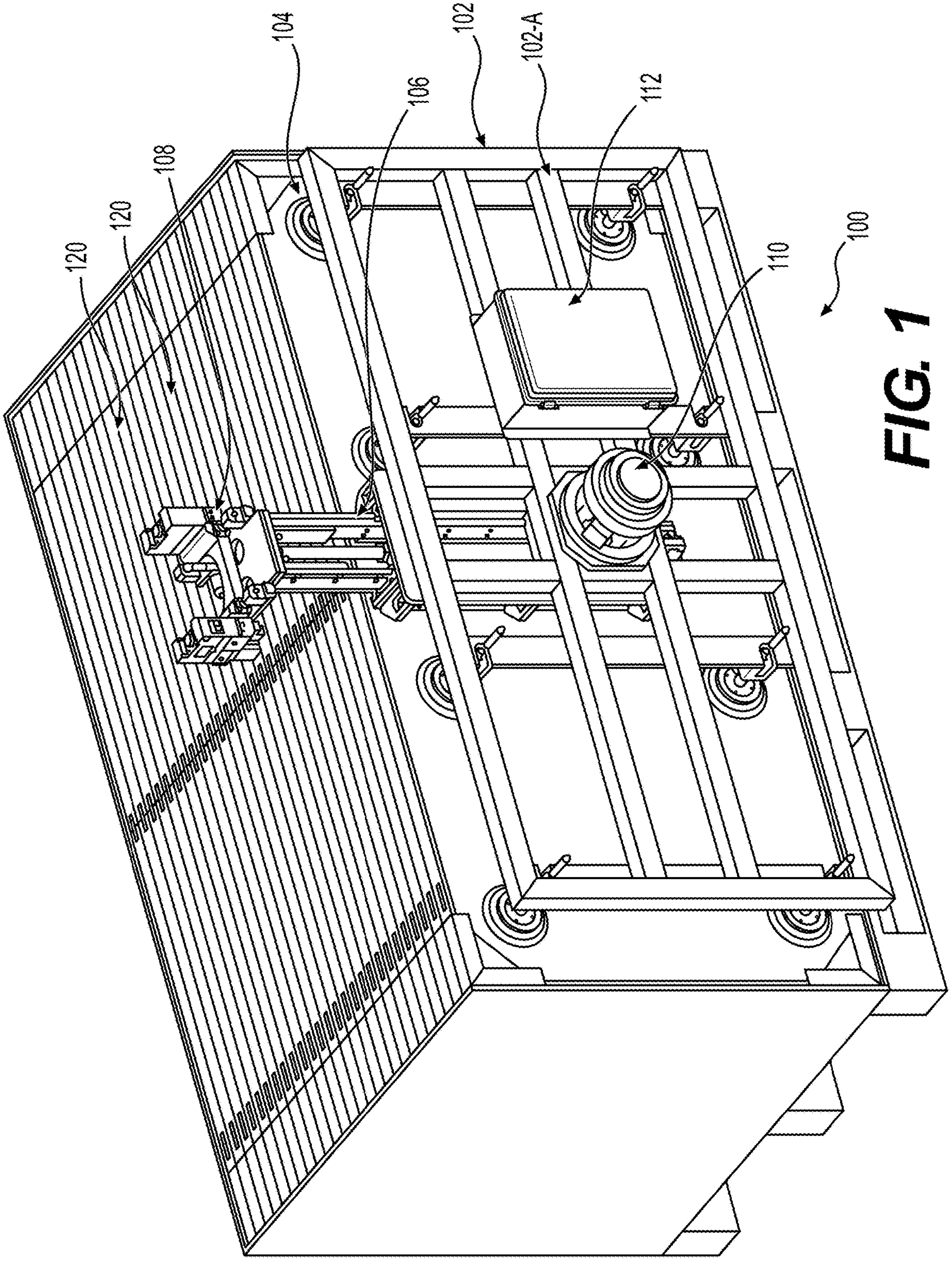
FIG. 1 shows a perspective view of a solar panel handling system along with a container of solar panels, in accordance with an embodiment of the present disclosure.
Figure 2A:
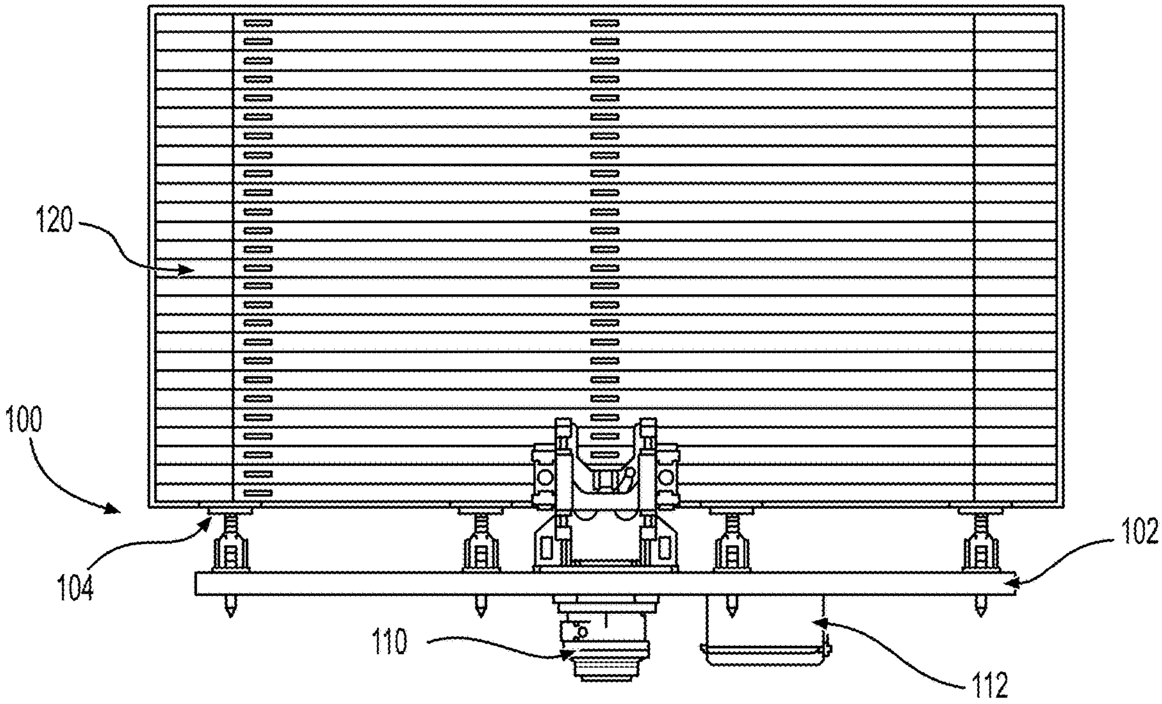
FIG. 2A-2C show a top, front, and side view, respectively, of the solar panel handling system and container of solar panels of FIG. 1.
Figure 2B:
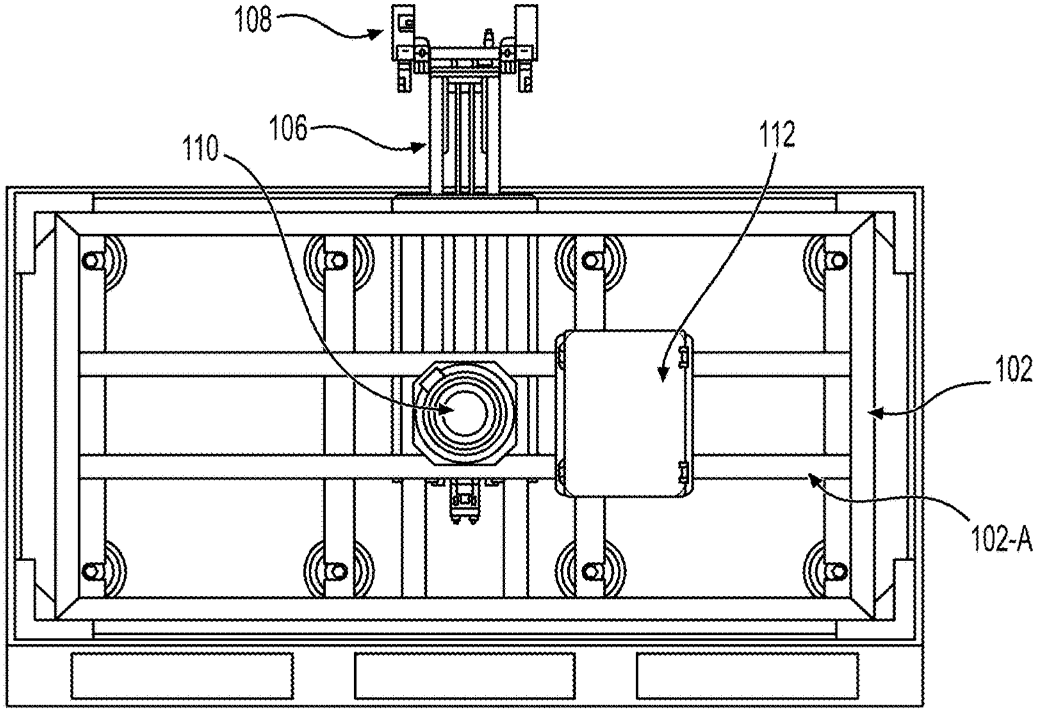
Figure 2C:
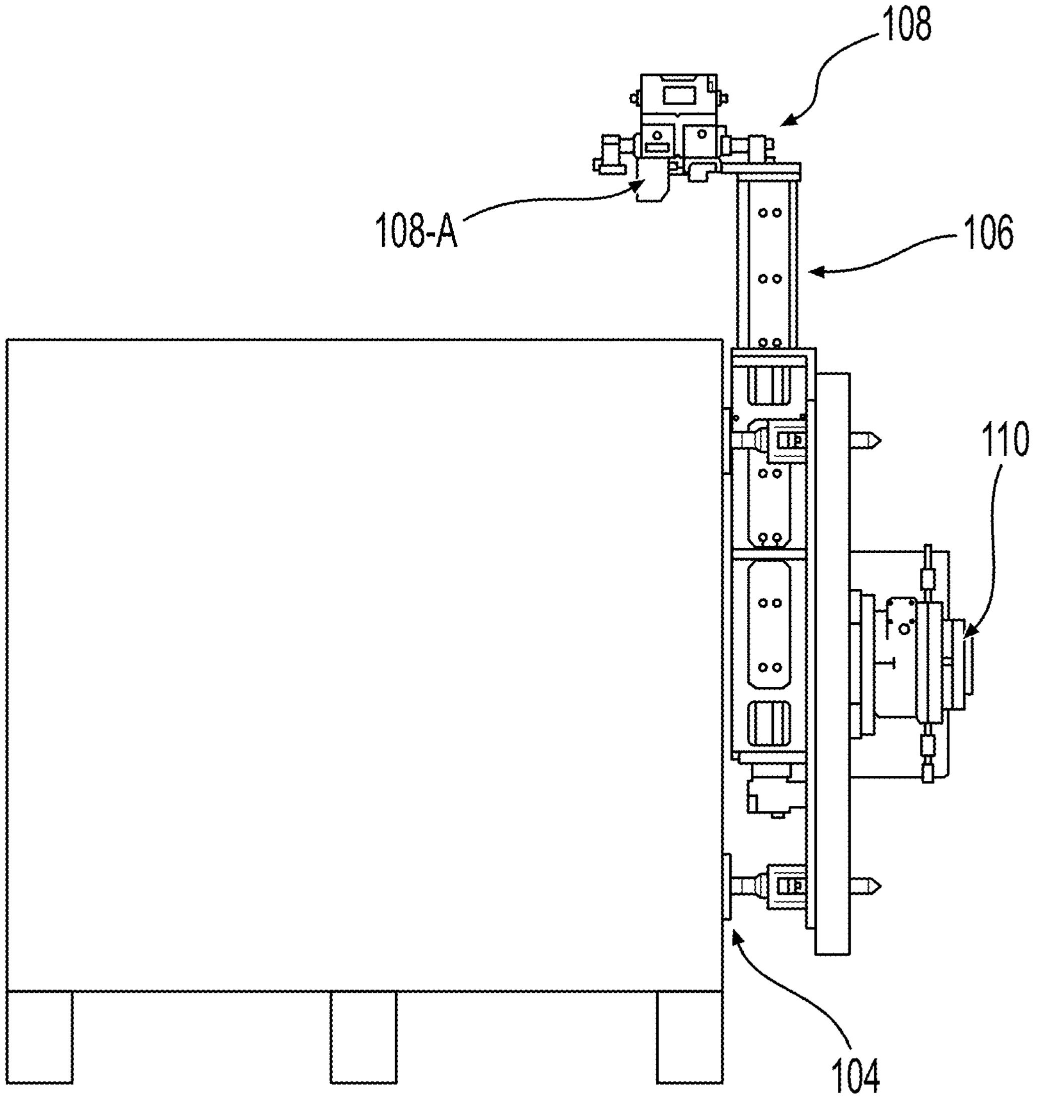
Figure 3A:
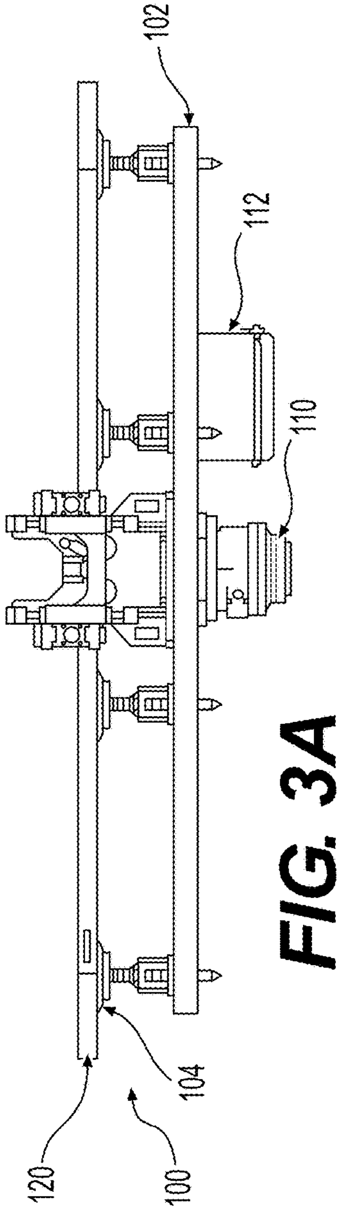
FIGS. 3A-3C shows a top (FIG. 3A), front (FIG. 3C), and side view (FIG. 3B) of the solar panel handling system coupled to a single solar panel, in accordance with an embodiment of the present disclosure.
Figure 3C:
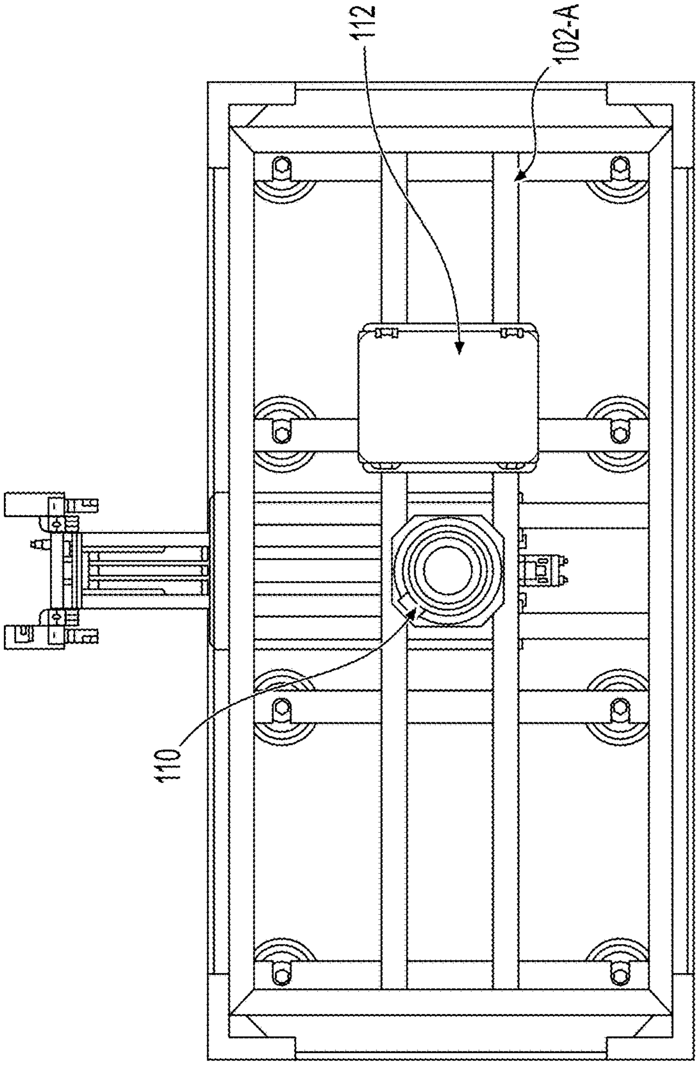
Figure 3B:
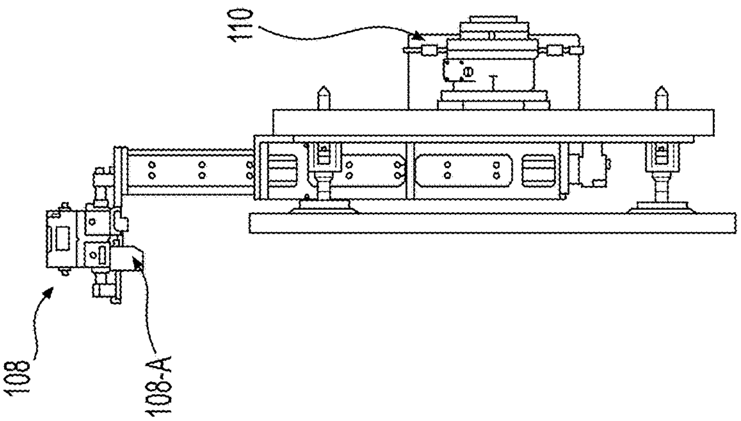
Figure 4A:
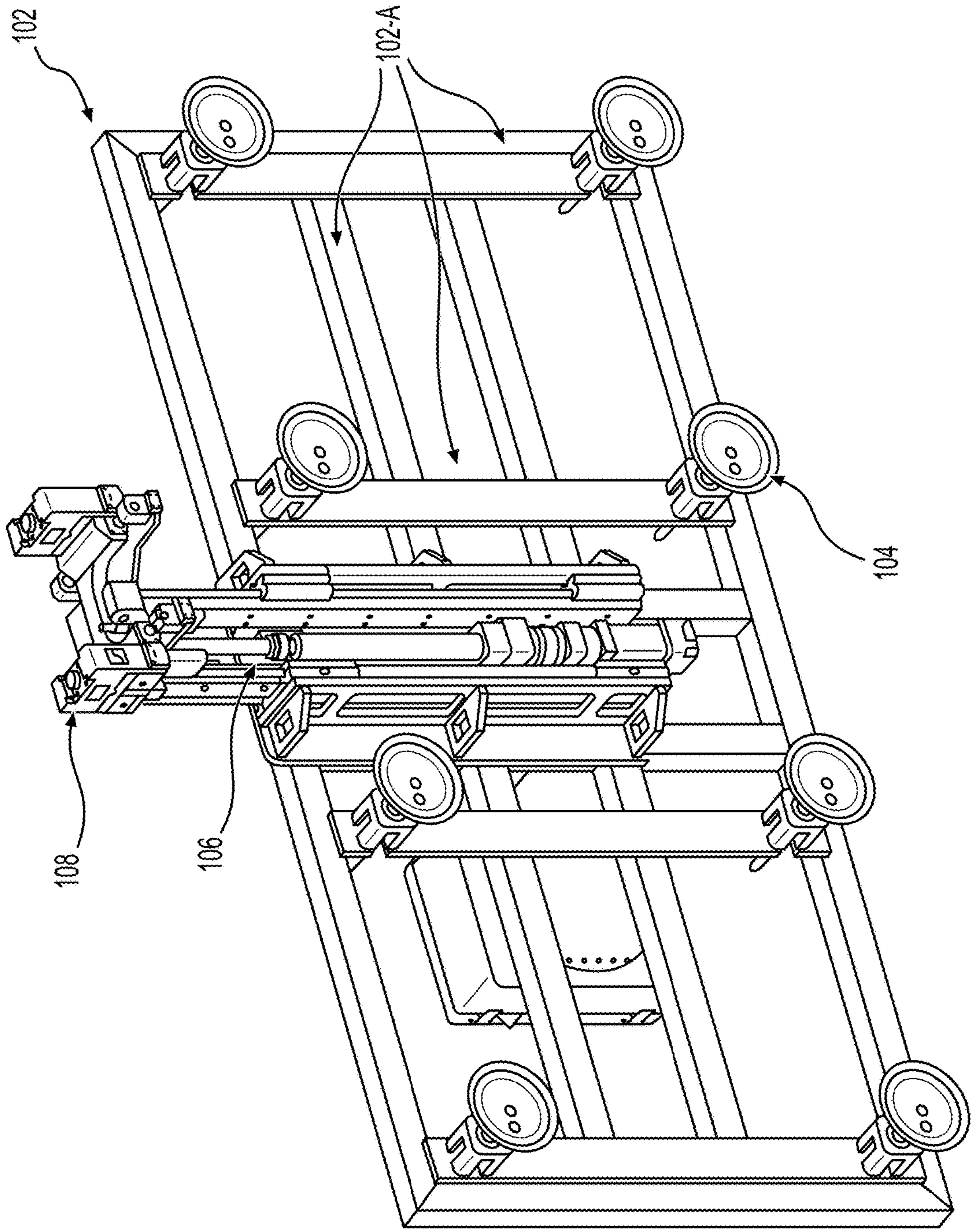
FIGS. 4A and 4B show perspective views of the solar panel handling system, in accordance with an embodiment of the present disclosure.
Figure 4B:
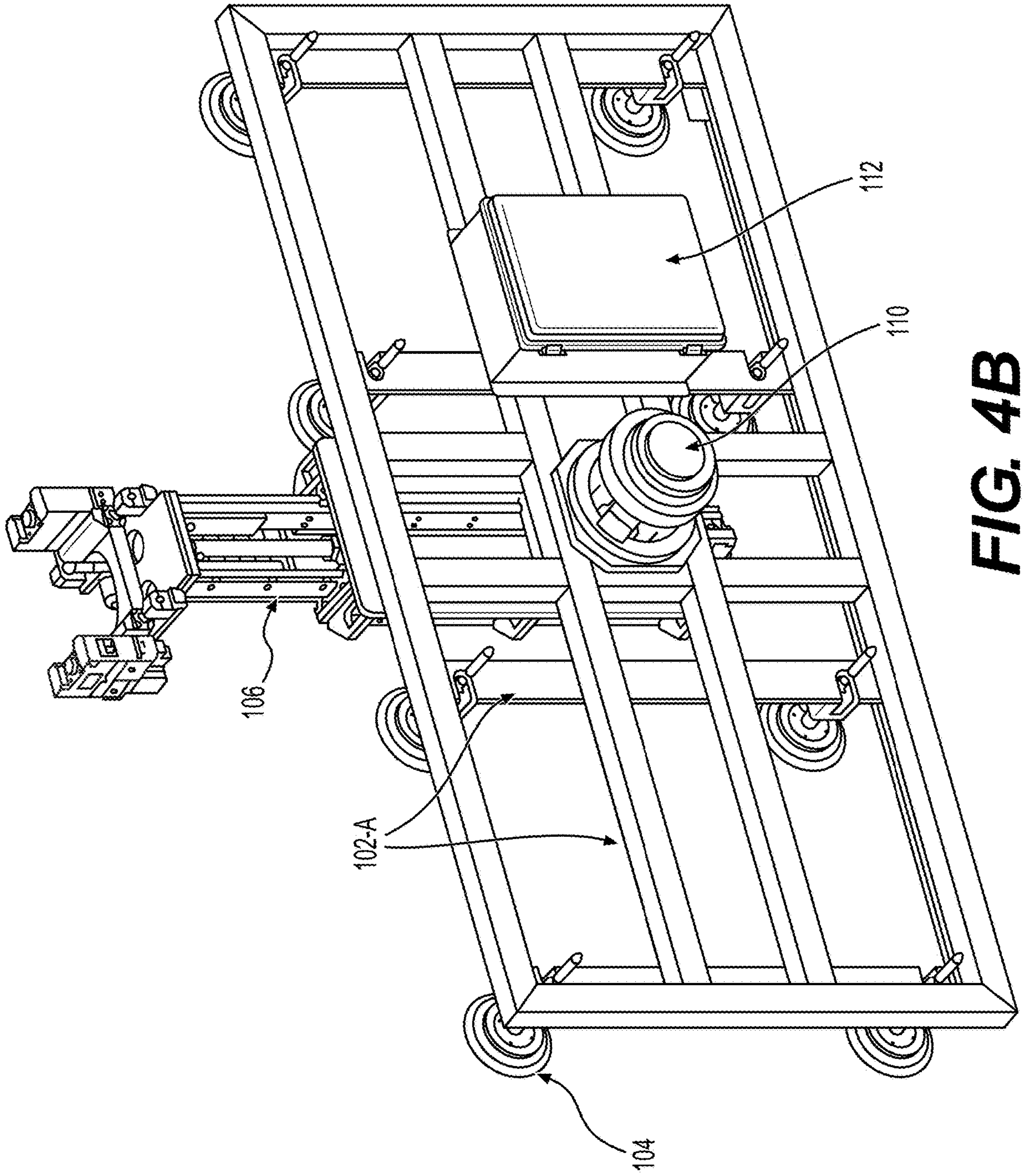
Figure 5A:
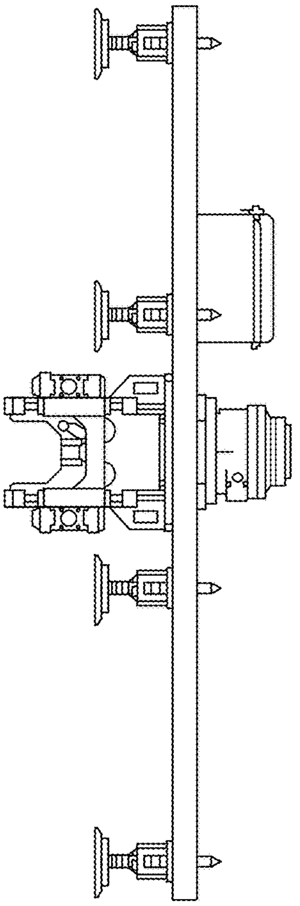
FIGS. 5A and 5B show a top view and a front view, respectively, of a solar panel handling system, in accordance with an embodiment of the present disclosure.
Figure 5B:
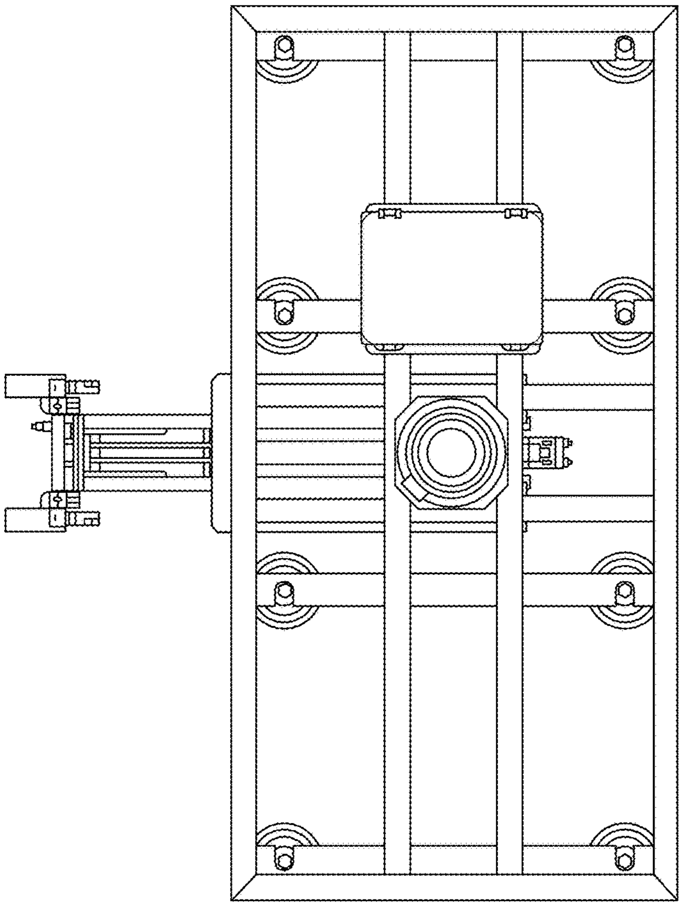
Figure 5D:
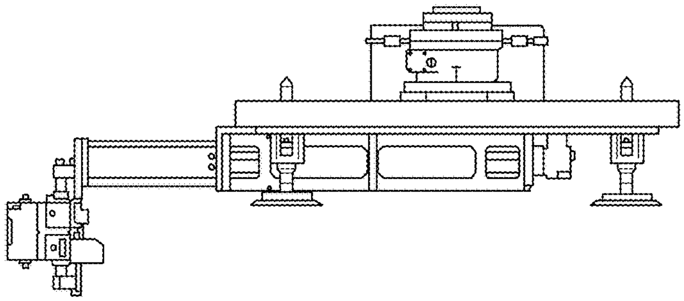
FIG. 5D shows a side view with a clamping tool in an extended or advanced position, in accordance with an embodiment of the present disclosure.
Figure 5C:
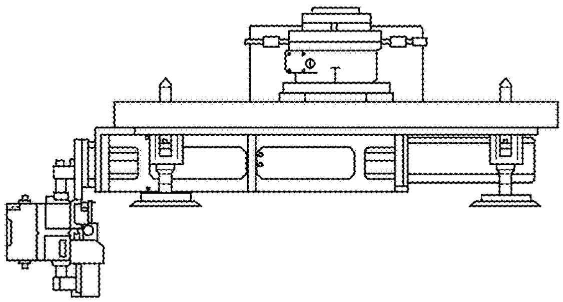
FIG. 5C shows a side view with a clamping tool of the solar panel handling system in a retracted position, in accordance with an embodiment of the present disclosure.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Reference will now be made in detail to embodiments of the present invention, examples of which are illustrated in the accompanying drawings.

FIG. 1 shows a perspective view of a solar panel handling system along with a box of solar panels, in accordance with an embodiment of the present disclosure. The solar panel handling system may include an end of arm assembly tool 100 which can couple to individual solar panels 120 from a box of solar panels and move them to a position relative to an installation structure for installation.

The end of arm assembly tool 100 may include a frame 102 and one or more attachment devices 104 coupled to the frame 102. Example attachment devices 104 include suction cups or other structures that can be releasably attached to the surface of the solar panel 120 and, at least in the aggregate, maintain attachment during manipulation of the solar panel 120 by the end of arm assembly tool 100. The frame 102 may consist of several trusses 102-A for providing structural strength and stability to the frame 102. The frame 102 also functions as a base for the end of arm assembly tool 100 and other related components of the solar panel handling system disclosed herein.

Other related components of the solar panel handling system disclosed herein may be coupled to the frame 102 so as to fix a relative position of the components on the end of arm assembly tool 100. One or more of the various components of the solar panel handling system may be coupled to one or more of the trusses 102-A so as to fix a relative position of the components on the end of arm assembly tool 100.

The attachment devices 104 are configured to reliably attach to a planar surface such, as for example, a surface of a solar panel, such as by using vacuum. In a suction cup embodiment, the suction cups can be actuated by pushing the cup against the planar surface, thereby pushing out the air from the cup and creating a vacuum seal with the planar surface. As a consequence, the planar surface adheres to the suction cup with an adhesion strength that is dependent on the size of the suction cup and the integrity of the seal with the planar surface. In some embodiments, the suction cups engage with the solar panel to create an air-tight seal, and then a vacuum pump sucks the air out of the suction cups, generating the vacuum required for the proper adhesion to the solar panel. In some embodiments, an air inlet (not shown) provides air onto the planar surface when the planar surface is sealed to the suction cup so as to deactivate the vacuum and release the planar surface from the suction cup.

The system may further include a linear guide assembly 106 coupled to the end of arm assembly tool 100. The linear guide assembly 106 includes a linearly movable clamping tool 108 with an engagement member 108-A configured to engage a clamp assembly coupled to an installation structure. The linear guide assembly 106 can be actuated to move the clamping tool 108 along an axis between, for example, an extended position and a retracted position. The axis of movement of the clamping tool 108 may be parallel to an axis of the installation structure. Thus, the linear guide assembly 106 can move the clamping tool 108 and the engagement member 108-A along the installation structure.

Figure 6B:
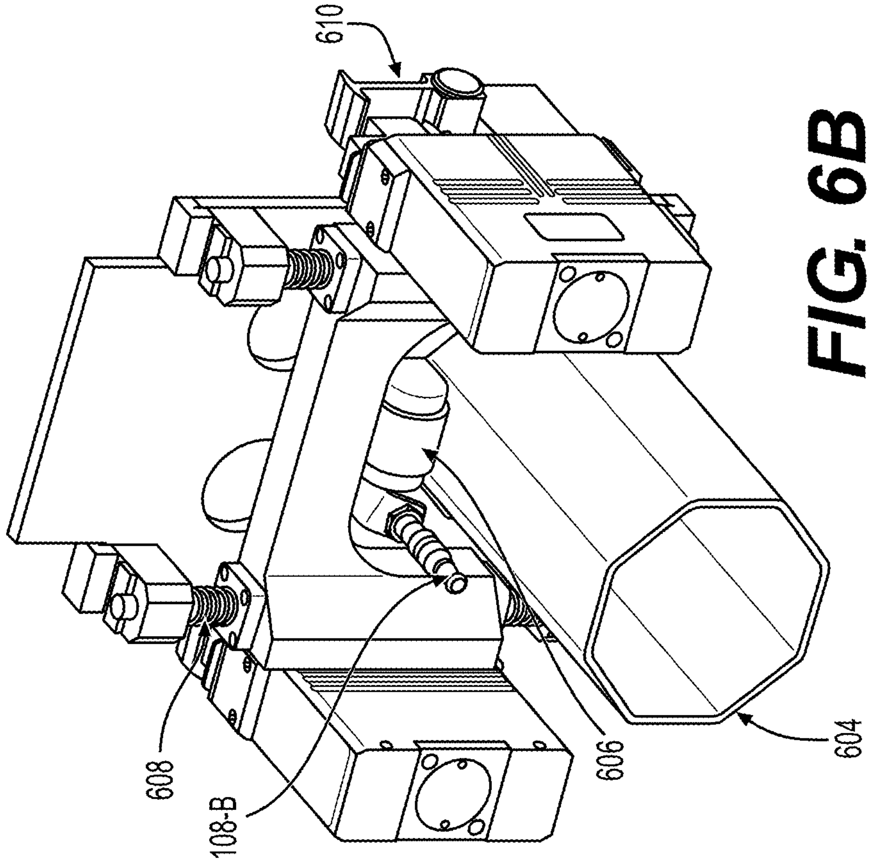
FIGS. 6A and 6B show perspective views of the clamping tool of a solar panel handling system in engagement with a clamp assembly coupled to an installation structure, in accordance with an embodiment of the present disclosure.
Figure 6A:
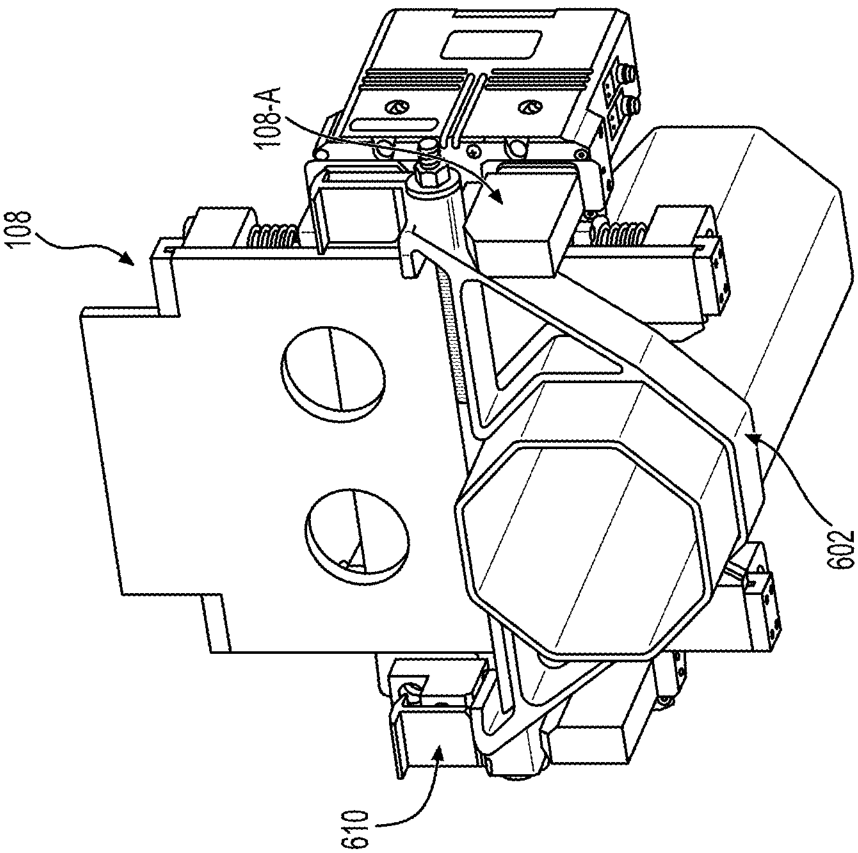
Figure 7A:
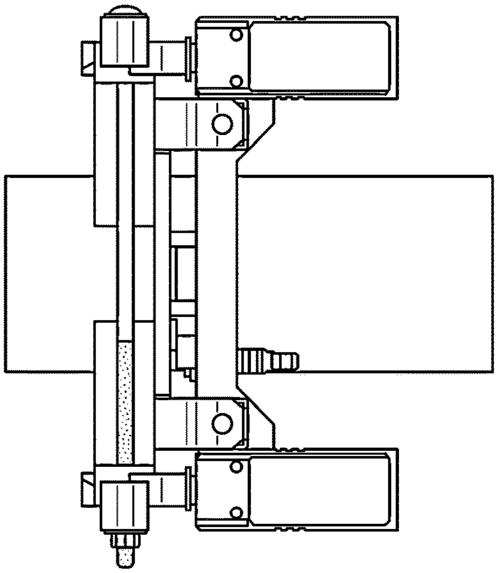
FIG. 7A shows a top view of the clamping tool of the solar panel handling system in engagement with a clamp assembly coupled to an installation structure, in accordance with an embodiment of the present disclosure.
Figure 7B:
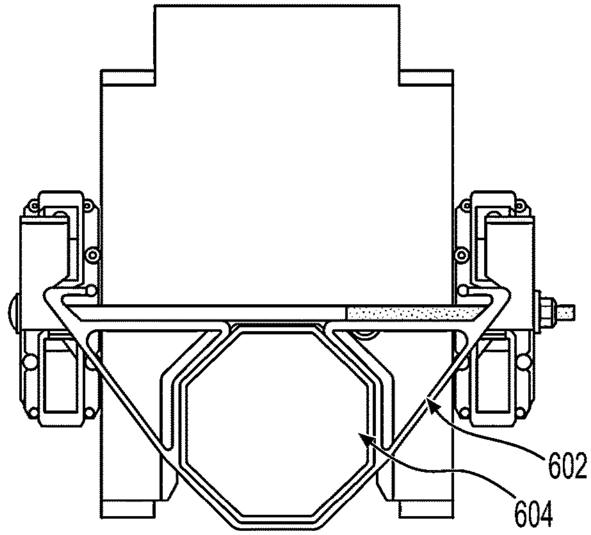
FIG. 7B shows a front view of the clamping tool of the solar panel handling system in engagement with a clamp assembly coupled to an installation structure, in accordance with an embodiment of the present disclosure.
Figure 7C:
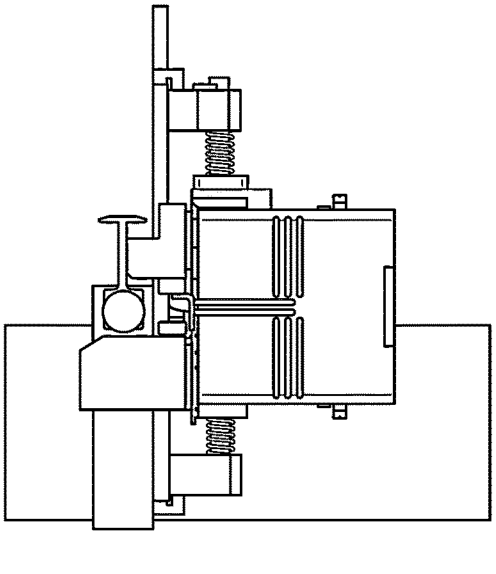
FIG. 7C shows a side view of the clamping tool of the solar panel handling system in engagement with a clamp assembly coupled to an installation structure, in accordance with an embodiment of the present disclosure.
Figure 7D:
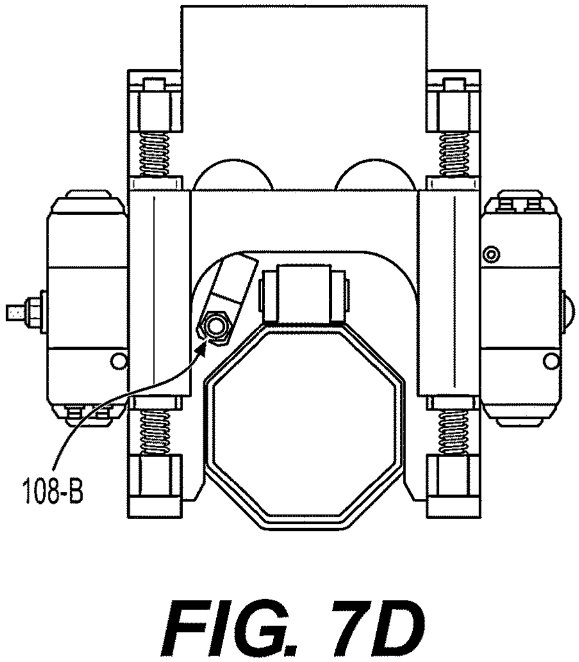
FIG. 7D shows a back view of the clamping tool of the solar panel handling system in engagement with a clamp assembly coupled to an installation structure, in accordance with an embodiment of the present disclosure.

In some embodiments, the engagement member 108-A may include electromagnets which may be actuated to grasp a clamp assembly 602 (see FIG. 6A, 6B). Alternatively, or additionally, the engagement member 108-A may include a gripper to prevent disengagement between the clamp assembly 602 and the engagement member 108-A when the linear guide assembly 106 is actuated to move the clamping tool relative to the installation structure as described in more detail elsewhere herein.

The linear guide assembly 106 is actuated using a force torque transducer 110. In some embodiments, the linear guide assembly 106 and the force torque transducer 110 may form a rack and pinion structure such that the rotation of the force torque transducer 110 results in advancement or retraction of the clamping tool 108. In some embodiments, the linear guide assembly 106 may be a hydraulic assembly including a telescoping shaft coupled to the clamping tool 108. In such embodiments, the force torque transducer 110 may be configured in the form of a pump for pumping a hydraulic fluid. In other embodiments, the force torque transducer 110 may be configured in the form of or coupled to a liner drive motor that engages a surface of the telescoping shaft coupled to the clamping tool 108.

In some embodiments, the linear guide assembly 106 may include an electric rod actuator to move the clamping tool 108 parallel to an axis of the installation structure.

In some embodiments, the guide assembly 106 may include a roller 606 to facilitate the movement of the clamping tool 108 along the installation structure 604. The roller may, for example, include a bearing or other components designed for reducing friction while the clamping tool 108 moves relative to the installation structure. The roller may be coupled with a sensor, such as by a force sensor or rotation sensor, to provide feedback to a controller.

In some embodiments, the guide assemble may include a spring mechanism 608 that enables small amounts of tilting (up to 15 degrees of tilt) of the clamping tool 108 relative to the installation structure 604. Such tilting may occur when the orientation assembly 804 tilts the end of arm assembly tool 100 relative to the installation structure 604 in order to appropriately level the solar panel.

The system may further include a junction box 112 coupled to the frame 102. The junction box 112 may include a controller configured to control the force torque transducer 110 and the attachment devices 104. In some embodiments, the junction box 112 may also include a power supply or a power controller for controlling the power supply to various components.

In some embodiments, the controller 112 may include a processor operationally coupled to a memory. The controller 112 may receive inputs from sensors associated with the solar panel handling system (e.g., an optical sensor or a proximity sensor 108-B described elsewhere herein). The controller 112 may then process the received signals and output a control command for controlling one or more components (e.g., the linear guide assembly 106, the clamping tool 108, or the attachment devices 104). For example, in some embodiments, the controller 112 may receive a signal from a proximity sensor determining that the clamp assembly is approaching a trailing edge of a solar panel being installed and accordingly reduce the speed of the linear guide assembly 106 to reduce excessive forces and impacts on the solar panel.

Figure 8:
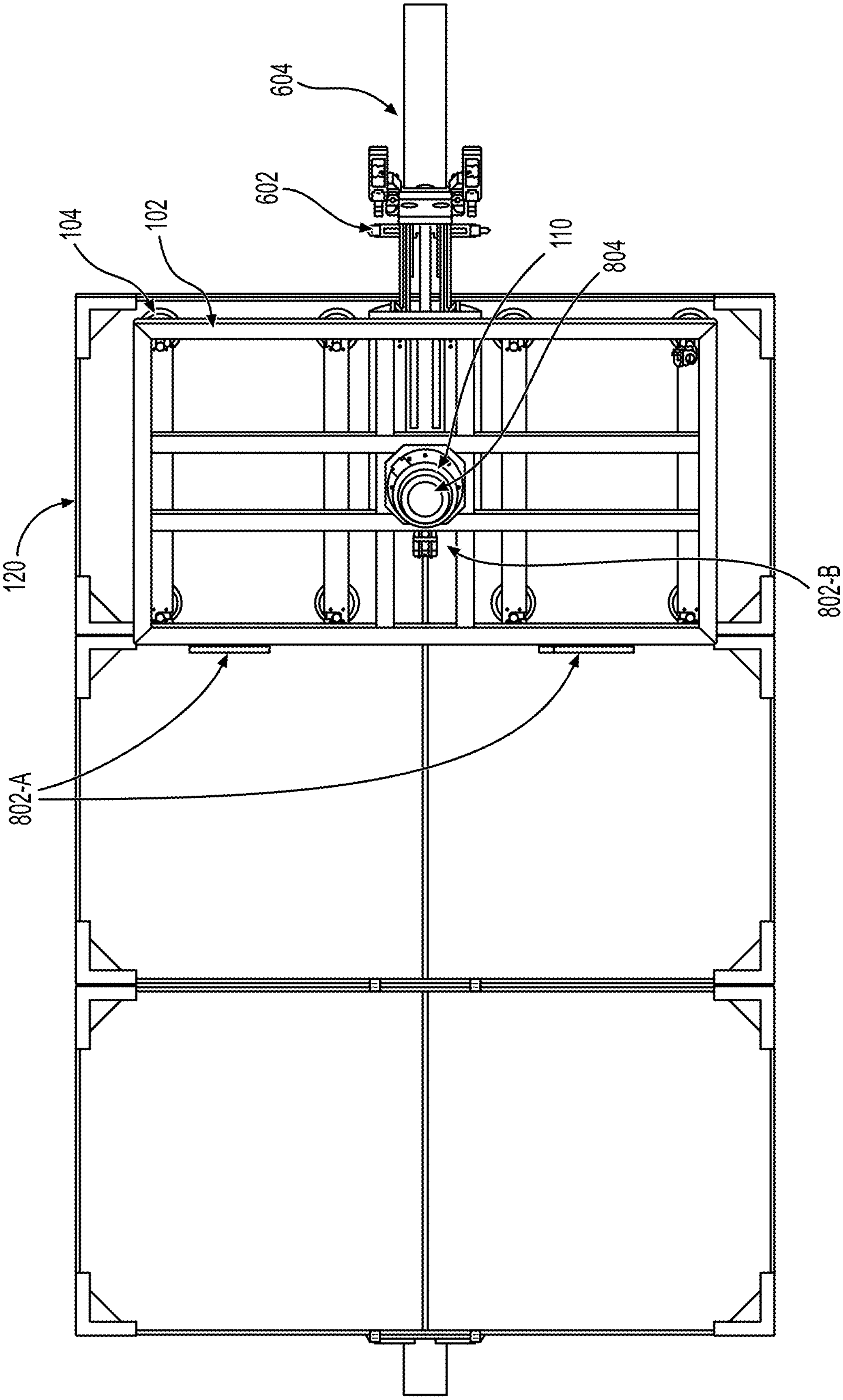
FIG. 8 schematically illustrates, in an overhead view, the solar panel handling system during the process of installing a solar panel, in accordance with an embodiment of the present disclosure.

Referring to FIG. 8, in some embodiments, the solar panel handling system may further include an optical sensor 802 such as, for example, a camera, a photodetector, or any other optical imaging or light sensing device. The optical sensor is suitably located on the frame 102, for example, at an outer or lower surface of an edge member indicated by position 802-A in FIG. 8, or at an interior location of the frame 102 that has a field of view that includes the leading edge of the solar panel, such as indicated by position 802-B in FIG. 8. The optical sensor may be configured to sense an orientation of the solar panel relative to the installation structure during the operation of the end of arm assembly tool. In some embodiments, the optical sensor may be configured in the form of one or more light guided levels (not shown). In such embodiments, one or more light beams (e.g., laser beams) may be projected along or parallel to the axis of the installation structure 604 from one end of the end of arm assembly tool 100, such as first locations on the frame 102. One or more photodetectors may be positioned at another end of the end of arm assembly tool 100, such as second locations on the frame 102, so as to detect the one or more laser beams. Thus, if the solar panel 120 being installed is not appropriately oriented or properly level relative to the installation structure 604, the solar panel 102 may obstruct the some or all of one or more laser beams resulting in varying signals from the one or more photodetectors, indicating that the solar panel 120 is not appropriately oriented or properly level relative to the installation structure 604.

In some embodiments, one or more sensors, such as optical sensors 802, may be used to detect and recognize objects to position and control the installation with improved accuracy. The sensor(s) may be implemented together with a neural network of, for example, an artificial intelligence (AI) system. For example, a neural network can include acquiring and correcting images related to the solar panel handling system, the solar panels (both installed and to be installed), and the installation environment (both natural environment, such as topography, and installed equipment, such as structures related to the solar panel array). Also, for example, a neural network can include acquiring and correcting positional or proximity information. The corrected images and/or the corrected positional or proximity information are input into the neural network and processed to estimate movement and positioning of equipment of the solar panel handling system, such as that related to autonomous vehicles, storage vehicles, robotic equipment, and installation equipment. The estimated movement and positioning are published to a control system associated with the individual equipment of the solar panel handling system or to a master controller for the solar panel handling system as a whole.

In some embodiments, the signal from the optical sensor may be input to the controller. In some embodiments, the solar panel handling system may further include an orientation assembly 804 (see FIG. 8) configured to tilt the end of arm assembly tool 100 relative to the installation structure 604. In such embodiments, the controller 112 may control the orientation in response to an input from the optical signal indicating that the solar panel being installed is not appropriately oriented or properly level relative to the installation structure, such as a torque tube 604. It will be appreciated that while the orientation assembly 804 is shown as being coupled to the force torque transducer 110, those of ordinary skill in the art will readily recognize other means of implementing the orientation assembly 804.

In some embodiments, the controller 112 may also be configured to control the attachment devices 104 so as to activate or deactivate the attachment/detachment thereof. For embodiments in which the attachment devices 104 are suction cups, a vacuum can enable coupling or release of the solar panels 120 with the end of arm assembly tool 100.

In some embodiments, the installation structure 604 may have an octagonal cross-section, as shown, e.g., in FIGS. 6A, 6B, and 7A-7D, to form a torque tube preventing inadvertent slipping of the clamp assembly 602. However, other cross-sectional shapes may be used, such as squared, oval, or other shape. Further, the installation structure 604 may use a circular cross-sectional shapes.

Figure 9:
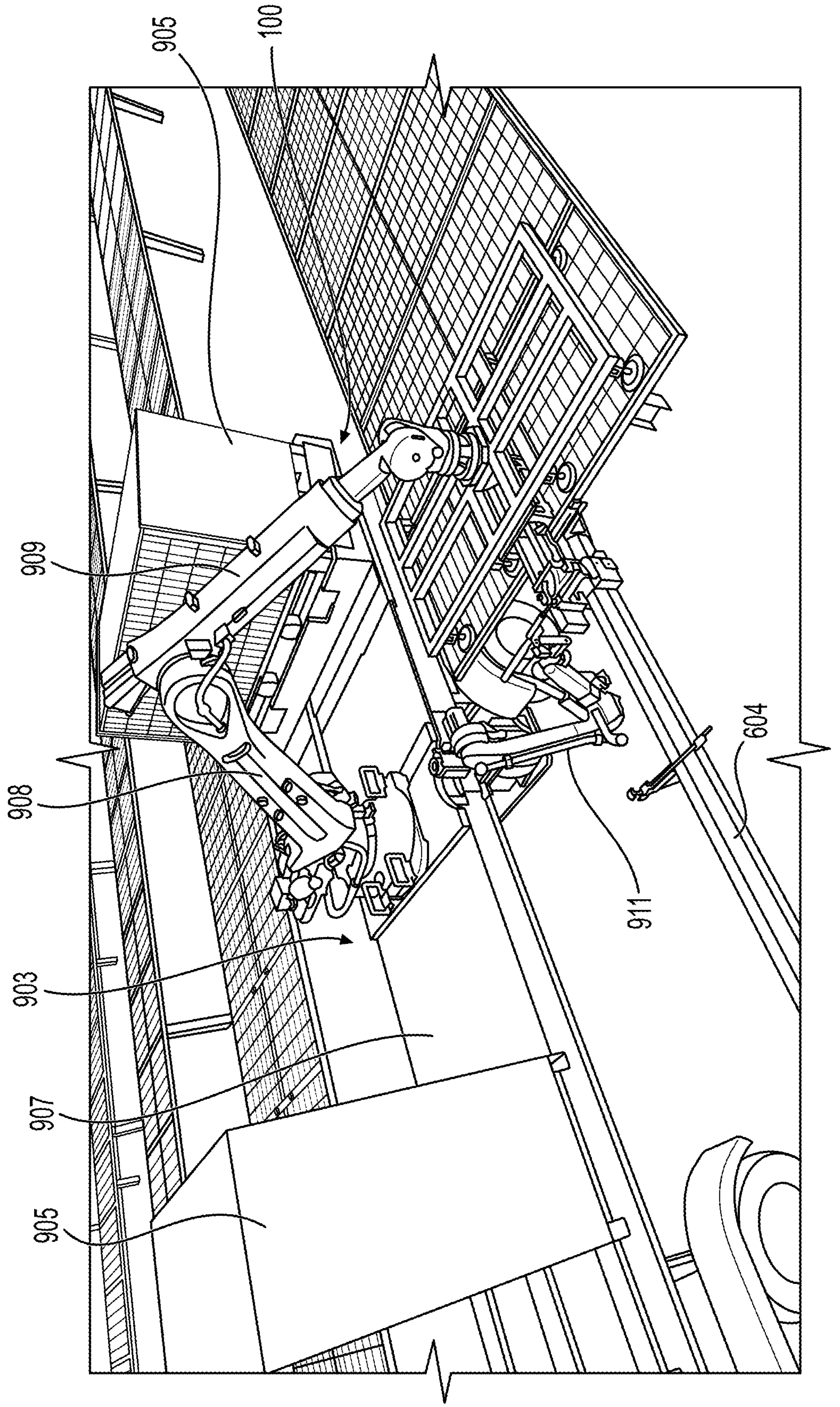
FIG. 9 illustrates the solar panel handling system including the assembly tool coupled with an assembly moving robot using a robotic arm.
Figure 10:
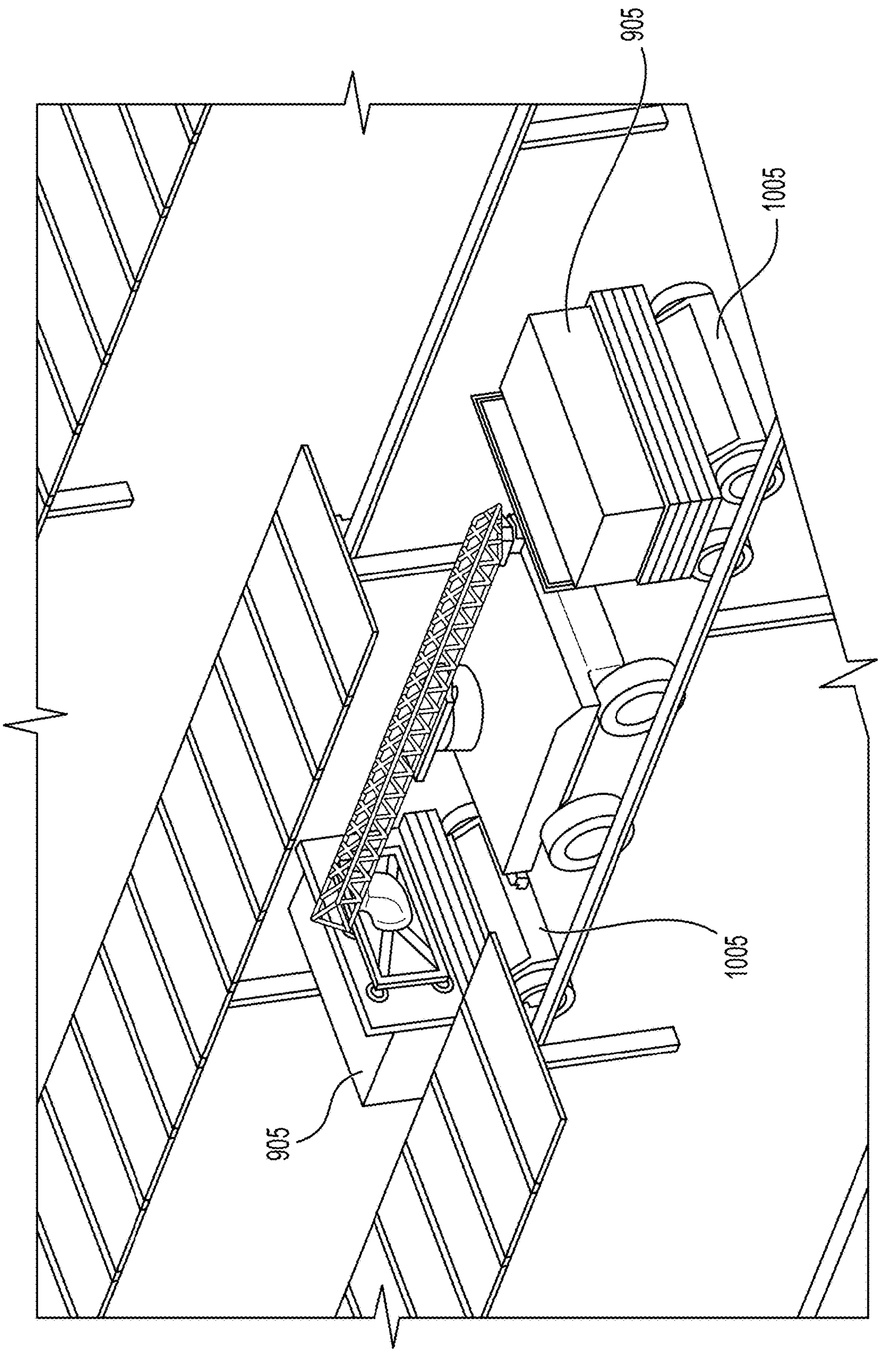
FIG. 10 illustrates the solar panel handling system having two robotic arms in which two assembly tools are coupled with an assembly moving robot using respective robotic arms.

In some embodiments, the assembly tool 100 may be configured to couple with an assembly moving robot 903 (an example of which is shown in FIGS. 9 and 10). The assembly moving robot 903 may be configured to position the end of the arm assembly tool 100 relative to a stack or storage container 905 of solar panels, move a selected solar panel and position the selected solar panel relative to the installation structure 604. In some embodiments, the assembly moving robot 903 may be operationally coupled with the end of arm assembly tool 100 via the force transducer 110 (or where applicable, the orientation assembly 804). In some embodiments, the assembly moving robot may also be operationally coupled to the controller, enabling an operator of the assembly moving robot to control the various functions of the end of arm assembly tool 100, such as, for example, activation and/or deactivation of the attachment devices 104, advancement and/or retraction of the clamping tool, and/or activation and/or deactivation of the engagement member relative to the clamp assembly.

Referring now to FIGS. 1, 6A, 6B, 7A-7D, 9, and 10, in operation, a solar panel 120 is obtained and positioned over the installation structure 604. The solar panel is then tilted relative to the installation structure 604 so that a leading edge of the solar panel (i.e., an edge that will be adjacent an edge of the previously installed solar panel or, for a first solar panel, an edge that will be adjacent a stop affixed to the installation structure 604) is oriented closer to the installation structure 604 than an opposite, trailing edge. The leading edge is then placed in a receiving channel (either a receiving channel positioned along the edge of the previously installed solar panel, i.e. as part of a clamp assembly, or a receiving channel in the stop) and the tilt of the solar panel reduced to an installed position on the installation structure. The tilt angle is reduced while the solar panel is biased into the receiving channel so that in the installed position the edge region of the top planar surface of the solar panel (i.e., the photovoltaically active surface that is oriented to the sun) is captured within the receiving channel. An example embodiment of a receiving channel 610 on a clamp assembly 602 is shown in FIGS. 6A and 6B.

Once the solar panel is in position on the installation structure, the force torque actuator 110 actuates the guide assembly 106 of the end of arm assembly tool 100 to contact the engagement member 108-A of the clamping tool 108 with a clamp assembly 602. This clamp assembly was originally positioned on the installation structure outside the area to be occupied by the solar panel being installed, but also sufficiently close so as to be reached by the relevant components of the end of arm assembly tool 100. Surfaces and features of the engagement member 108-A may be located and sized so as to mate with complimentary features on the clamp assembly 602. After this contact, the force torque actuator 110 is actuated (either continued to be actuated or actuated in a second mode) to axially slide the clamp assembly 602 along a portion of the length of the installation structure 604. Axially sliding of the clamp assembly 602 engages a receiving channel of the clamp assembly 602 with the trailing edge of the just installed solar panel. Sensors, such as in the force torque actuator 110 or in the clamping tool 108, can provide feedback to the controller indicating full engagement of the receiving channel of the clamp assembly 602 with the trailing edge of the solar panel. Once the clamp assembly 602 is positioned, the guide assembly 106 is retracted and installation of the next solar panel can occur.

In some embodiments, the linear guide assembly 106 may include a proximity sensor 108-B configured to sense a distance between the engagement member 108 and the trailing edge of the solar panel 120 during an operation of installation of the solar panel 120. An output from the proximity sensor 108-B may be used to suitably control the speed of the clamping tool 108 during the operation of linear guide assembly 106 so as to avoid excessive forces and impacts on the solar panel 120. In some embodiments, the proximity sensor 108-B may be, for example, an optical or an audio sensor (e.g., sonar) that detects a distance between the leading edge of the solar panel 120 and the engagement member 108; in other embodiments, the proximity sensor 108-B may be a limit switch that is retracted by contact.

With further reference to FIGS. 9 and 10, the assembly moving robot 903 may be implemented using a ground vehicle 907. For example, the ground vehicle 907 may be implemented as an electric vehicle (EV). The ground vehicle 907 may autonomously move adjacent to the installation structure 604. While not shown, the ground vehicle 907 may move along a track or a rail that is attached to or separate from the installation structure. In some embodiments, the ground vehicle 907 may be controlled using sensors or be controlled based on input or feedback from sensors. The sensors can be, for example, optical sensors or proximity sensors. In further embodiments, a neural network using artificial intelligence may be used in controlling movement of the ground vehicle 907, such as by analyzing the operating environment and developing instructions for movement and of the ground vehicle.

FIG. 10 illustrates an embodiment of a solar panel handling system having two robotic arms in which two assembly tools are coupled with an assembly moving robot using respective robotic arms.

As shown FIG. 9, the storage container 905 containing the solar panels to be installed may be disposed on the ground vehicle. Here, FIG. 9 illustrates the solar panel handling system including an arm assembly tool 100 coupled with an assembly moving robot using a robotic arm. Alternatively, as shown in FIG. 10, one or more storage containers 905 may be disposed on respective one or more of module vehicles 1005 adjacent to the ground vehicle 907. As such, FIG. 10 illustrates the solar panel handling system having two robotic arms in which two assembly tools are coupled with an assembly moving robot using respective robotic arms. In embodiments of the disclosure, the robotic arm(s) may be an articulated arm having two or more sections coupled with joints, or alternatively may be a truss arm. Illustrations herein are intended to disclose the use of any type of arm in accordance with the present disclosure.

In accordance with FIG. 9, for example, the robotic arm of the arm assembly tool 100 having an upper section 908 and a lower section 909 may offer increased flexibility in operation while maintaining light weight and simple operation. As additionally illustrated in FIG. 9, a second robotic arm 911 may be provided with the arm assembly tool 100 having a nut runner or nut driver at an end thereof to secure the solar panel to the installation structure 604. While any type of robotic arm may be used for the second robotic arm 911, FIG. 9 illustrates an example using an articulated arm with the nut runner or nut driver at an end thereof. Here, the robotic arms 100 and 911 may be autonomous operated using computer vision with a neural network and artificial intelligence control. Alternatively, the robotic arms 100 and 911 may be manually operated or remote control operated.

In some embodiments, the ground vehicle 907 may be an autonomous vehicle in which the neural network and artificial intelligence control the movement and operation and the module vehicles 1005 are towed or coupled to the ground vehicle 907. In other embodiments, the module vehicles 1005 may be an autonomous vehicle in which the neural network and artificial intelligence control the movement and operation and the ground vehicle 907 is towed or coupled to the module vehicles 1005. Also, in some embodiments, the assembly moving robot 903 is mounted on one of the ground vehicles 907 and the module vehicles 1005. In other embodiments, the assembly moving robot 903 can be mounted on a dedicated robot vehicle.

Figure 11A:
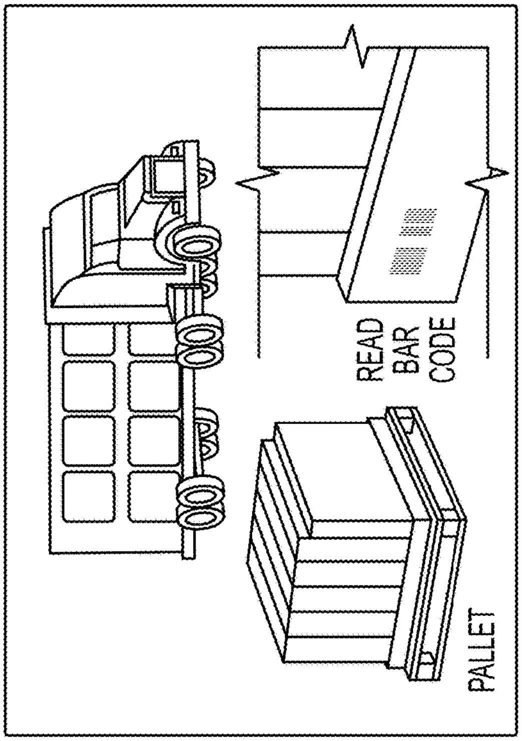
FIGS. 11A to 11C illustrate a process for installing the solar panels.
Figure 11B:
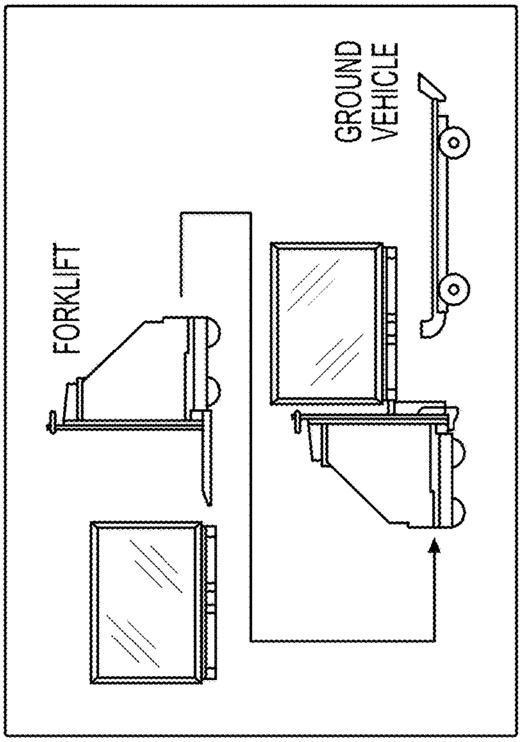
Figure 11C:
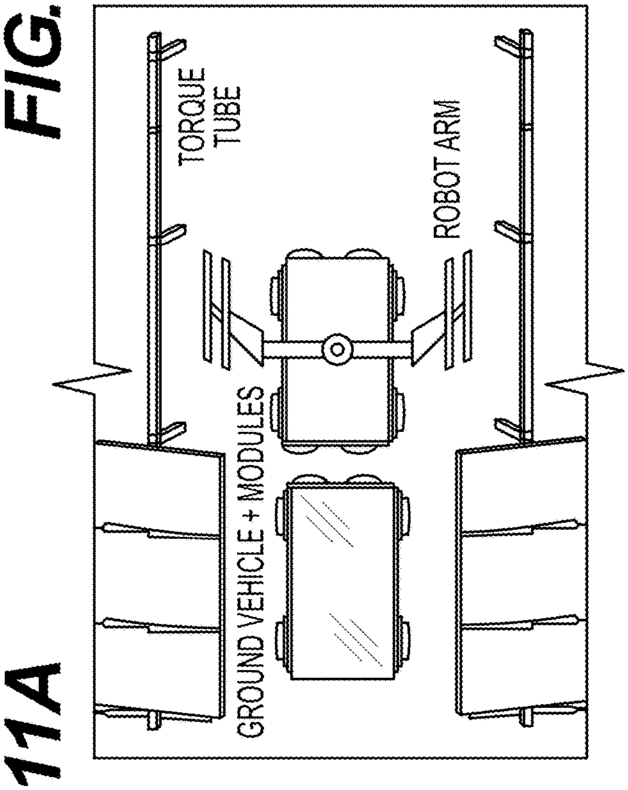

A process for installing the solar panels is shown in FIGS. 11A to 11C. As shown in FIG. 11A, a pallet of solar panels may be delivered via truck. In some embodiments, the pallet may compose the storage container 905 of solar panels. The pallet may include machine readable signage, such as a bar code, a QR-code, or other manufacturing reference, that can be read to provide information regarding the solar panels, the installation instructions or other information to be used in the installation process, particularly information to be used by the neural network and artificial intelligence control. Such information can include, for example, number of solar panels, the type of solar panels, physical characteristics of the solar panel such as size, characteristics related to installation, such as hardware type and location, installation instructions, or other characteristics of the solar panels, the storage of the solar panels on the pallet, and information related to installation. Further, using the machine-readable signage, the system may control feeding or replenishing the panels boxes in the right order and/or to ensure panels with similar impedance from the factory are used.

As shown in FIG. 11B, mechanized equipment such as a forklift may be used to move and position the pallet on the ground vehicle. Here, the forklift may be manually operated, remotely operated, or autonomous. In FIG. 11B, the pallet is positioned on the ground vehicle. Alternatively, the pallet may be positioned on a module vehicle. Then, as shown in FIG. 11C, the arm of the robot is used to install the solar panels. In the illustrated example, two arms are used to handle respective solar panels to be installed on respective installation structures. Here, the ground vehicle moves between two respective installation structures. Further, one module vehicle is provided, which may be separated from the ground vehicle.

Figure 12A:
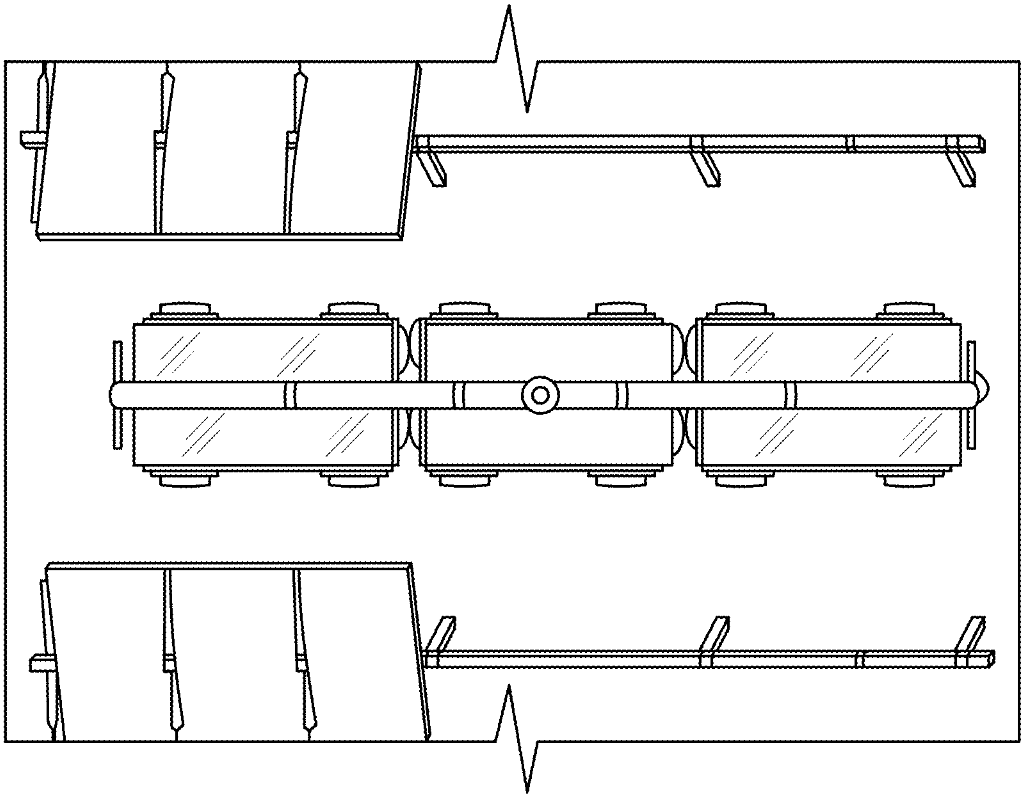
FIGS. 12A and 12B illustrate an arrangement for a moving robot system including two module vehicles and a ground vehicle having two robotic arms.
Figure 12B:
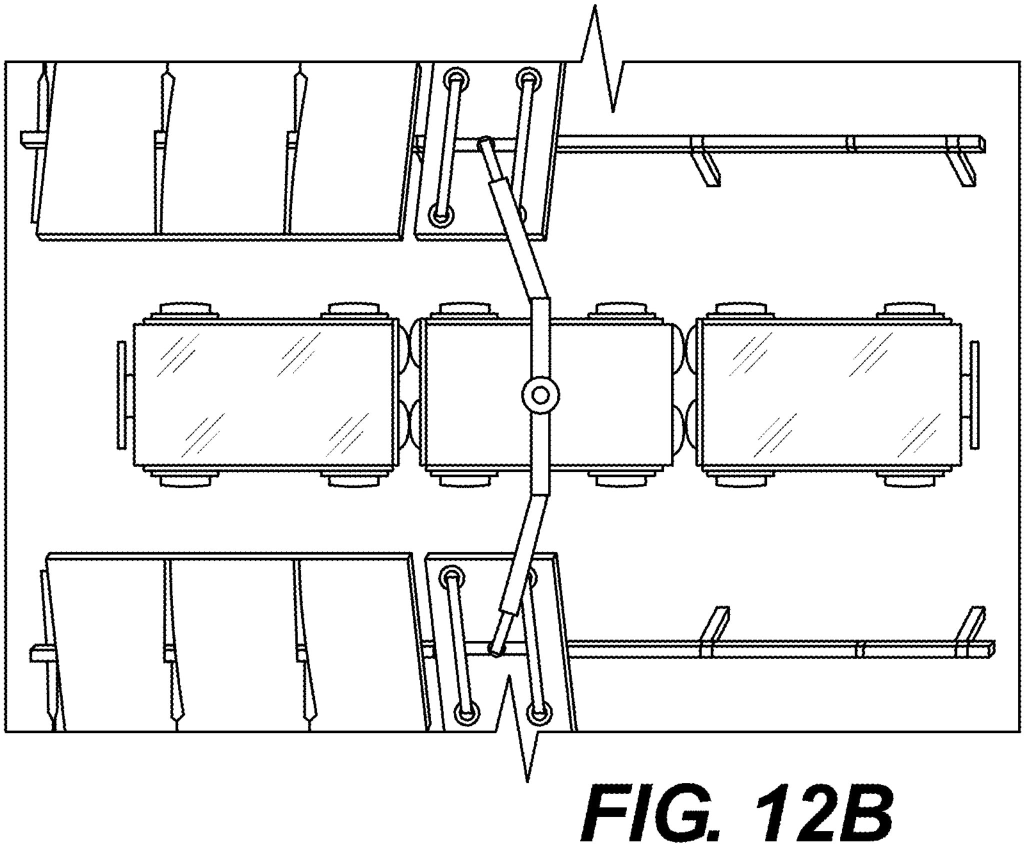

As one of ordinary skill in the art would recognize, modifications and variations in implementation may be used. For example, as shown in FIGS. 12A and 12B, two module vehicles may be provided for the respective robot arms. In a further alternative, the module vehicles may be connected with the ground vehicle instead of being separated. Thus, as shown in FIG. 12A, the robot arms may engage respective solar panels to be installed as illustrated in FIG. 12B).

Figure 13:
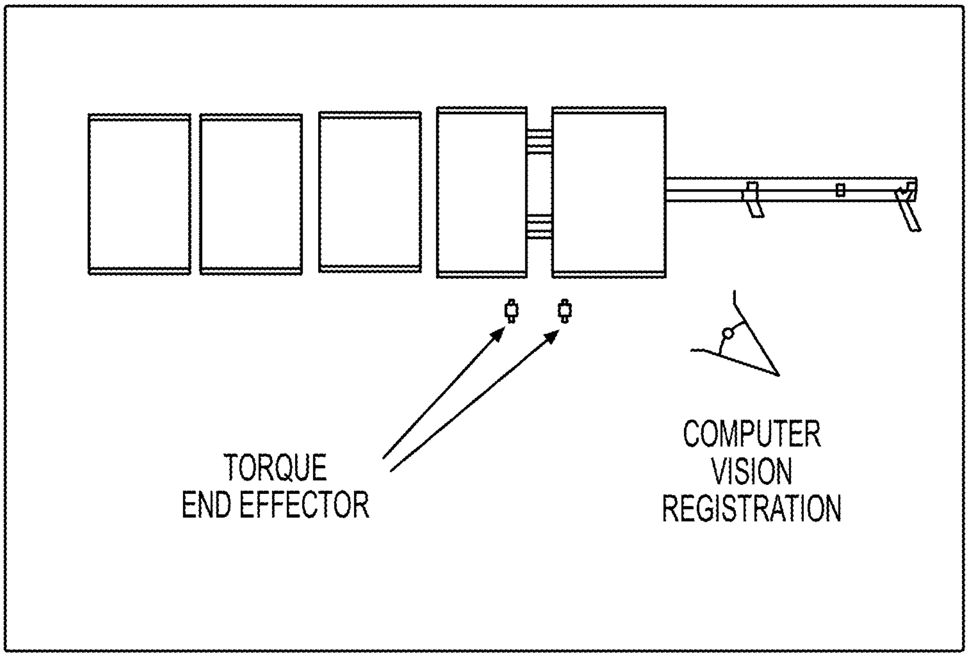
FIG. 13 schematically illustrates installation achieved using computer vision registration.

In some embodiments, as illustrated in FIG. 13, installation may be achieved using computer vision registration. For example, as mentioned above, optical sensors or the like may be utilized with a neural network for artificial intelligence.

Figure 14:
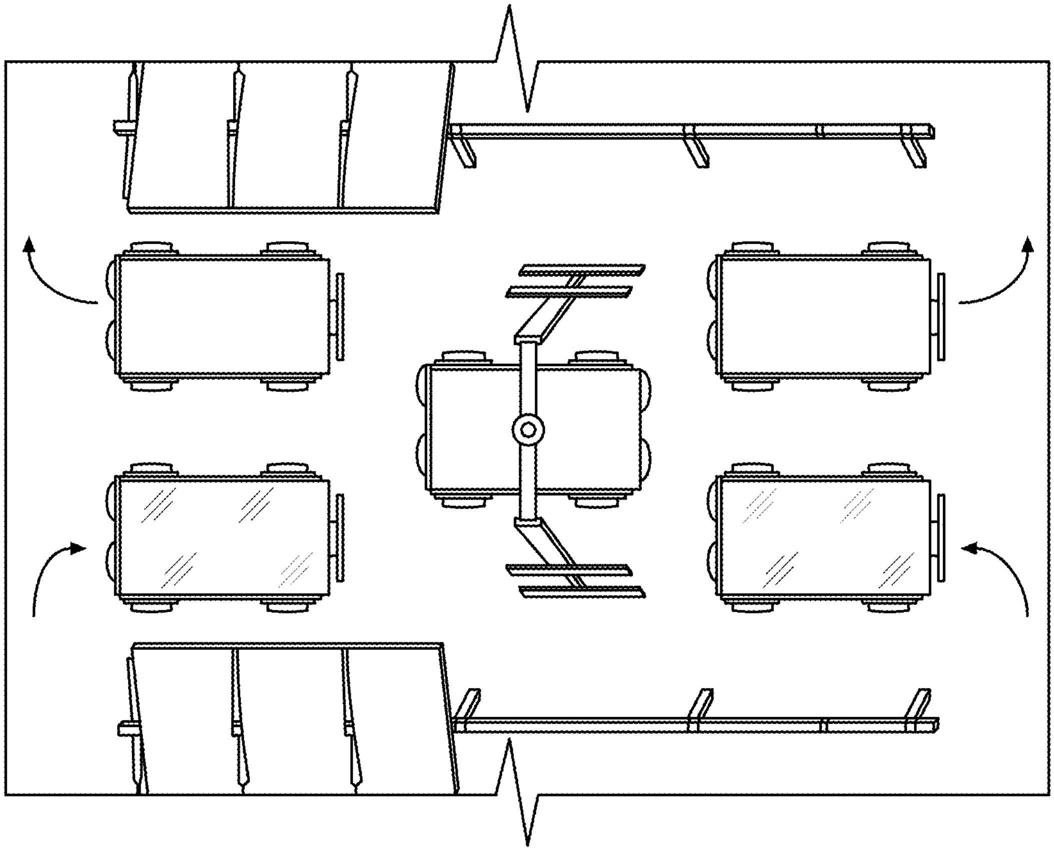
FIG. 14 schematically illustrates an arrangement wherein the module vehicles are exchanged with new module vehicles having additional solar panels for replenishment.
Figure 15:
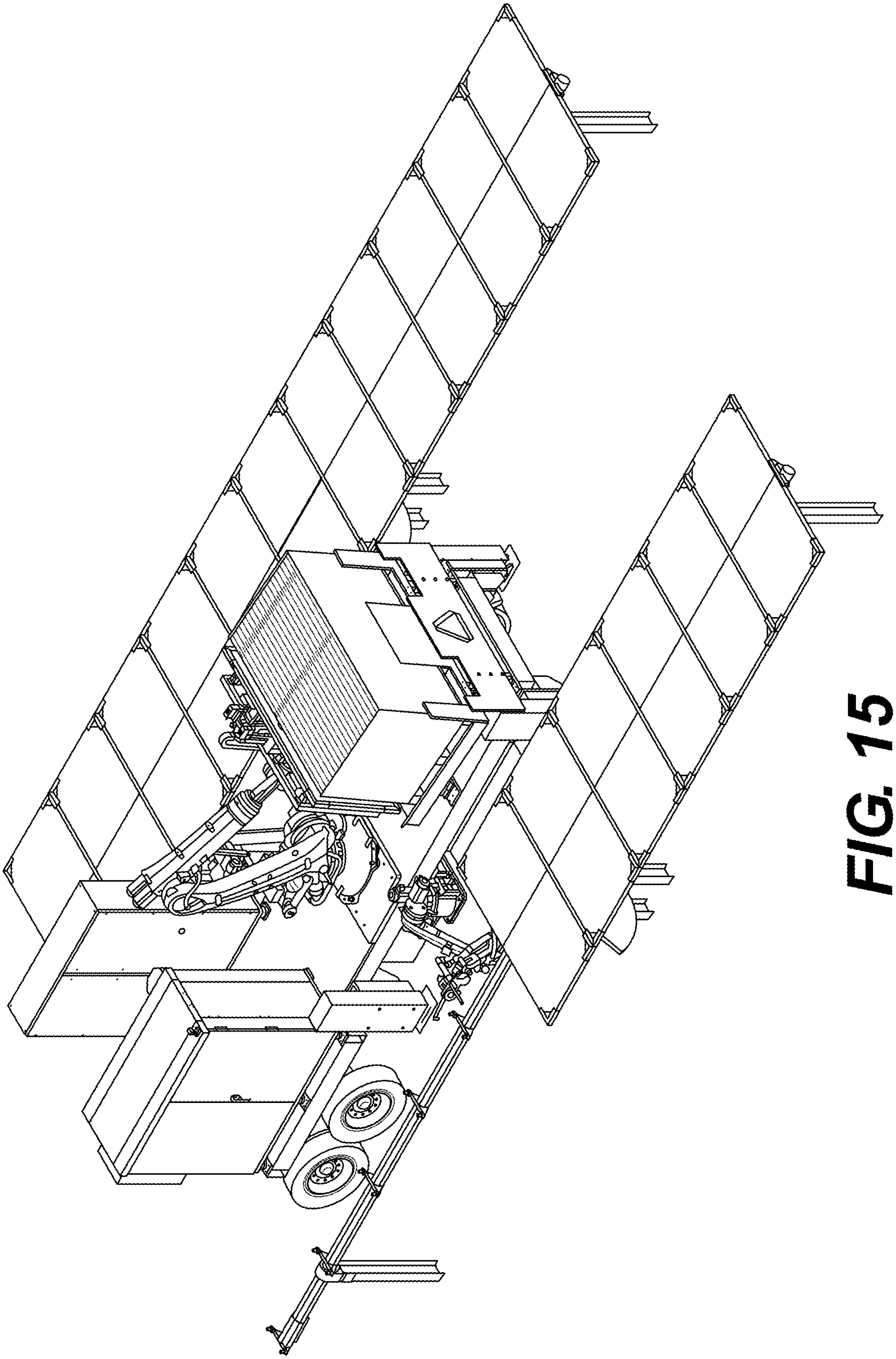
FIGS. 15-34 provide detailed illustrations of an example configuration for a system for installing solar panels according to an embodiment of the present disclosure.
Figure 16:
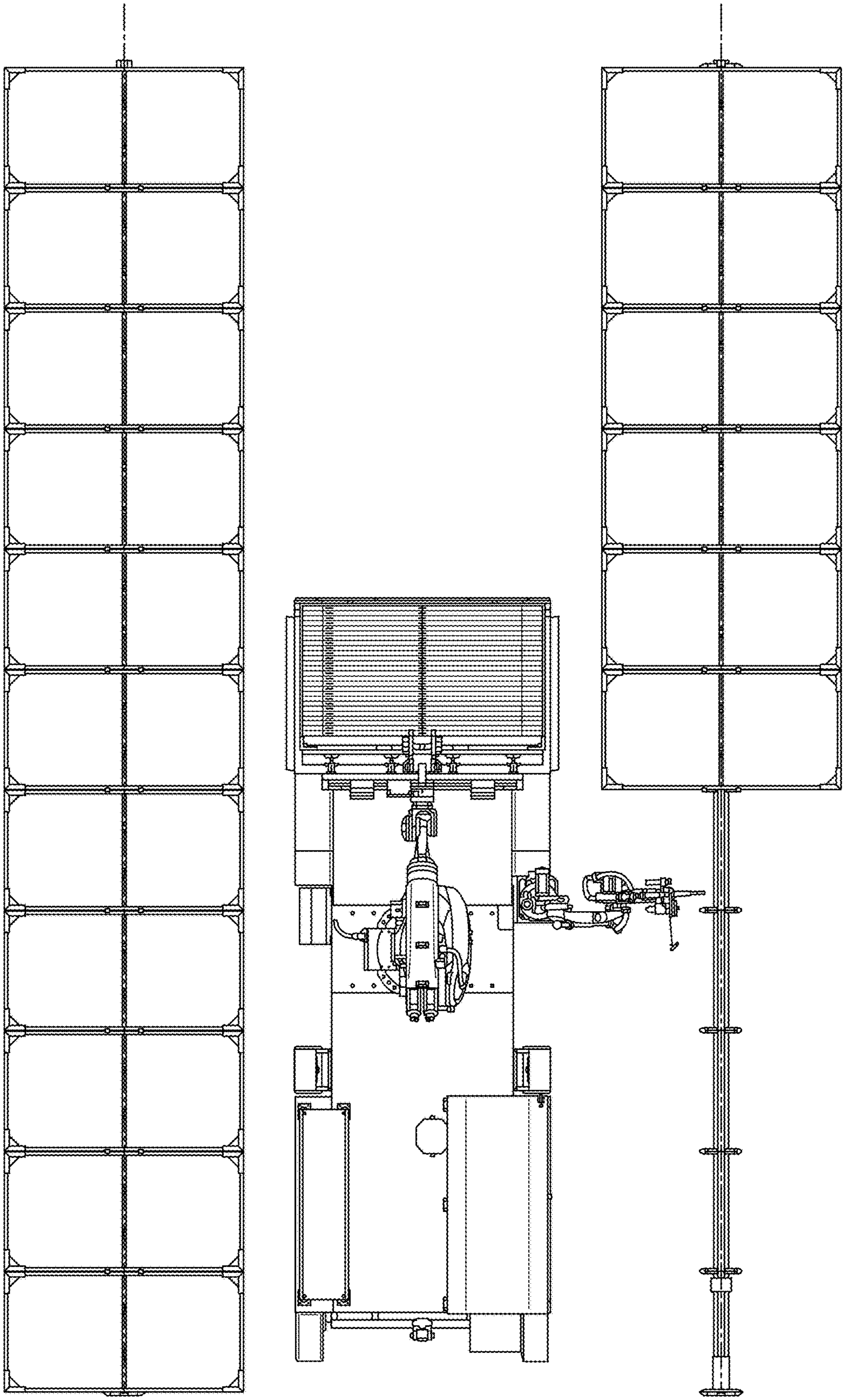
Figure 17:
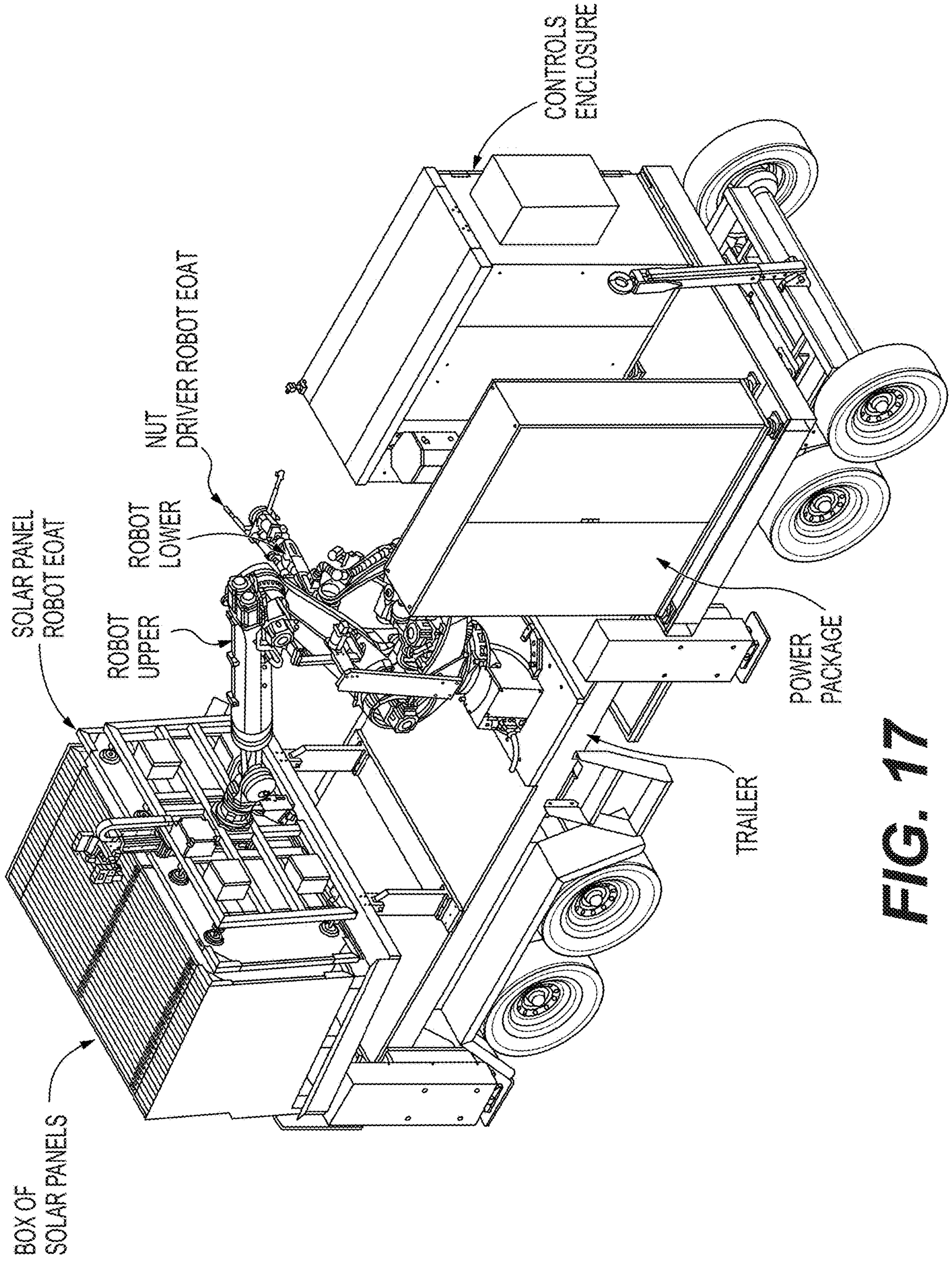
Figure 17:
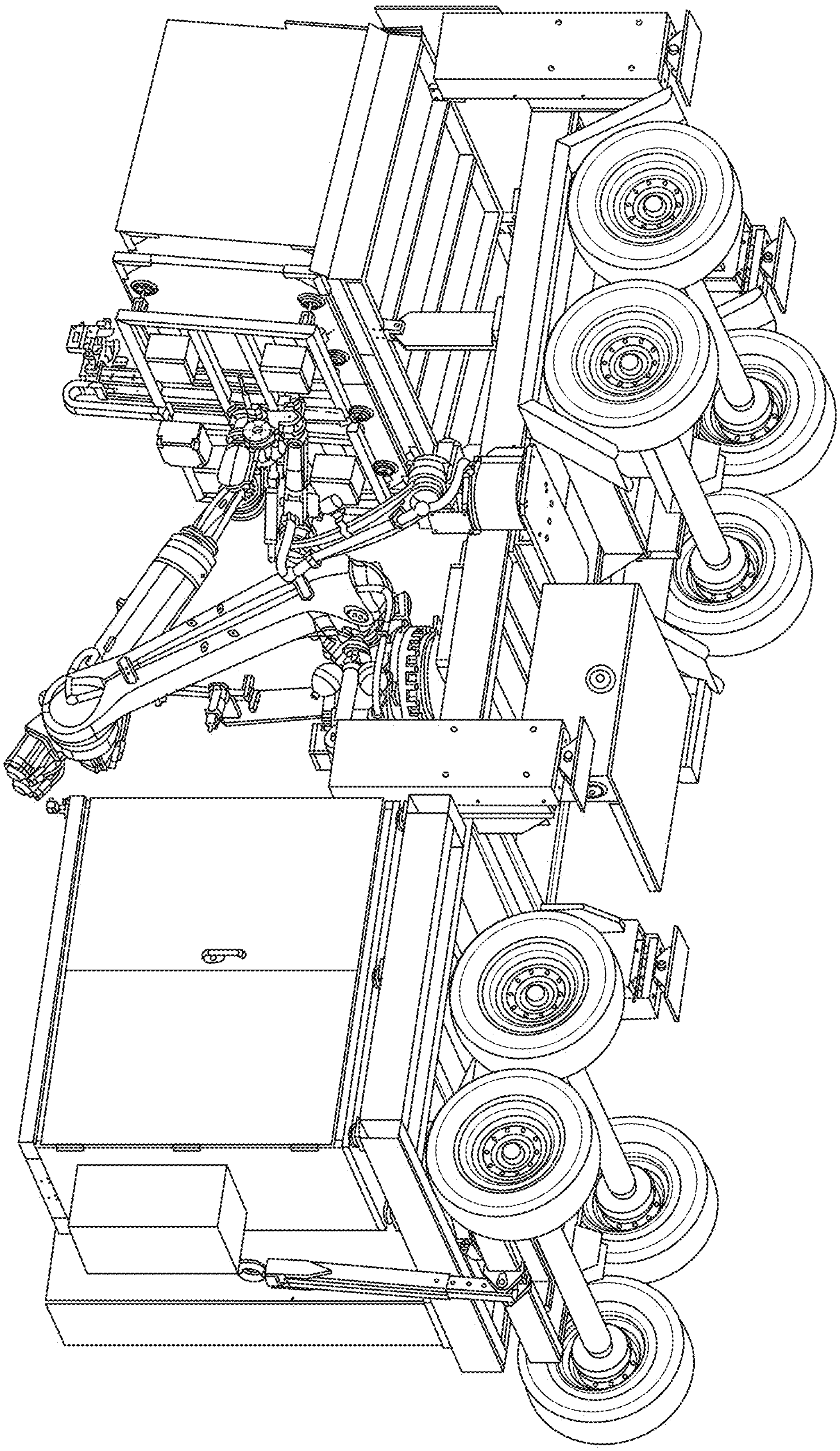
Figure 18:
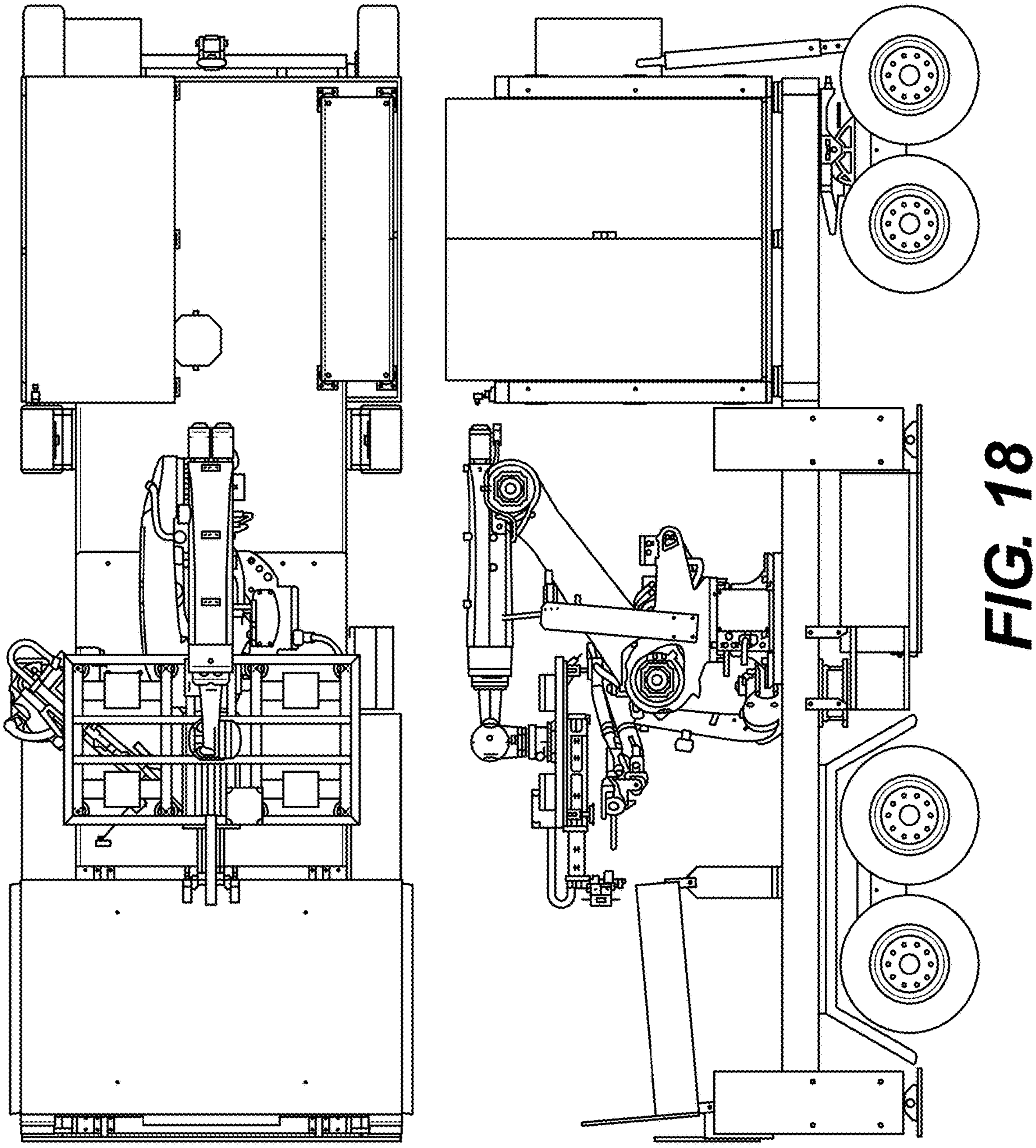
Figure 18:
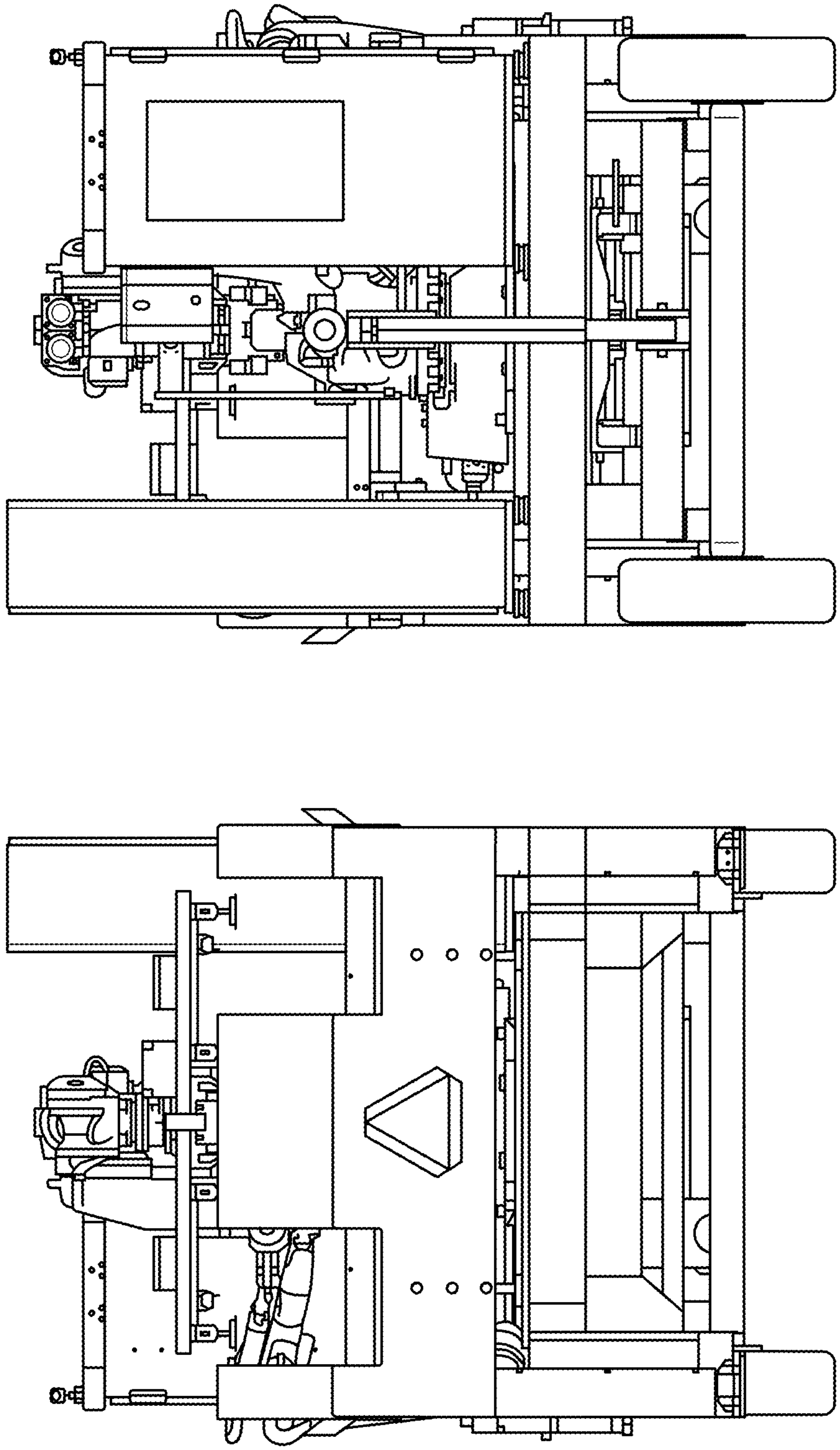
Figure 19:
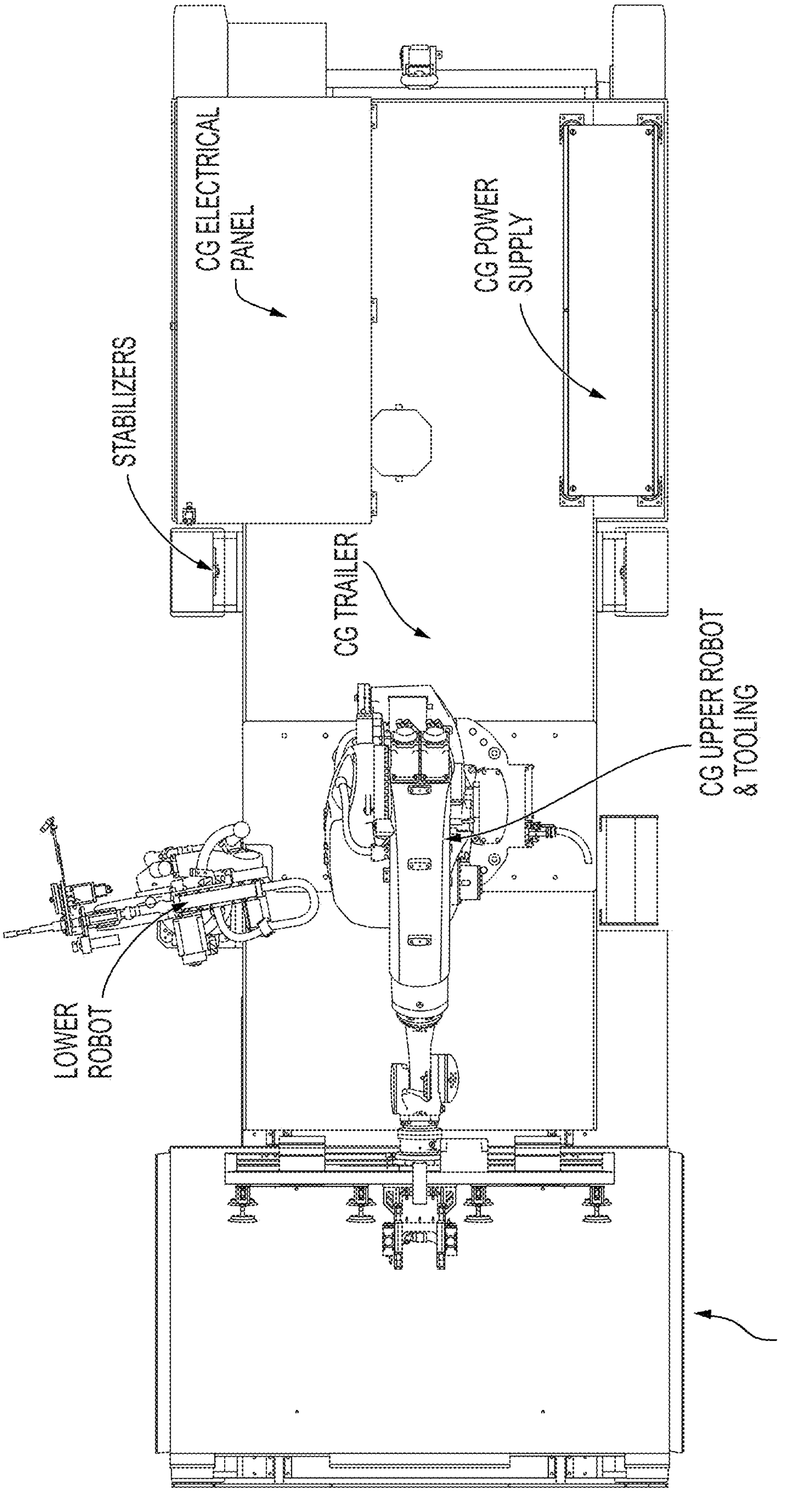
Figure 20:
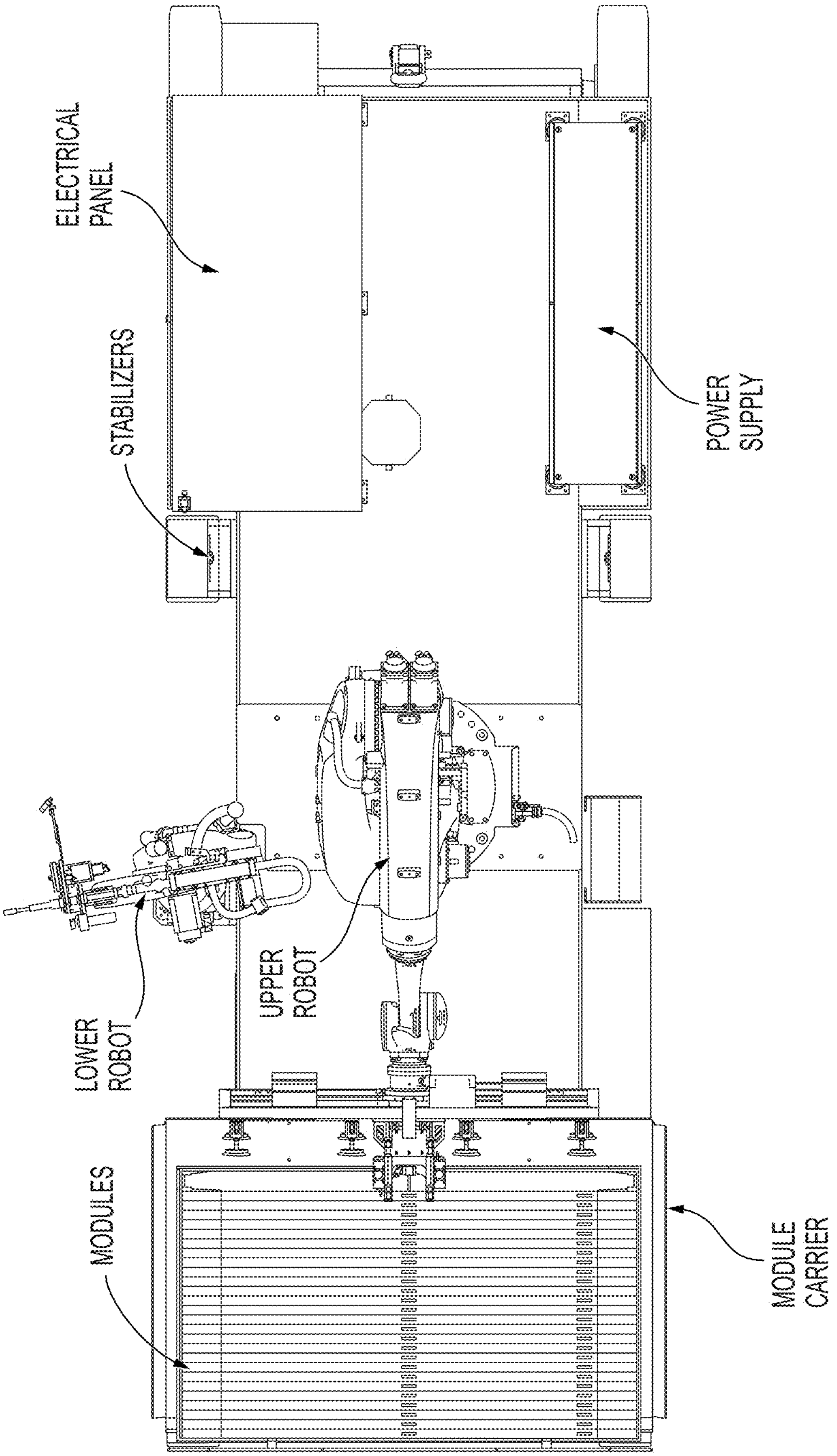
Figure 21:
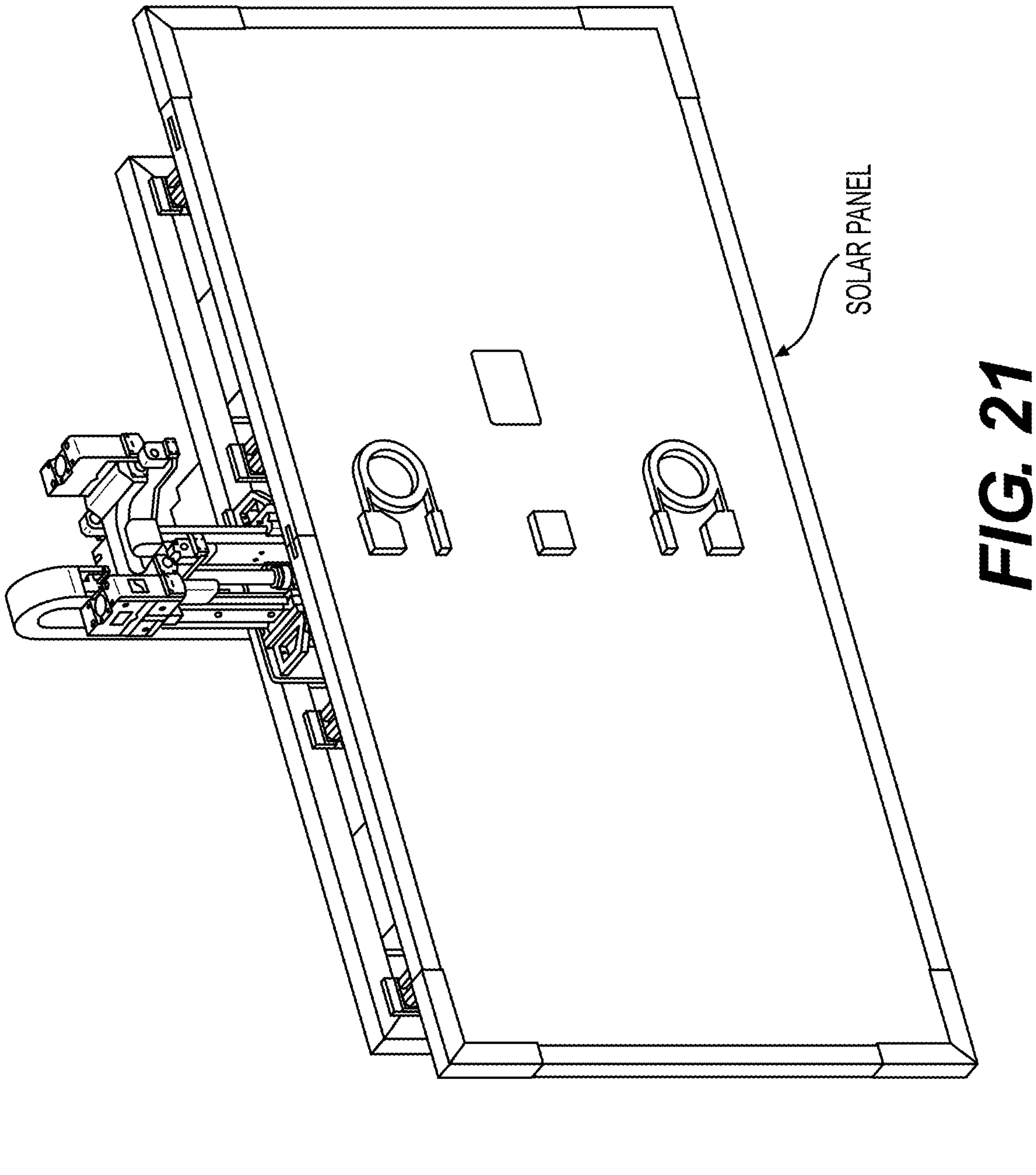
Figure 21:
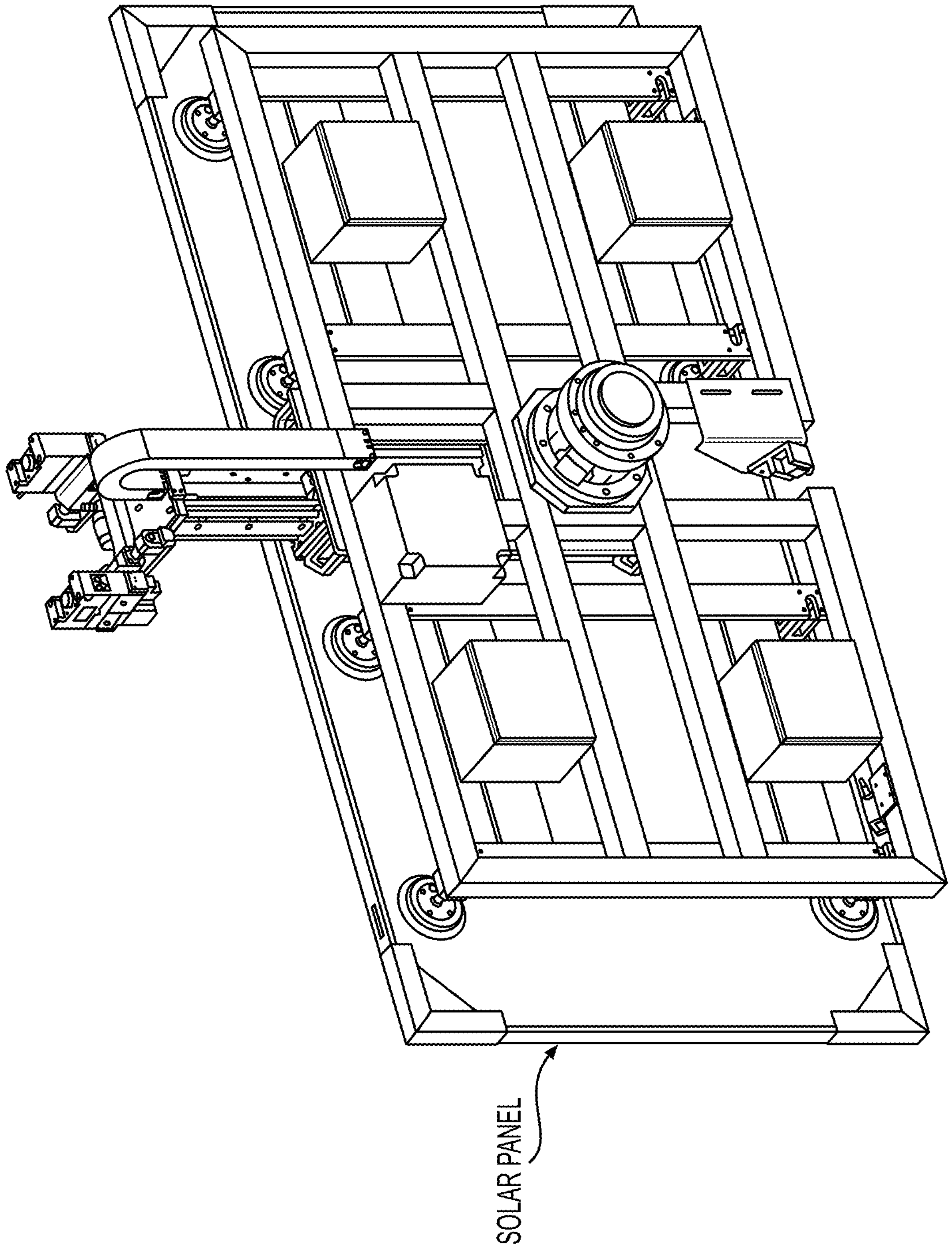
Figure 22:
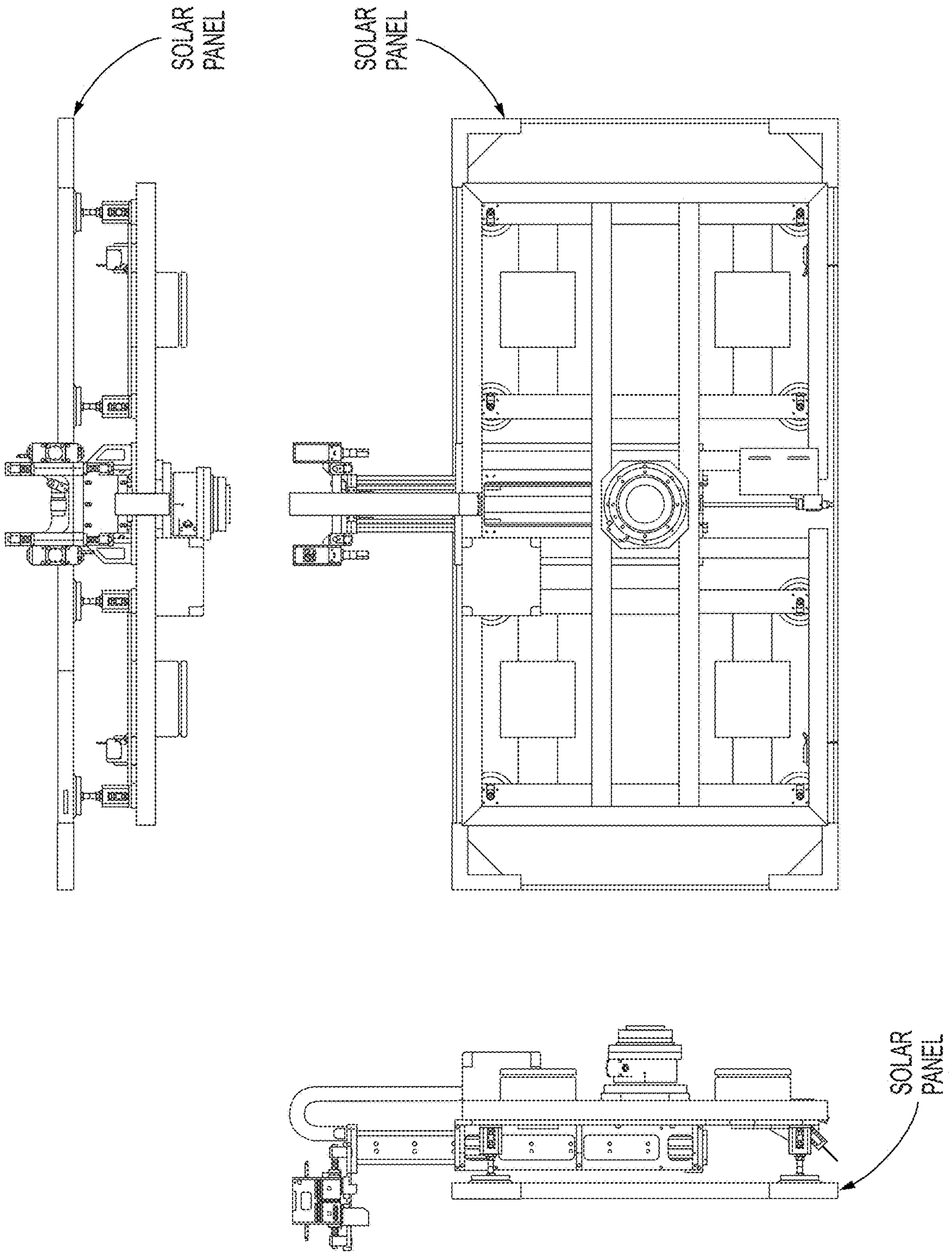
Figure 23:
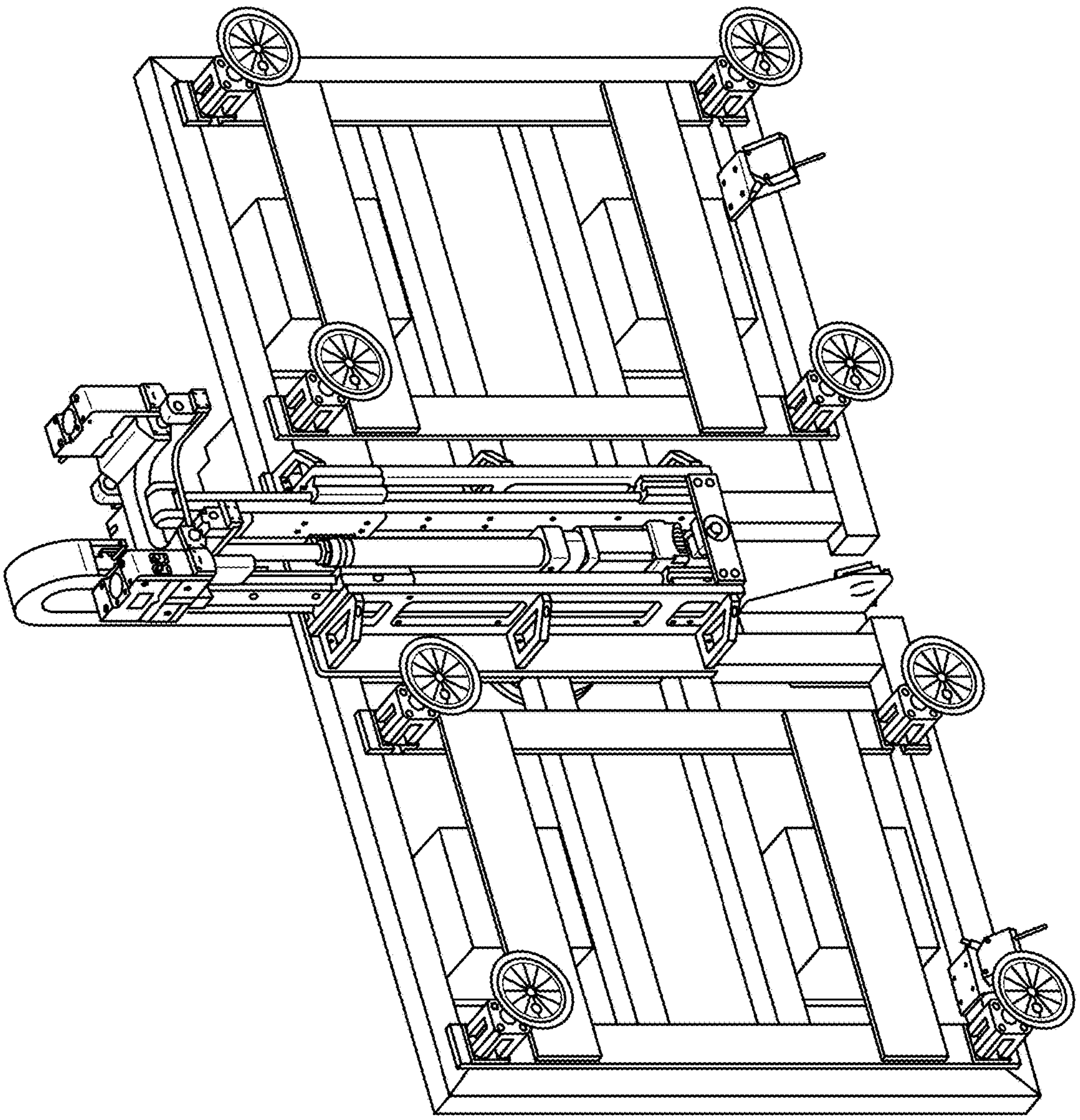
Figure 23:
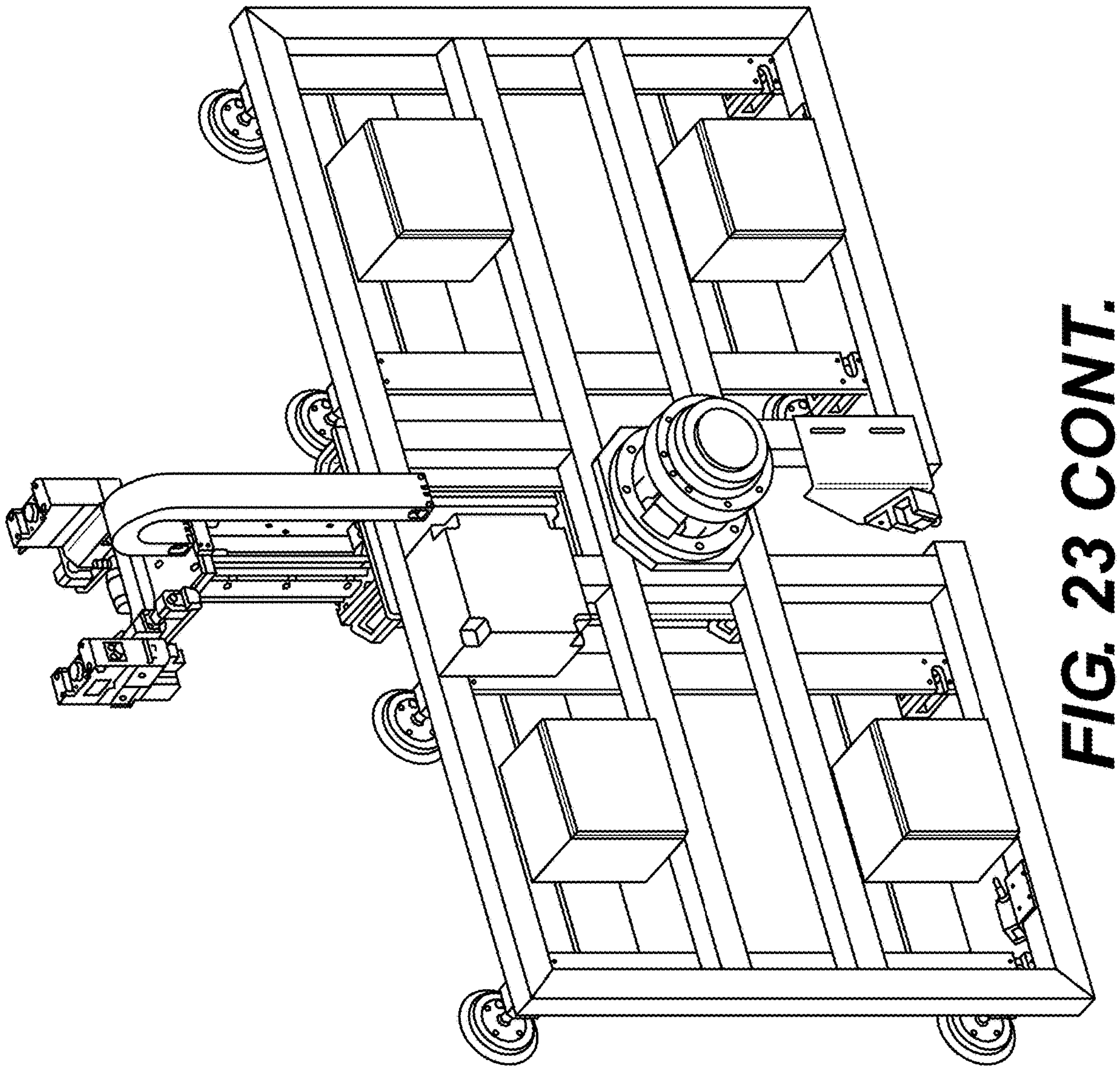
Figure 24:
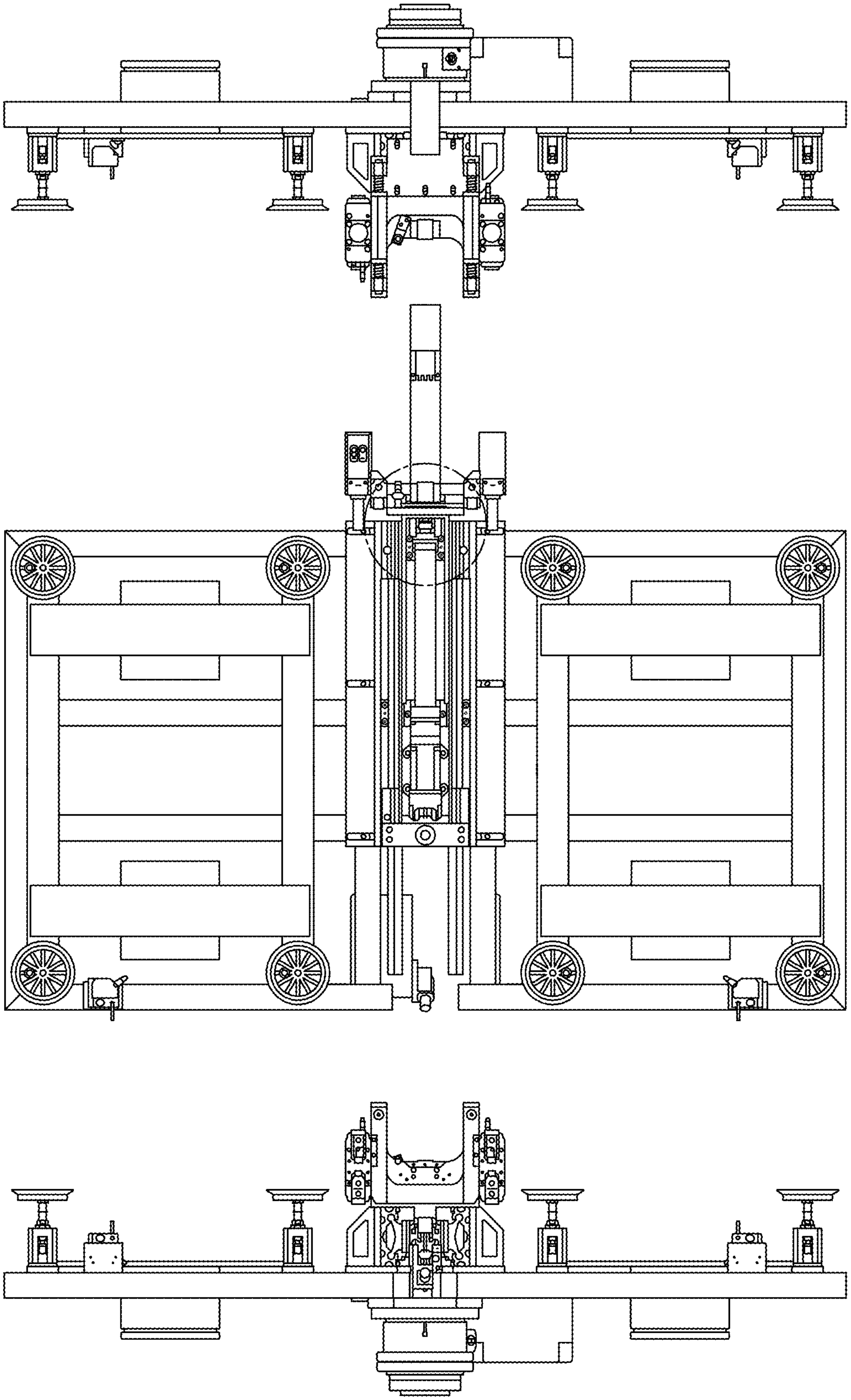
Figure 24:
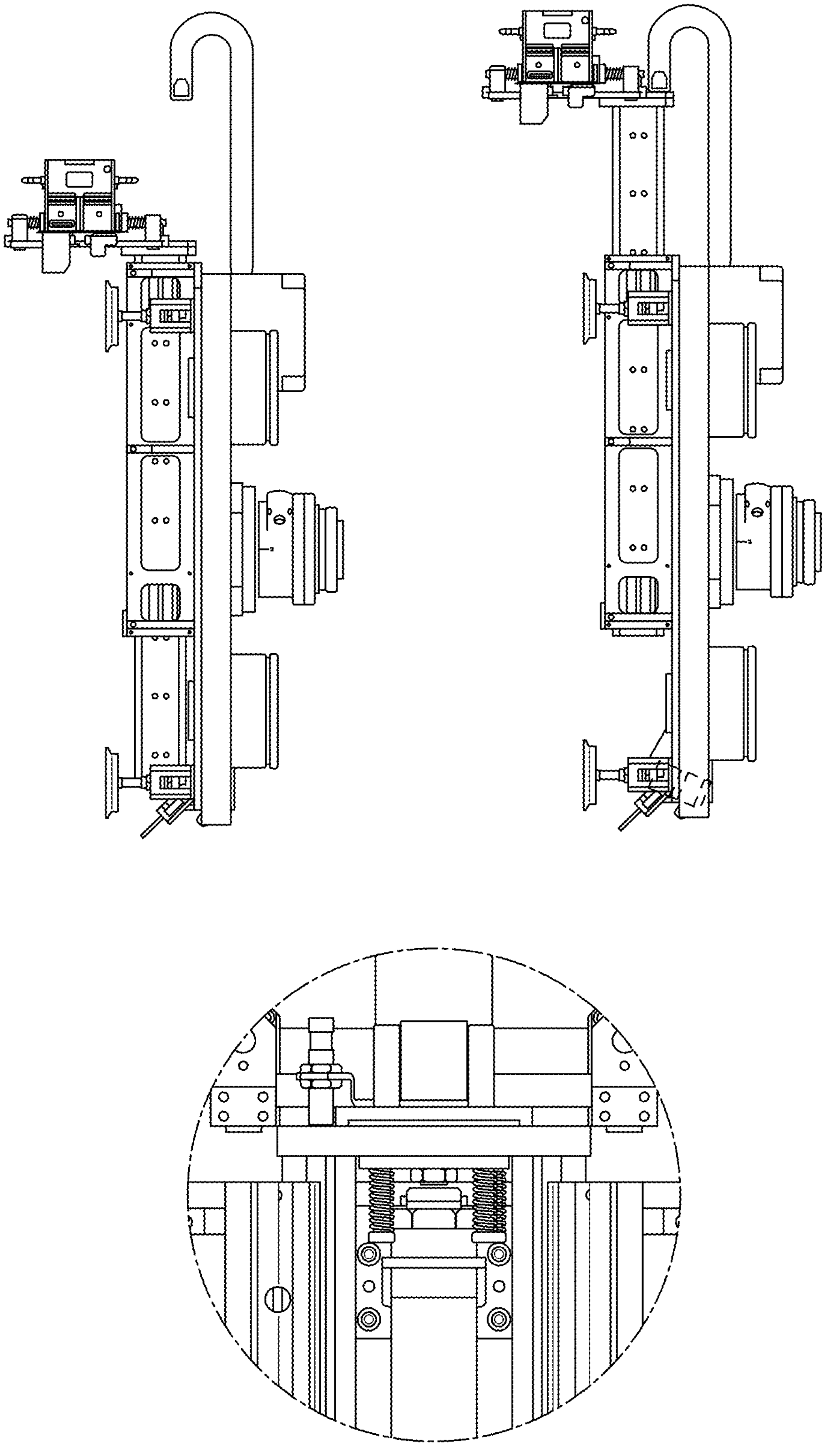
Figure 25:
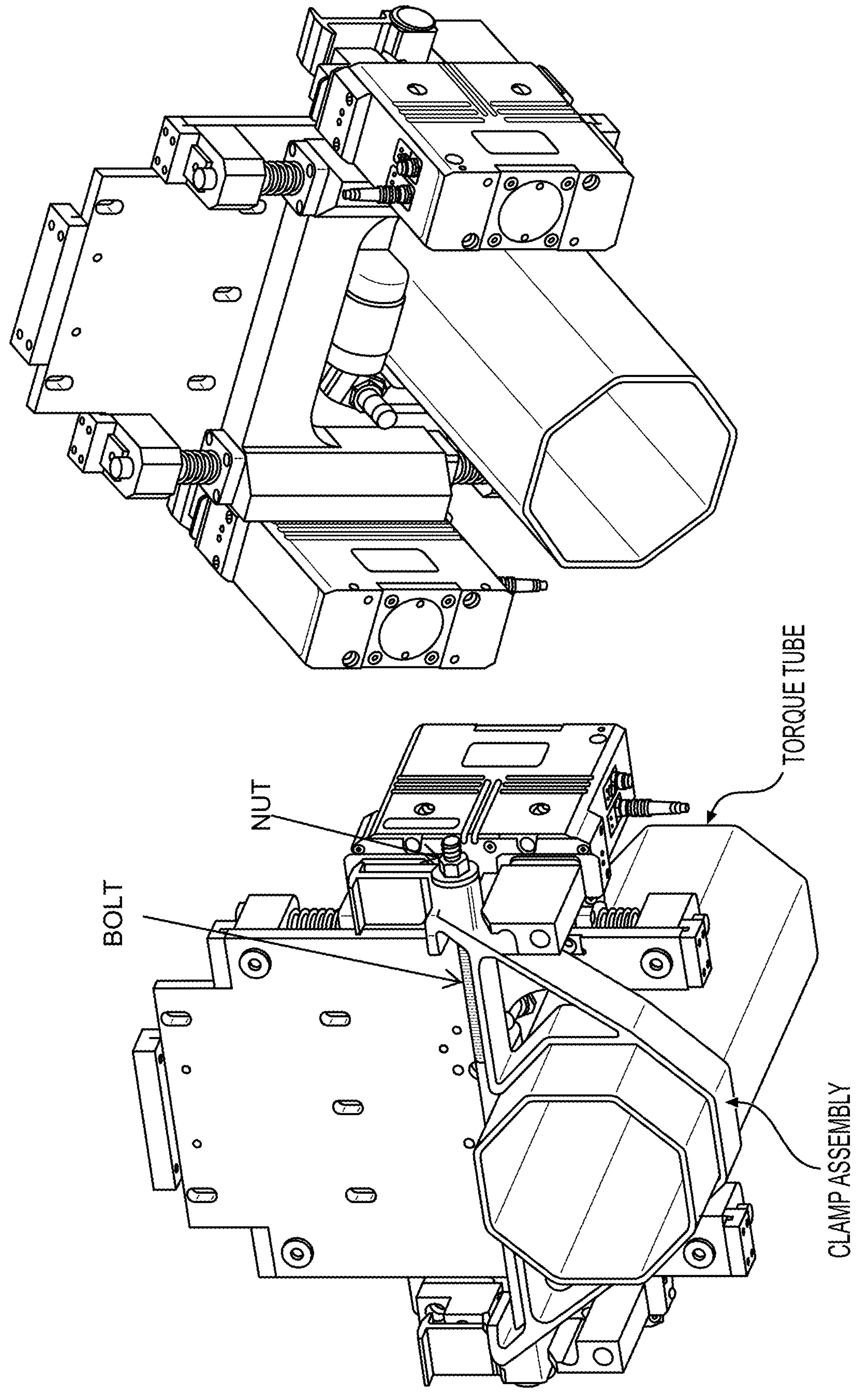
Figure 26:
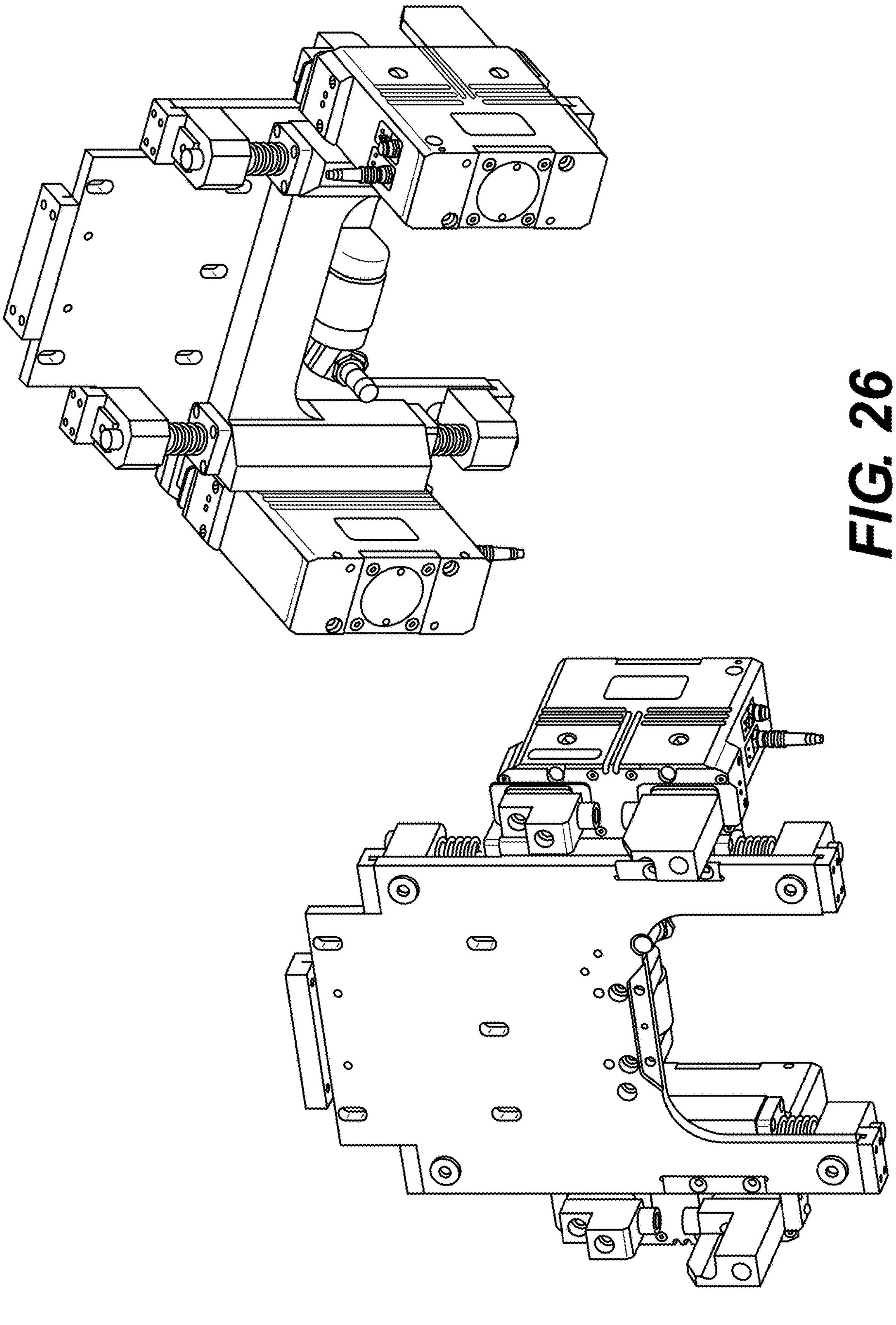
Figure 27:
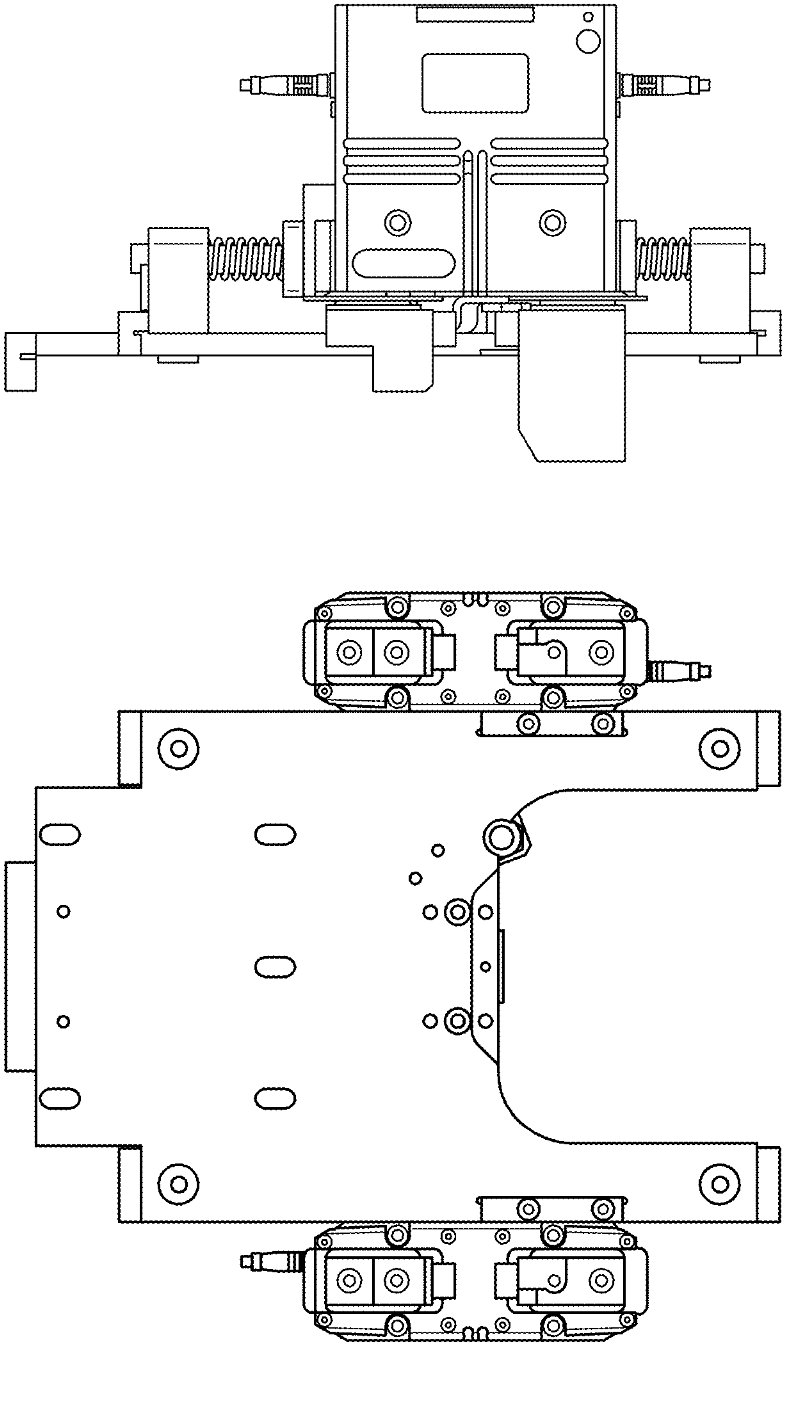
Figure 27:
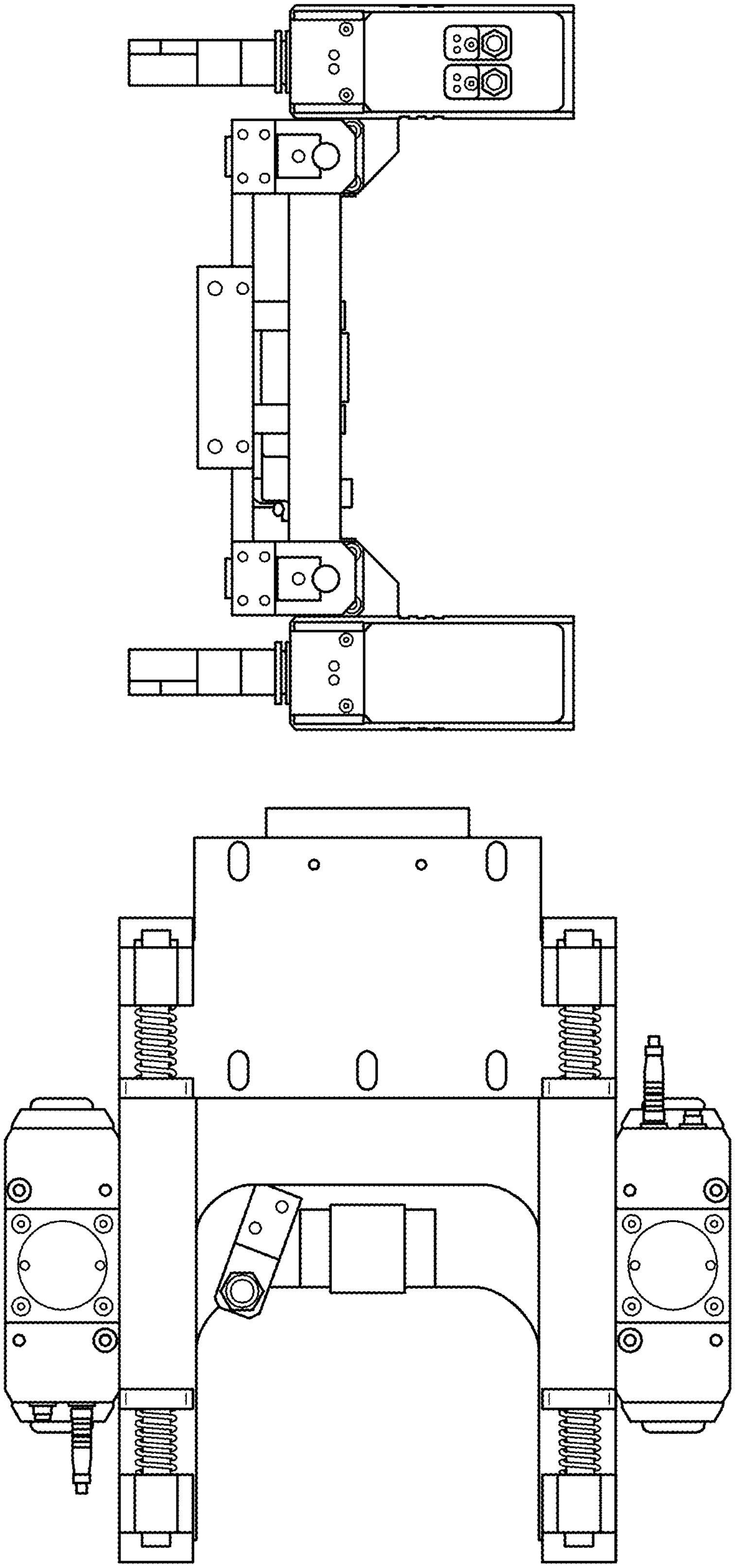
Figure 28:
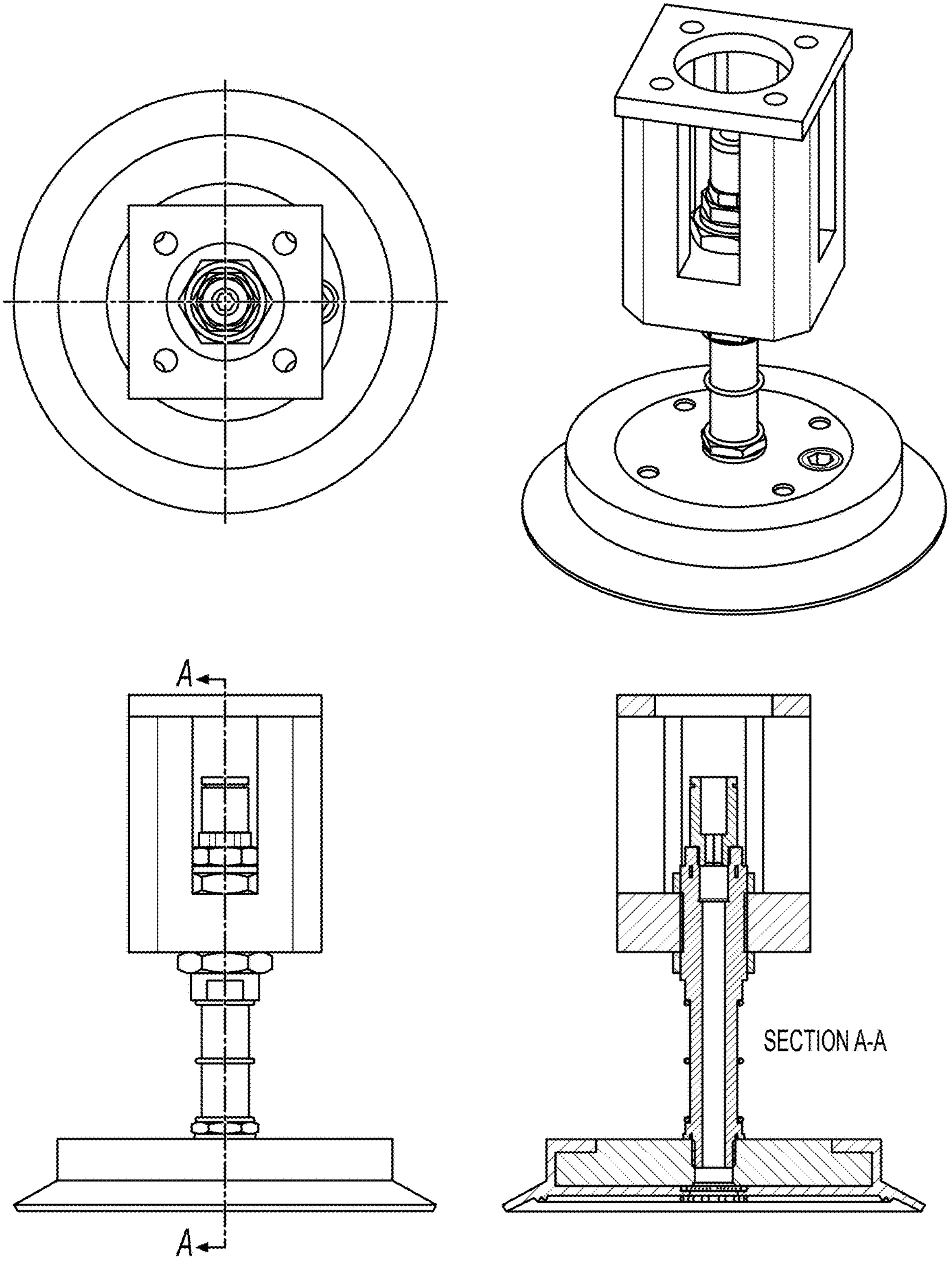
Figure 29:
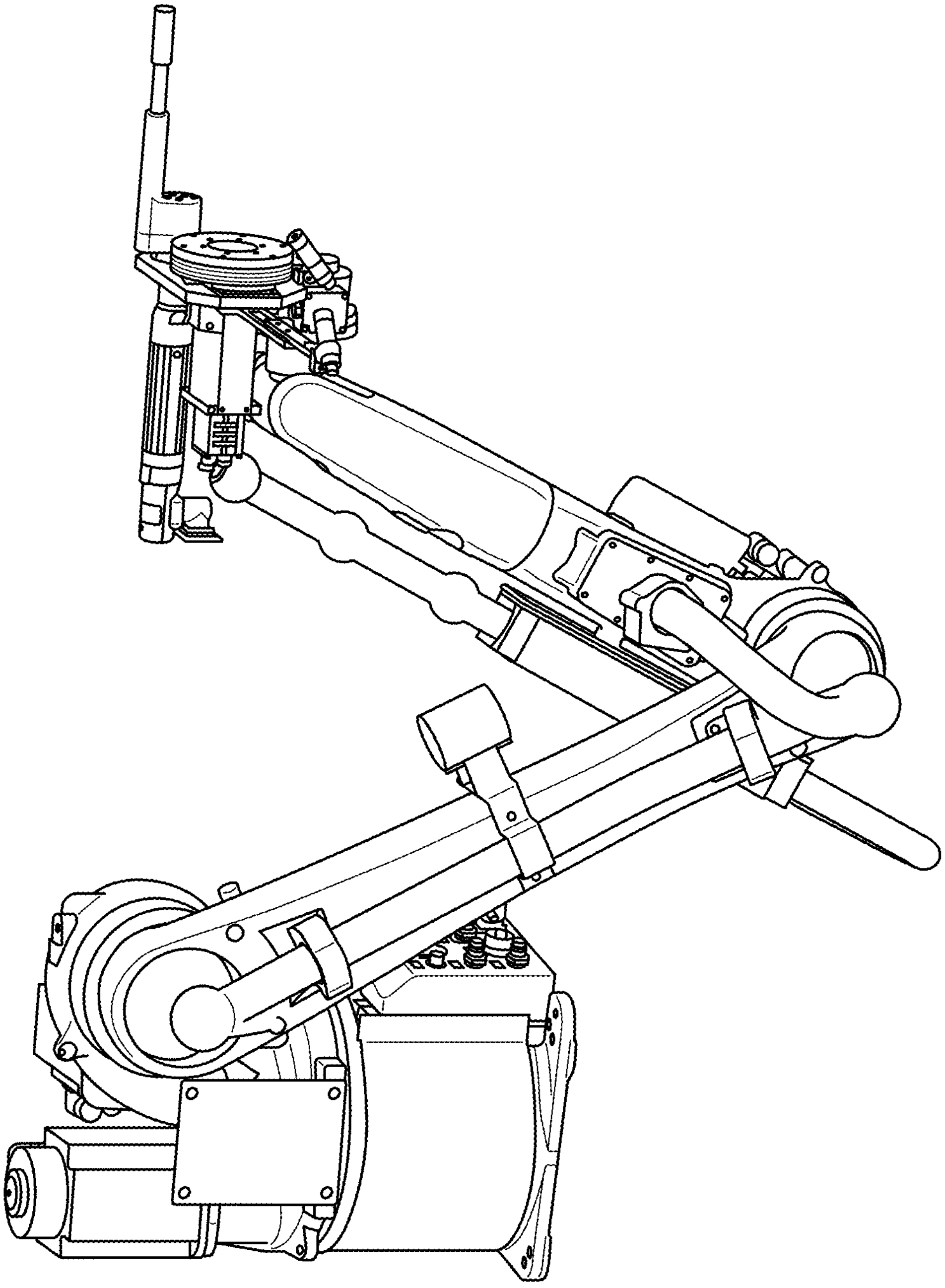
Figure 29:
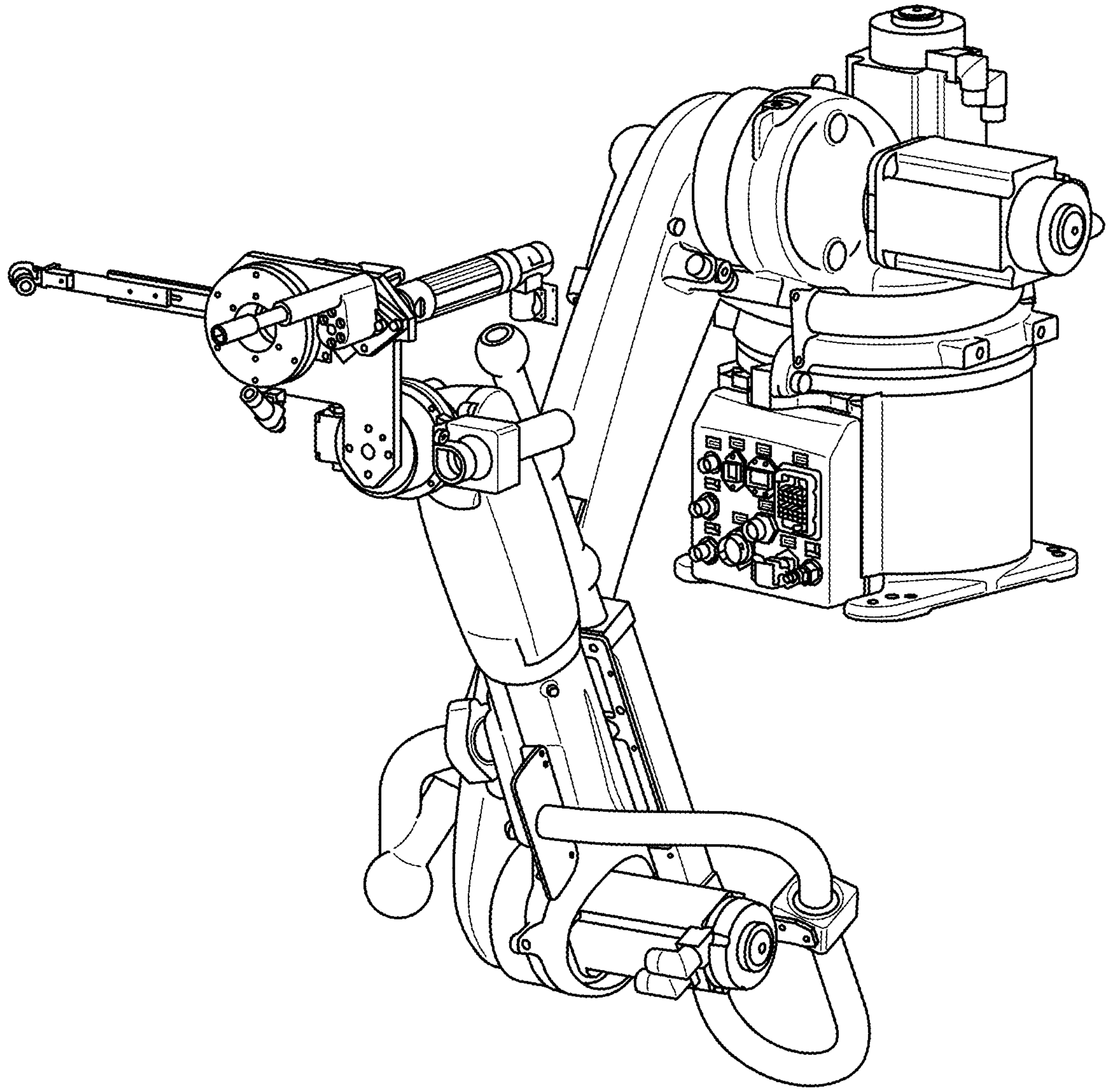
Figure 30:
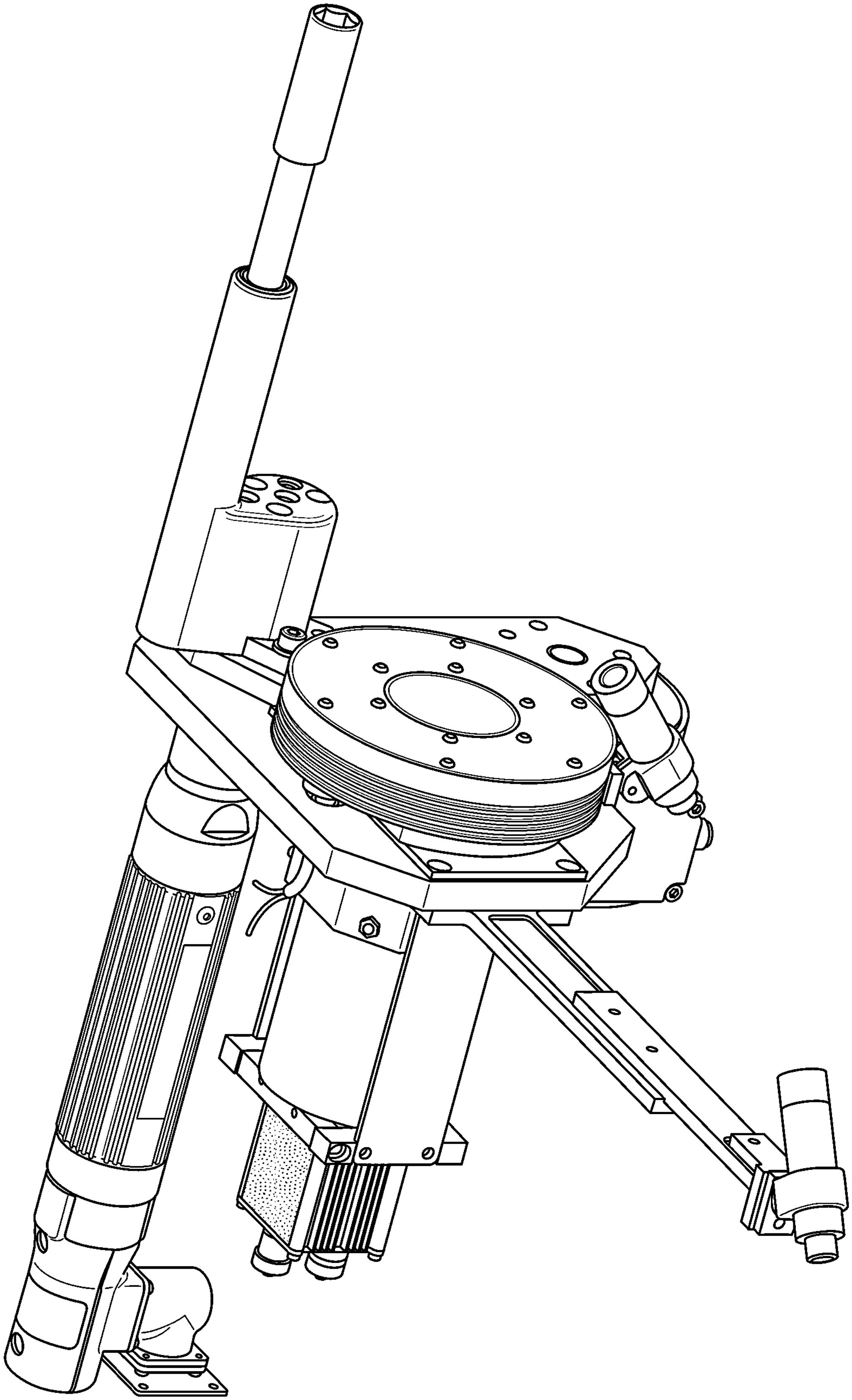
Figure 31:
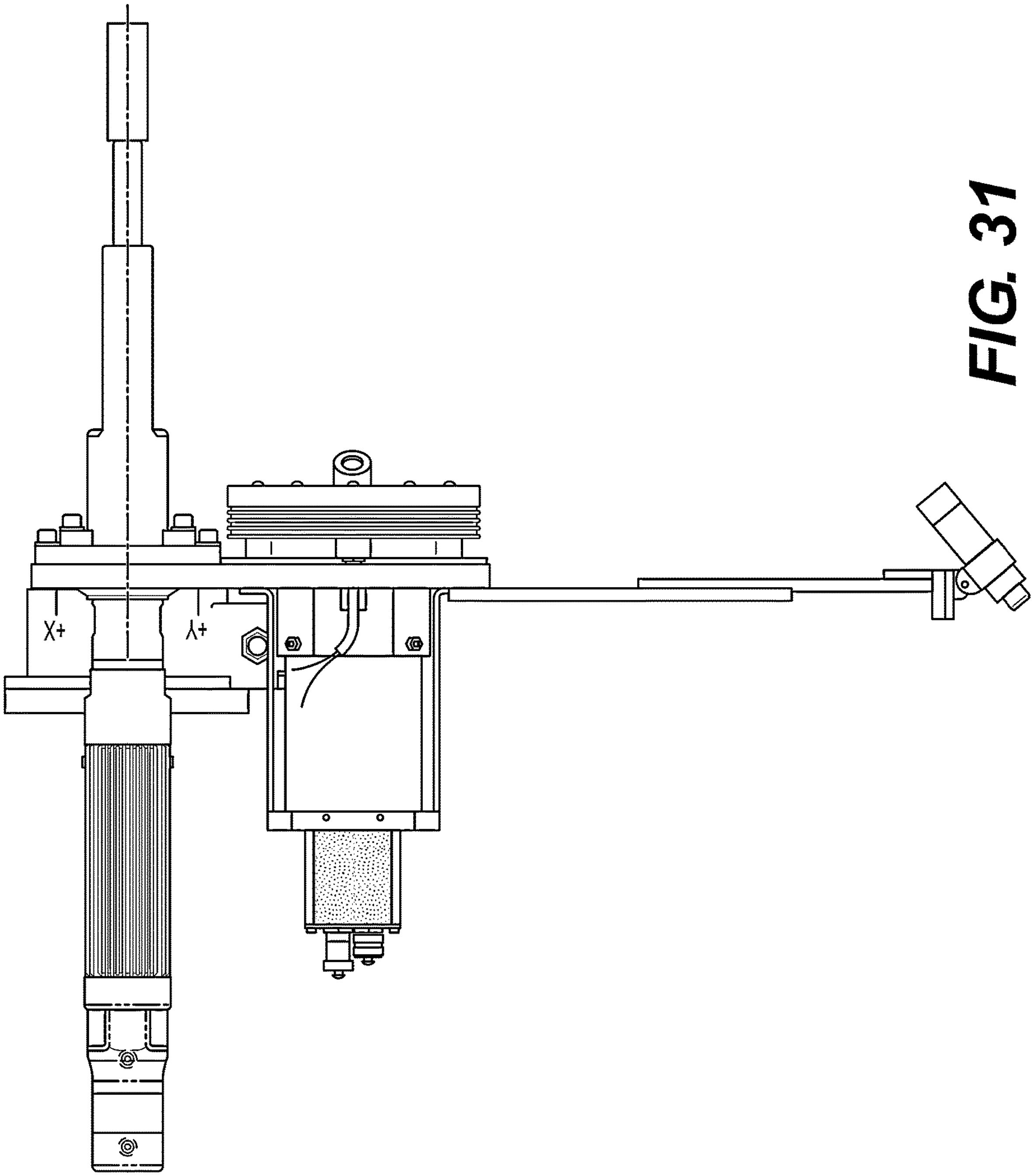
Figure 31:
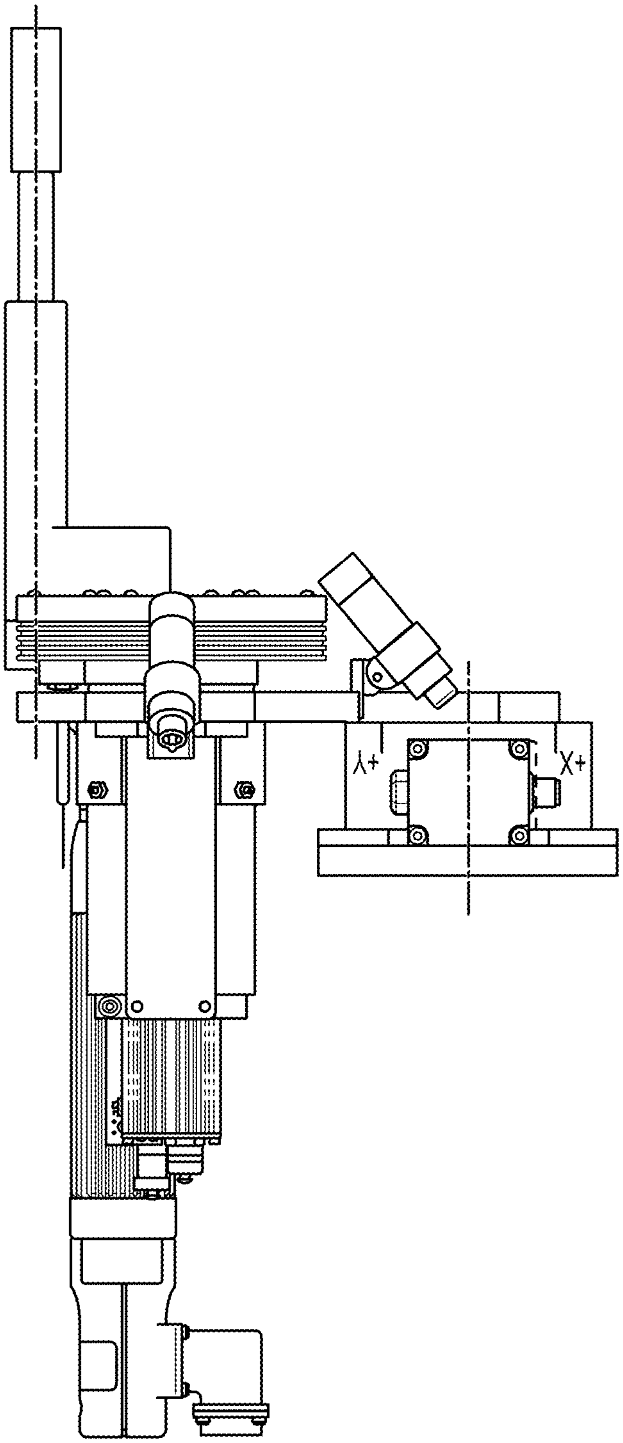
Figure 32:
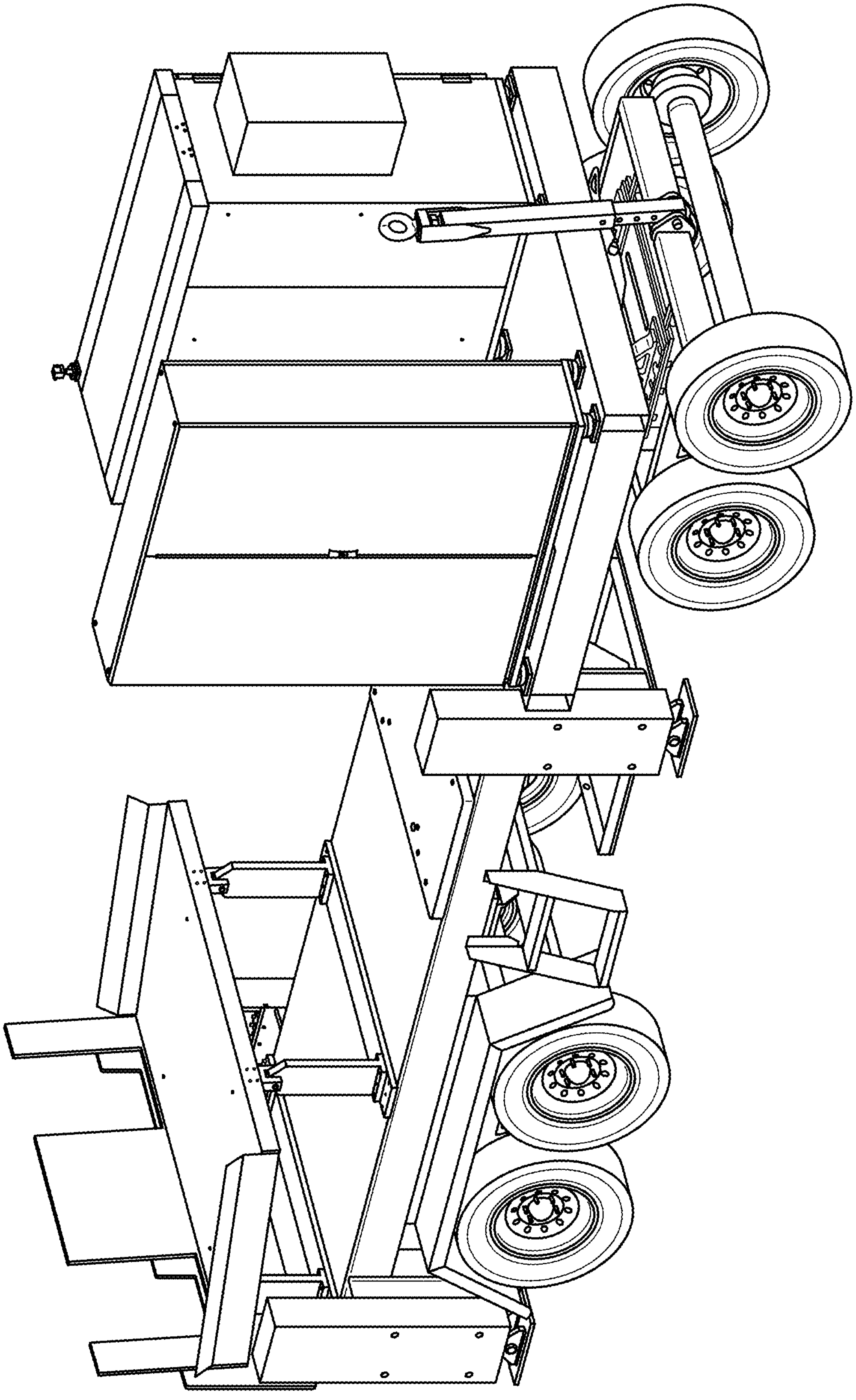
Figure 33:
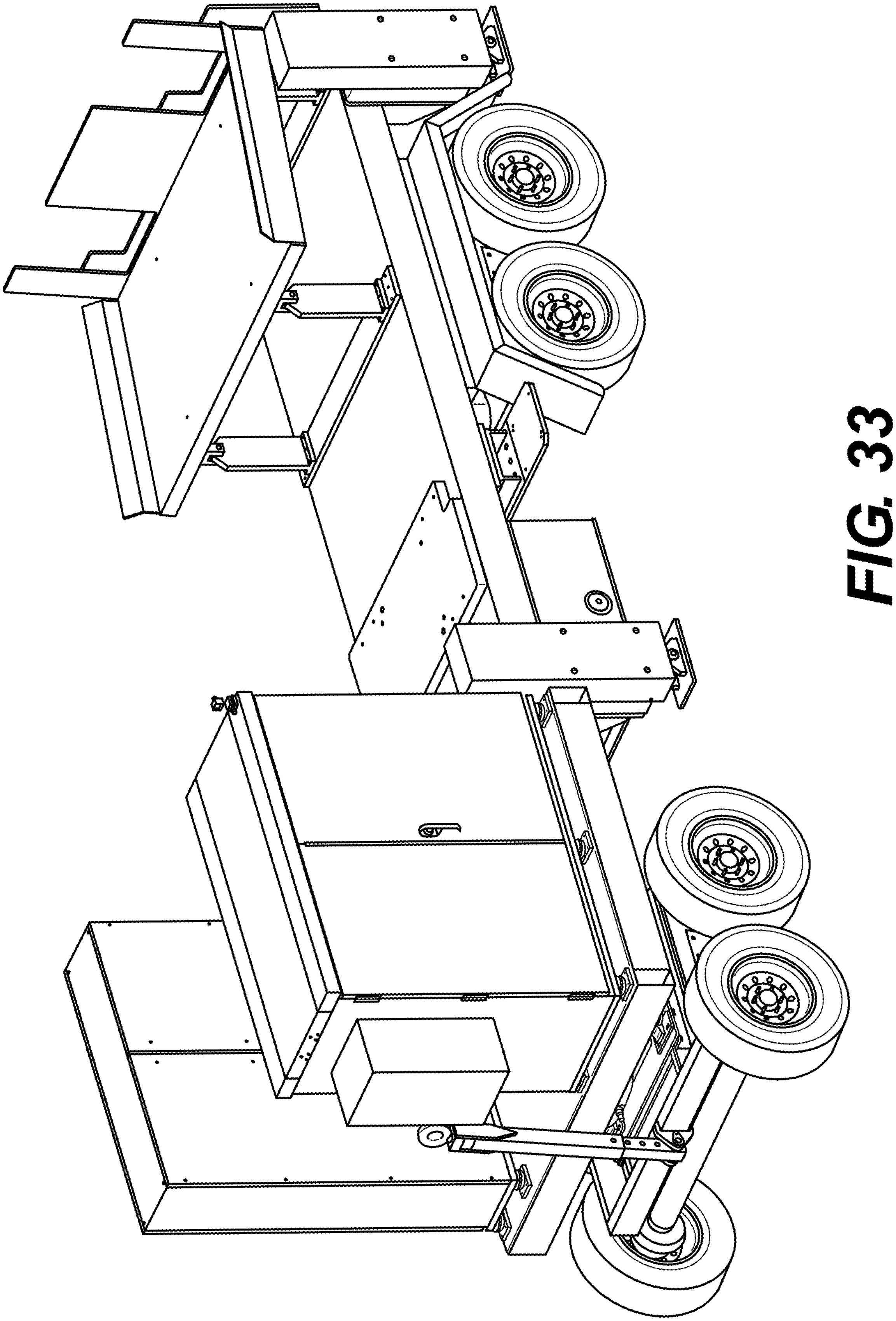
Figure 34:
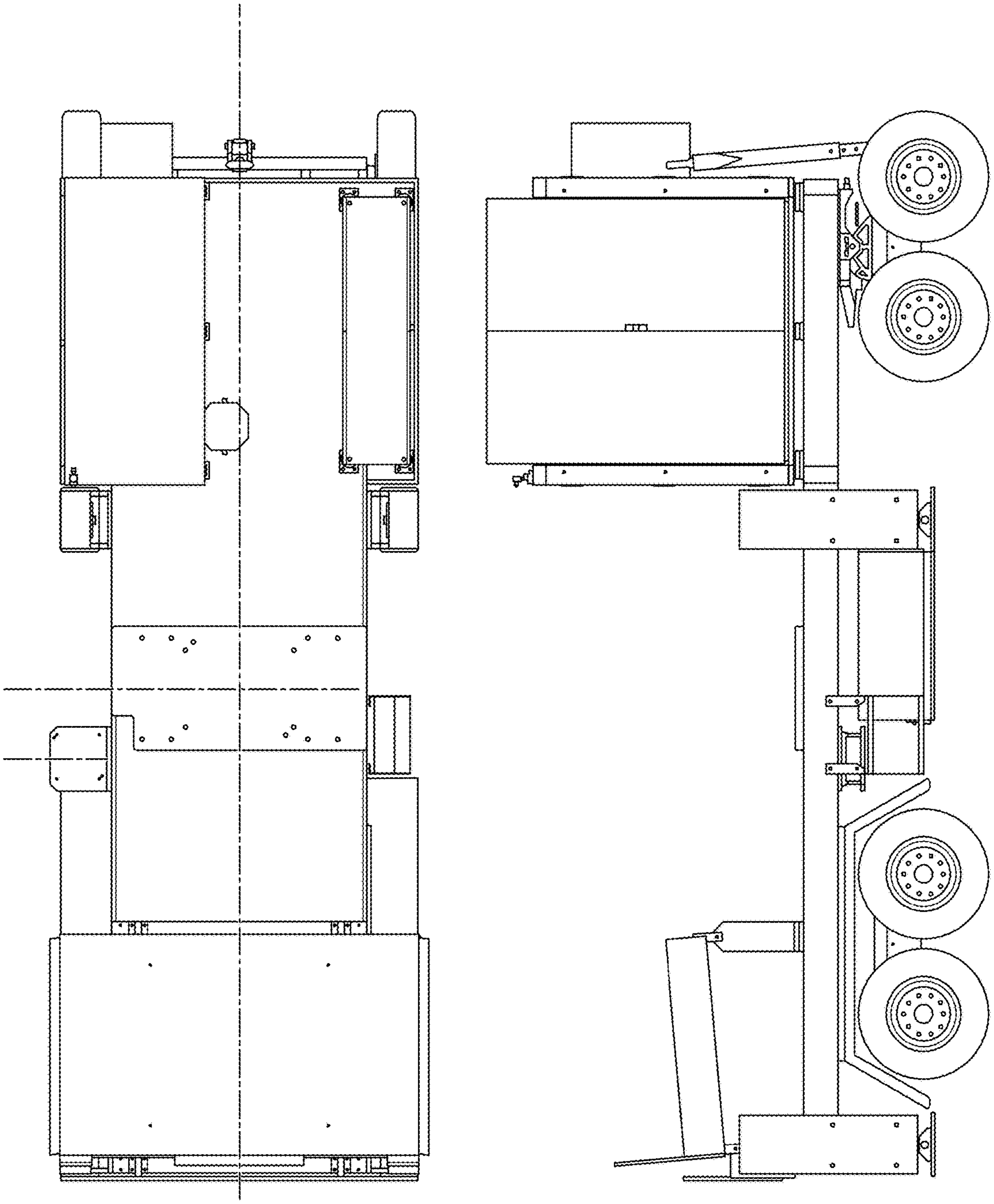
Figure 34:
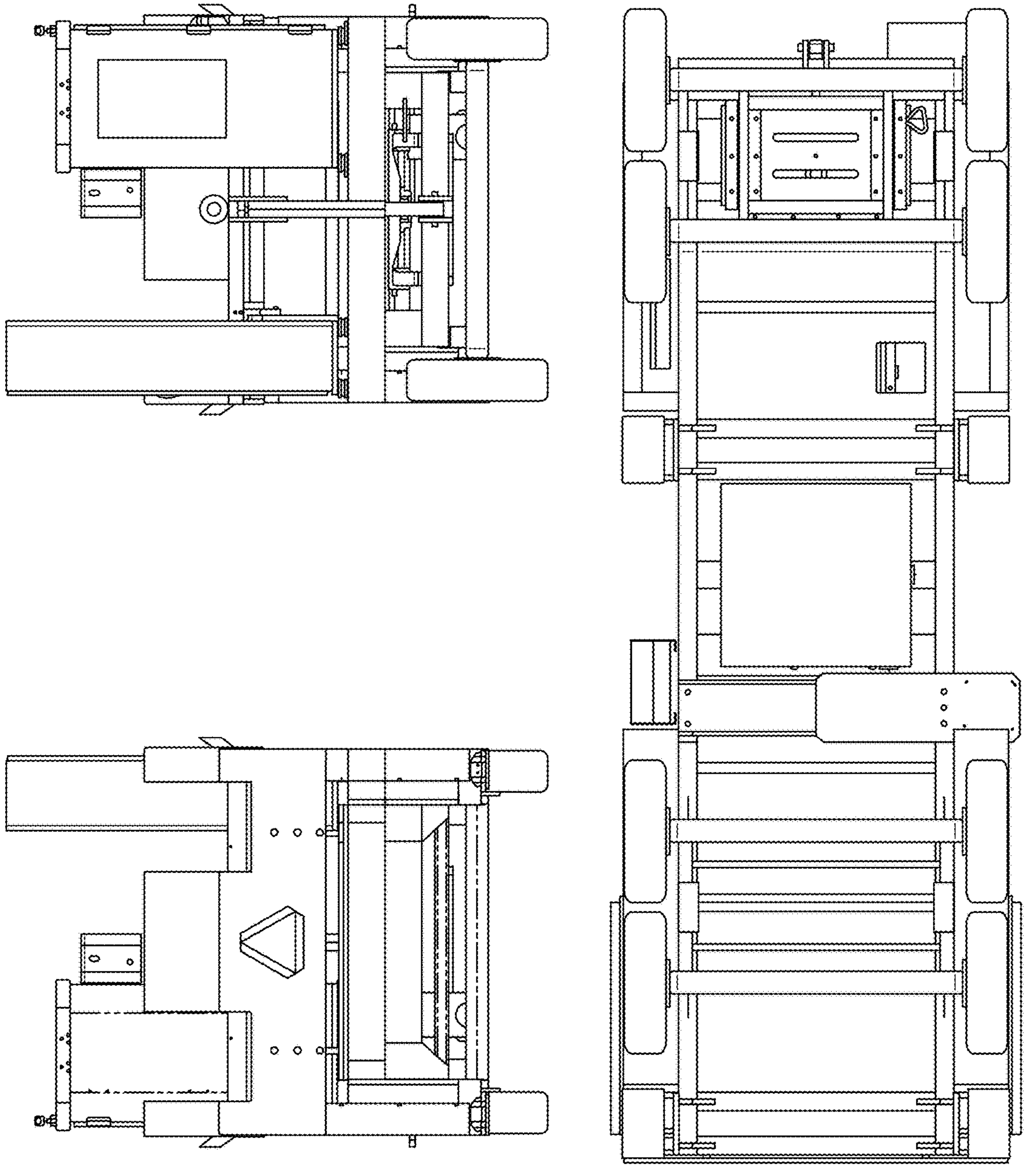

In some embodiments, as illustrated in FIG. 14, if module vehicles are used with the ground vehicle, the module vehicles may be exchanged with replenished module vehicles when all solar panels of the module vehicle are installed. Here, the computer vision process may be used to communicate with and to control an autonomous independent vehicle, such as a forklift, to bring additional solar panel boxes. Thus, the supply of solar panels may be replenished.

In the replenishment operation using the example of a forklift, the forklift (whether autonomous, remote controlled or manually operated) may be used to return empty boxes or containers of the solar panels to a waste area, remove straps, open lids, or cut away box faces from boxes being delivered, pick up boxes to correct rotation/orientation of the solar panels, or other tasks. Further, the forklift may be maintained near the ground vehicle to wait for the system to deplete the next box of solar panels. Thus, the forklift may manually or autonomously discard a depleted box, position a next box on the ground vehicle or the module vehicle, open box (including removing straps, opening lids, or cutting away box faces) and back away from the ground vehicle/module vehicle. As described, the replenishment may be autonomous, remote controlled, or manually operated, for example.

FIGS. 15-34 provide detailed illustrations of an example configuration for a system for installing solar panels according to an embodiment of the present disclosure.

Computer Vision and Artificial Intelligence (AI) Techniques

Computer vision and AI techniques may be used to determine a location where a solar panel can be installed along a mounting structure, such as a torque tube, according to some embodiments. The installation location of a panel may be based on the location of a previously installed panel. Some embodiments use the six degrees-of-freedom (6DoF) pose of the previously installed panel. The term "6DoF" represents six degrees of freedom, which are the three rotational axes (yaw, pitch, and roll) and the three translational axes (x, y, and z). An estimation of a 6DoF pose of a panel includes the position (x, y, z) in 3D-space of a point (or keypoint) on the panel, such as a corner of the frame or some other visual fiducial, and the rotational angles of the panel about the three Cartesian axes (rx, ry, rz). In some embodiments, computer vision or AI is used to estimate the 6DoF pose of the previously installed panel to determine where the next panel is to be installed along the torque tube. The next panel to be installed along the torque tube is typically some constant offset from the position (x y, z) of a keypoint of the previously installed panel with the same rotational angles (rx, ry, rz).

Estimation of 6DoF Pose for Panel Placement and Panel Pick

Although some embodiments described herein are directed to panel placement (for installation along, e.g., a torque tube), those embodiments rely on techniques that are also applicable to panel pick, e.g., from a storage location, such as a module box or cradle. For panel pick, as for panel placement, the 6DoF pose of a panel in question is determined. For panel placement, the panel in question may be a previously installed panel, as discussed above. By contrast, for panel pick, the panel in question may be a current (or outermost) panel (in a storage location) to be picked for installation. For panel placement, the 6DoF pose of the previously installed panel may be used to determine an (offset) location of the next panel to be installed along the torque tube, as discussed above. By contrast, for panel pick, the 6DoF pose of the current panel to be installed may be used to determine the pick point (usually the center point) of the panel to be picked. For panel pick, a challenge is to pick a panel such that the EOAT is centered with respect to the panel. This centering of the EOAT with respect to the picked panel ensures equal load distribution for the EOAT. For panel placement, as discussed above, the challenge is to install the next panel such that has a certain pose (typically: x, y plus panel width plus [e], z, rx, ry, rz) with respect to the previously installed panel. However, for both panel placement and panel pick, a goal of CV/AI is to determine the 6DoF pose of a panel in question. And the 6DoF pose can be determined by techniques and technologies based on techniques described herein.

In the following description, the term "computer vision" is used to refer to "classical" computer vision techniques and algorithms, and the term "artificial intelligence (AI)" is used instead of "machine learning (ML)" or "deep learning (DL)"

because the instant disclosure generalizes well to current and newly-developed technologies.

The term "image" is used to include not just camera images but also data and imagery from other types of sensors, such as time-of-flight sensors, LiDAR, or other sensors that image or scan a field-of-view (FoV); and terms "pre-processing" and "post-processing" may involve different hardware (e.g., computing devices, sensors) with respect to what is initially or subsequently processed.

Example Non-AI Methods for Pose Estimation

In some embodiments, the 6DoF pose is estimated using non-AI techniques. 6DoF pose of panels may be determined using different sensors (e.g., stereo cameras, LiDAR) and computer vision algorithms. These different approaches are described below as different pre-processing and post-processing methods with respect to the AI processing. These pre-processing and post-processing steps, on their own (without AI), may be combined to form a computer vision pipeline that can be used to determine 6DoF poses of panels.

Example AI Models and Inferences

Turning now to different types of AI models and inferences that are applicable for the determination of 6DoF pose of solar panels. AI-based inferences may be based on bounding boxes, segmentation, keypoints, depth, and/or 6DoF poses. Each of these different techniques is discussed in turn below.

Segmentation

Segmentation in AI refers to the process of dividing an image or a video into meaningful and semantically coherent regions. A goal of segmentation is to partition the visual data into distinct regions based on their shared characteristics, such as color, texture, or object boundaries. In computer vision, traditional segmentation techniques include methods like thresholding, region growing, edge-based segmentation, and clustering algorithms such as k-means or mean-shift. These methods rely on manual features and heuristics to segment images.

In AI, deep learning methods, particularly Convolutional Neural Networks (CNNs), have shown remarkable performance in segmentation tasks. Fully Convolutional Networks (FCNs), U-Net, Mask R-CNN, and DeepLab are popular architectures for semantic and instance segmentation. These models leverage their ability to learn and extract complex features from images, enabling accurate and efficient segmentation.

Different types of segmentation techniques can be used in AI including semantic segmentation and instance segmentation. Semantic segmentation involves labeling each pixel in an image or video frame with a corresponding class label. The output is a pixel-wise classification map where each pixel is assigned a semantic category or class label. Semantic segmentation focuses on capturing the semantic meaning of the scene and is used for scene parsing, object recognition, and high-level understanding. Instance segmentation goes beyond semantic segmentation and aims to separate and identify individual objects within an image. It assigns a unique label or identifier to each pixel belonging to a particular object instance. In instance segmentation, each object is segmented separately, allowing for precise delineation and separation of object boundaries. This technique is used for object detection, tracking, counting, and detailed object analysis. For purposes of the discussion below, the term "segmentation" refers to instance segmentation (unless noted otherwise).

In some embodiments, segmentation is used to determine a 6DoF pose of panels. With a panel segmentation as input, various computer vision algorithms can find pixel locations in an image of the four corners of the panel frame, locations that are then used as input for a Perspective-n-Point solver to determine 6DoF of the panel in 3D-space (or "world-space").

Figure 51:
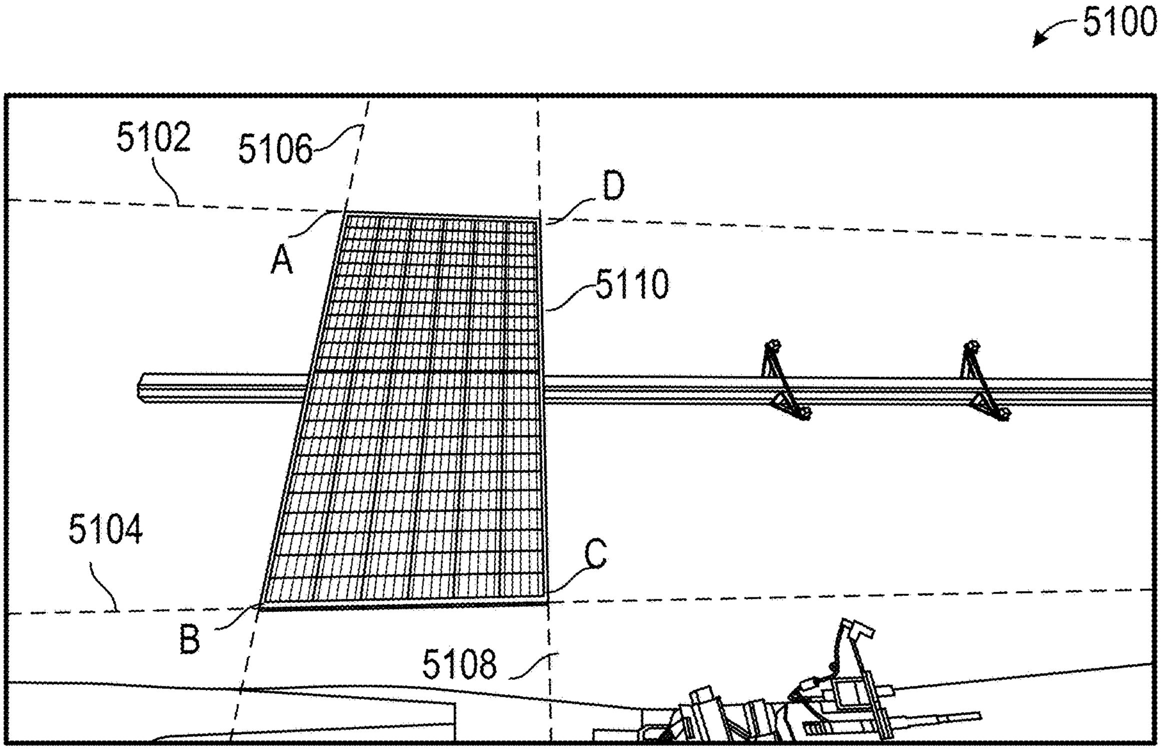
FIG. 51 shows an example application of Hough transforms for identifying corners of a solar panel, according to some embodiments.

In some embodiments, the pixel locations of the panel corners is determined, based on the segmentation, by one or more of a variety of computer vision techniques, such as Hough transforms, the Ramer-Douglas-Peucker algorithm, or some other computer vision post-processing. For instance, the Hough transform can yield four Hough lines that are fitted to the four edges of the segmentation which, in turn, correspond to the four edges of the panel. And the four intersections of the four Hough lines yield the four corners of the panel. FIG. 51 shows an example application 5100 of Hough transforms for identifying corners of a solar panel 5110, according to some embodiments. Intersection of the Hough lines 5102 and 5106 yield the corner A, intersection of the Hough lines 5102 and 5108 yield the corner D, intersection of the Hough lines 5104 and 5106 yield the corner B, and intersection of the Hough lines 5104 and 5108 yield the corner C.

In some embodiments, the Ramer-Douglas-Peucker algorithm is used to determine the pixel locations of the four panel corners. In some embodiments, the algorithm is constrained to yield a four-sided polygon approximation. For example, in OpenCV implementation of the algorithm—the ApproxPolyDP( ) function—the parameter epsilon can be optimized to yield a four-sided polygon approximation based on a binary search over epsilon, for instance. Other applicable computer vision algorithms, as recognized by those skilled in the art, may also be used for post-processing of the segmentation to find panel corners or other keypoints. In some embodiments, those keypoints, such as panel corners, is used as input for a Perspective-n-Point solver to determine the 6DoF pose of the panel.

In some instances, the above post-processing methods (e.g., Hough transforms, Ramer-Douglas-Peucker algorithm) that fit a single straight line along the lengthwise of the edge of the panel may yield an inaccurate corner location, either at the far half or at the near half of the panel. The reason is that the solar panel is not a perfectly rigid body. When installed on, for example, the torque tube, the panel is cantilevered on the tube, deflecting or deforming under its own weight. Accordingly, any approximation of the lengthwise edge by a single line may be inaccurate for one corner or another. To compensate for this inaccuracy, instead of fitting a single straight line, in some embodiments, two lines are fitted to the lengthwise edge(s) of the panel, one line for the far half and one line for near half of the panel. A Perspective-n-Point solver may then solve for 6DoF pose based on coordinates of panel corners (x, y, z) that depart from that of a perfectly rigid body (e.g., with z as the height variation due to the panel deformation).

Another post-processing method that may be especially well-suited for AI-based segmentation is one that analyzes the pixel intensities of the shadows between adjacent panels. AI-based segmentation may perform worse on images with multiple panels (as compared to images with a single panel). For example, for images with multiple panels, the segmentation of a panel in question may retreat into the interior of the panel (rather than coincide with the outer edge of the panel frame, as expected).

Such a discrepancy can be observed along the length of the panel in question that is near an adjacent panel. To compensate for this discrepancy, in some embodiments, the shadow between the panel in question and the adjacent panel serves as a visual fiducial from which to identify the true edge of the panel in question. The shadow between adjacent panels are largely consistent and distinct across different lighting conditions. In some embodiments, computer vision algorithms, such as binarization, thresholding, and Hough transforms, are used to identify the true edge of the panel in question.

Depth Estimation

In some embodiments, depth estimation is used to determine the 6DoF pose of panels. Depth estimation is the determination of the distance of a given object within a field-of-view (FoV) with respect to a sensor (e.g., camera, LiDAR, time-of-flight sensor).

Figure 52:
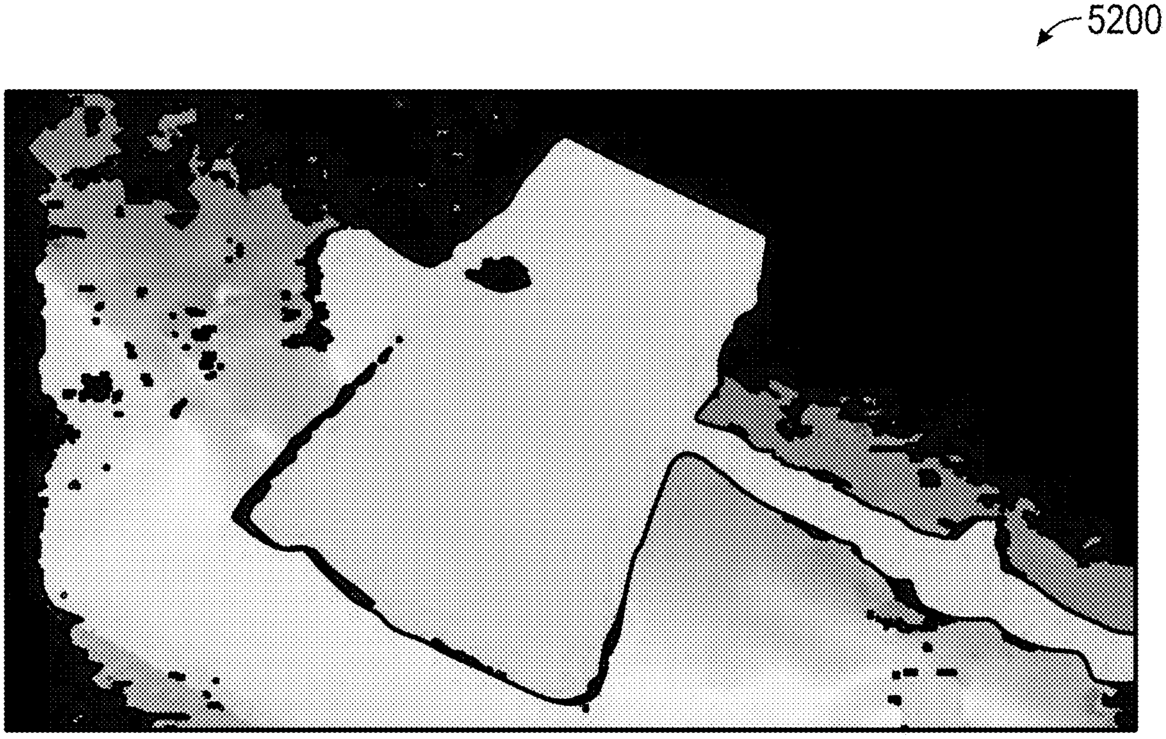
FIG. 52 shows an example application of segmentation, according to some embodiments.

Depth estimation can be understood as a sort of segmentation. The object in question is segmented or distinguished from a (more) distant background. So, the panel appears in (a disparity map (with computer vision) or depth visualization (with AI)) as a contiguous segmentation. FIG. 52 shows an example application 5200 of segmentation, according to some embodiments. The result of the segmentation can be used as input for the post-processing to find panel corners or other keypoints for purposes of the 6DoF pose estimation, as described above.

With AI, depth estimation can be performed using, for example, neural networks for monocular depth estimation (MDE). A comprehensive survey of state-of-the-art approaches to MDE is the following reference, incorporated by reference herein: J. Spencer, et al., The monocular depth estimation challenge, in Proceedings of the IEEE/CVF Winter Conference on Applications of Computer Vision (pp. 623-632) (2023).

With computer vision, depth estimation can be performed using two cameras (or stereo camera) to yield a disparity map based on correspondence points and the baseline distance between the two cameras. The disparity or perspectival discrepancy between the images from the two (stereo) cameras indicate the distances of objects from the cameras. With CV, depth estimation is problematic under certain lighting or surface conditions, such as texture-less regions and specular reflections on the panel. Conventional techniques, such as photo-consistency methods and active stereo (using IR structured light projections), can be employed to improve the accuracy of depth estimation. Multi-baseline stereo, involving three or more cameras (with multiple baseline distances between cameras), with trinocular or quadocular configurations, for instance, and associated algorithms (such as Semi-Global Matching and iterative matching algorithms) can also be employed to improve the resolution and accuracy of depth estimation. A comprehensive survey of state-of-the-art approaches to multi-baseline stereo is the following references, incorporated by reference herein: H. Hirschmuller, Stereo Processing by Semiglobal Matching and Mutual Information, in IEEE Transactions on Pattern Analysis and Machine Intelligence, vol. 30, no. 2, pp. 328-341, February 2008, doi: 10.1109/TPAMI.2007.1166; S. Patil et al., A Comparative Evaluation of SGM Variants (including a New Variant, tMGM) for Dense Stereo Matching. ArXiv, abs/1911.09800 (2019).

Whether with AI or CV, depth estimation (as a type of segmentation) uses the same post-processing (as described above) for purposes of locating panel corners in an image. For example, the determination of corner locations—whether by depth estimation or segmentation—can be corrected or refined (before used as input for a PnP solver) by what is called the "two-pass homography" post-processing, described below.

Keypoint Detection

Some embodiments use a type of AI-based inference called keypoint detection to determine the 6DoF pose of panels. Keypoint detection is a fundamental task in computer vision and AI that includes identifying and localizing specific points or landmarks in an image or a video. These keypoints represent distinctive features in the visual data, such as corners, edges, or other regions of interest. The goal of keypoint detection is to accurately locate and describe these keypoints, enabling various applications like object recognition, tracking, pose estimation, and image alignment.

Keypoint detection typically includes the following steps or algorithms. Preprocessing: The input images or video frames are typically preprocessed to enhance their quality and reduce noise. Common preprocessing steps include resizing, normalization, and grayscale conversion. Various algorithms can be used for keypoint detection, depending on the specific requirements and characteristics of the data. Some embodiments use corner detection: algorithms such as Harris Corner Detector or Shi-Tomasi Corner Detector, to identify corners in an image based on local intensity variations. Some embodiments use scale-space extrema detection including methods, such as Difference of Gaussians (DoG) or Laplacian of Gaussian (LoG), to detect keypoints at different scales by looking for local extrema in the image's scale-space representation. Some embodiments use interest point detectors that include algorithms, such as SIFT (Scale-Invariant Feature Transform) or SURF (Speeded-Up Robust Features), to identify keypoints based on local image gradients and their responses to different scales and orientations. Some embodiments use deep learning-based methods, such as Convolutional Neural Networks (CNNs) that can be trained to directly detect keypoints by learning from annotated datasets. Models like DenseNet, CornerNet, or OpenPose employ deep learning techniques for keypoint detection. Once the keypoints are detected, their precise locations within the image need to be determined. This process may include refining the initial detection by using techniques like sub-pixel interpolation or optimization algorithms to increase localization accuracy.

Keypoints may be the four corners of the solar panel frame, as discussed above. Keypoints may also be any visual fiducial afforded by a single panel, such as the common grid pattern, as discussed below. Keypoints may also be points on the solar panel, such as the center point.

As for segmentation models/inferences, keypoint-detection models/inferences can use their own computer vision methods of post-processing. For example, a Combination Of Shifted Filter Responses (COSFIRE) filter may be optimized for pattern recognition of a corner, distinguishing it from the background. A keypoint-detection model may yield a rough region-of-interest (ROI) for input into the COSFIRE filter which, in turn, produces a more fine-grained corner detection.

Other applicable computer vision algorithms and techniques, as recognized by those skilled in the art, may also be used for post-processing of the keypoint detection to find panel corners for the purposes of 6DoF pose estimation.

Bounding Boxes

Some embodiments use bounding boxes, another AI-based inference technique, to determine the 6DoF pose of panels. Bounding box inference in AI refers to the process of predicting and localizing objects in an image or a video by drawing a rectangular bounding box around them. The bounding box provides an approximation of the object's location and extent within the visual data. This technique is widely used in object detection, localization, and tracking tasks. Bounding box inference typically relies on an object detection model that has been trained using machine learning algorithms. Popular object detection models include Single Shot MultiBox Detector (SSD), You Only Look Once (YOLO), and Faster R-CNN (Region-based Convolutional Neural Network). These models are designed to detect and classify objects in an image or video frames. The object detection model is trained on a labeled dataset, where each object of interest is annotated with a bounding box that tightly encloses the object. The training data also includes the corresponding class labels for each object category. During training, the model learns to identify objects and predict their bounding boxes based on visual features extracted from the input data. During the inference phase, the trained object detection model takes an input image or video frame as input and processes it to detect objects and predict their bounding boxes. The model analyzes the visual features and makes predictions about the presence, class, and location of objects within the image. The object detection model predicts the coordinates of the bounding box for each detected object. The bounding box is typically represented by four values: the x-coordinate and y-coordinate of the top-left corner, as well as the width and height of the box. These values are used to draw a rectangle around the object, indicating its estimated location in the image or frame. Since multiple bounding box predictions can overlap or enclose the same object, a post-processing step called non-maximum suppression is often applied. Non-maximum suppression aims to remove redundant or duplicate bounding boxes, ensuring that only the most accurate and confident bounding boxes for each object remain. This step helps eliminate duplicate detections and improves the precision of the bounding box inference.

In some embodiments, bounding boxes is used to identify a given solar panel by bounding or encompassing its entirety within an image. Bounding boxes can be understood as a special case of keypoint detection for the purposes of determining the 6DoF pose of panels. The reason is that, given the typical top-down perspective view, two corners of the bounding box may likely coincide with two physical corners of the panel frame. Specifically, the top-right and bottom-left corners of the bounding box coincide with the far-right and near-left corner of the panel frame. Such a correspondence allows bounding-box inferences to be interpreted as keypoint detection (of two corners). Such a correspondence allows the substitution of bounding-box models for keypoint-detection models in approaches that do not require the identification of all four panel corners, a substitution of models that may be advantageous for training and/or inferencing.

Whether as keypoint detection or as bounding boxes, AI-based inferences for determining keypoints, such as panel corners, can use the same post-processing (such as the "two-pass homography" algorithm described below) for purposes of determining the 6DoF pose of a panel.

Six Degrees-of-Freedom

Six Degrees-of-Freedom (6DoF) pose estimation refers to the task of estimating the position and orientation of an object in 3D space using machine learning models. The term "6DoF" represents six degrees of freedom, which are the three rotational axes (yaw, pitch, and roll) and the three translational axes (x, y, and z). Pose estimation is essential in various computer vision applications, such as robotics, augmented reality, and object tracking, where accurate knowledge of an object's position and orientation is critical.

Some embodiments use AI models for 6DoF pose estimation. The AI models can be categorized into two main types: feature-based methods and direct regression methods.

First, feature-based methods involve extracting keypoints or features from the object or scene and matching them between the 3D model and the input image. The pose is then estimated based on the spatial relationship between the matched 3D-2D feature correspondences. Feature extraction and matching can be done using traditional computer vision techniques or deep learning-based methods. Traditional feature-based methods use techniques like SIFT (Scale-Invariant Feature Transform), ORB (Oriented FAST and Rotated BRIEF), or SURF (Speeded-Up Robust Features) to detect and match keypoints between the 3D model and the 2D image. RANSAC (Random Sample Consensus) or PnP (Perspective-n-Point) algorithms are then used to estimate the 6DoF pose from the matched correspondences. In deep learning-based feature-based methods, instead of using handcrafted features, deep learning models like CNNs can be used to learn feature representations directly from the input image. PoseNet and PoseCNN are examples of deep learning-based feature-based methods that predict the 6DoF pose using CNNs.

Second, direct regression methods directly predict the 6DoF pose parameters (translation and rotation) from the input image, bypassing the need for feature extraction and matching. CNN-based regression models use CNN architectures to directly regress the 6DoF pose parameters from the input image. The network takes the image as input and outputs the pose values as continuous numbers. Models like DeepIM and PVNet are examples of CNN-based regression methods. Some hybrid approaches combine feature-based and direct regression techniques. They use CNNs to predict initial pose estimates, and then refine the pose using feature-based methods to achieve higher accuracy.

AI models for 6DoF inferences, if sufficiently accurate, may be used (without corrective post-processing) to determine 6DoF pose of solar panels. However, if 6DoF models are not sufficiently accurate, then those models may still provide information that can be interpreted in terms of other sorts of inferences, such as segmentation, keypoint detection, and bounding boxes, which can be subsequently corrected or refined by post-processing. For example, an initial (coarse) 6DoF estimation of panel pose may serve as rough identification of corners for the purposes of keypoint detection or bounding-box inferences. An initial 6DoF pose estimation may also serve to (roughly) identify or segment a panel from its background, for instance.

To summarize, described above are different types of AI models and inferences that are applicable for determining the 6DoF pose of solar panels. The AI models may be zero-shot, one-shot, or a few-shots, and may be trained differently, using real images or synthetic images, or using supervised learning or unsupervised learning, for instance.

In some embodiments, each AI model or inference uses its own methods of post-processing (e.g., analyzing shadows between adjacent panels, filters). In some embodiments, different AI models/inferences use a same method of post-processing (e.g., "two-pass homography" described below).

The AI models may be combined such that the output of one model is used as input for another model. For example, a first model (e.g., YOLO) outputs bounding boxes which are, in turn, used as input for second model (e.g., YOLO, SSD, RCNN, SAM) for segmentation. A single type of model can be used twice with the second instance of the same model taking the output of the first instance as input. For example, YOLO for bounding boxes may be used as input for YOLO for keypoint detection. The AI pipeline may comprise any plurality or ensemble of AI models. Ensemble learning in machine learning refers to the technique of combining multiple individual models, called base models or weak learners, to form a more powerful and accurate model known as an ensemble model. The main idea behind ensemble learning is that by aggregating the predictions of multiple models, the ensemble can make more reliable predictions than any individual model alone. There are several ensemble methods used to combine the predictions of base models. Base models are the individual models that form the ensemble. They can be any machine learning algorithm, such as decision trees, random forests, support vector machines, neural networks, or any other model. Each base model is trained on a subset of the training data or with some variations introduced to create diversity among the models. For example, in voting-based ensembles, each base model independently makes predictions, and the final prediction is determined based on majority voting (for classification problems) or averaging (for regression problems) among the predictions. Bagging (Bootstrap Aggregating) involves training multiple base models on different random subsets of the training data with replacement. The final prediction is obtained by averaging (regression) or voting (classification) the predictions of individual models. Boosting algorithms, such as AdaBoost, Gradient Boosting, or XGBoost, train base models sequentially, where each subsequent model focuses on the instances that previous models struggled with. The predictions of all models are combined to form the final prediction, often by weighted voting. Stacking combines the predictions of multiple base models by training a meta-model that learns to make predictions based on the outputs of the individual models. The base models' predictions are used as features, and the meta-model is trained on this augmented dataset.

The strength of an ensemble lies in the diversity among its base models. Diversity is achieved through various means, such as using different algorithms, varying the model architectures, training on different subsets of the data, or introducing randomness during training. Diverse models make different types of errors, and when combined, they can compensate for each other's weaknesses, leading to improved overall performance. Ensembles often outperform individual models, as they can capture different aspects of the data and combine their strengths to make more accurate predictions. Ensembles are typically more robust to noise and overfitting compared to individual models, as errors made by some models can be compensated for by others. Ensembles can generalize to unseen data by reducing the impact of individual models' biases and errors, leading to better performance.

Described above are similarities or overlapping applicability among different types of AI models/inferences, allowing one type of model/inference to be interpreted as a special case of another (more general) type of model/inference. Such a generalizability is in virtue of the particular characteristics of the imaged scene in the use-case of the instant invention. Conversely, these different types of models/inferences admit to the same post-processing (e.g., the "two-pass homography" algorithm) is in virtue of their generalizability.

Described below are ways different AI models/inferences can be combined with different computer vision algorithms. Computer vision algorithms may be integrated within the AI pipeline as post-processing or as pre-processing. Computer vision algorithms may also be integrated within the AI pipeline based on an architecture that allows for a deeper complementarity between computer vision and AI, taking advantage of the strengths of each. Computer vision algorithms may also be combined on their own, without using AI.

Parenthetically, the disclosed deeper complementarity between CV and AI exemplifies what O'Mahony et al. (2020) characterized as "mixing hand-crafted approaches with [deep learning] DL for better performance." As they observe, "[t]here are clear trade-offs between traditional CV and deep learning-based approaches. Classic CV algorithms are well-established, transparent, and optimized for performance and power efficiency, while DL offers greater accuracy and versatility at the cost of large amounts of computing resources." However, CV and AI/DL can be fruitfully combined in applications where DL is (still) not yet well established (e.g., 3D vision), as O'Mahony et al. observed. See N. O'Mahony et al., Deep learning vs. traditional computer vision, in Advances in Computer Vision: Proceedings of the 2019 Computer Vision Conference (CVC), Springer Nature Switzerland AG, Volume 11 (pp. 128-144) (2020).

Whether as post-processing or pre-processing, whether as part of a deeper integration with AI or as a self-contained computer vision pipeline without AI, computer vision algorithms rely on invariant structures that are discernible across different images. Such invariant structures may be attributed to physical structures, such as grid patterns formed by photovoltaic cells and their electrical connections. Such invariant structures may also be attributed to the immaterial structure of illumination, such as the shadows cast between adjacent solar panels as a sort of negative space. Whether physical or immaterial, whether as positive or negative space, the invariant structures that underpin CV algorithms provide consistent visual patterns that can be analyzed for their semantic content.

Post-Processing with the "Two-Pass Homography" Algorithm

A post-processing that compensates or corrects for the inaccuracies of (AI-based or computer vision-based) segmentation is referred to as the "two-pass homography" (TPH) algorithm. The algorithm relies on regular visual patterns or fiducials on the solar panel, such as the grid pattern. The grid pattern (or other visual fiducials) can be used to compensate/correct for inaccuracies in the segmentation because it provides reference points by which the pixel locations of panel corners can be deduced indirectly through homography transforms. In some embodiments, the TPH algorithm includes the following steps:

(1) Using a panel segmentation as a mask, filter out the background in an image (leaving only the foregrounded panel).
(2) Identify grid intersections in masked panel from (1) as "corners" using the Shi-Tomasi algorithm.
(3) Use the "corners" from (2) to compute homography matrix $H_1$.
(4) Based on $H_1$ from (3), determine where grid intersections from (2) should be in millimeter-space (described below).
(5) Determine homography matrix $H_2$ to transform grid intersections from (2) in image-space to their locations in millimeter space in (4).
(6) With inverse of $H_2$ from (5), back-project corners in millimeter space to image-space.

Note that the term "corners," a term of art in computer vision, refers to (roughly) points of interest in which intensity gradients are maximum in all directions. "Corners" (or italicized corners) is to be distinguished from physical corners (of, say, the panel frame).

For (1), the filtering operation may be as simple as a binary AND between the mask and the raw image.

Figure 53:
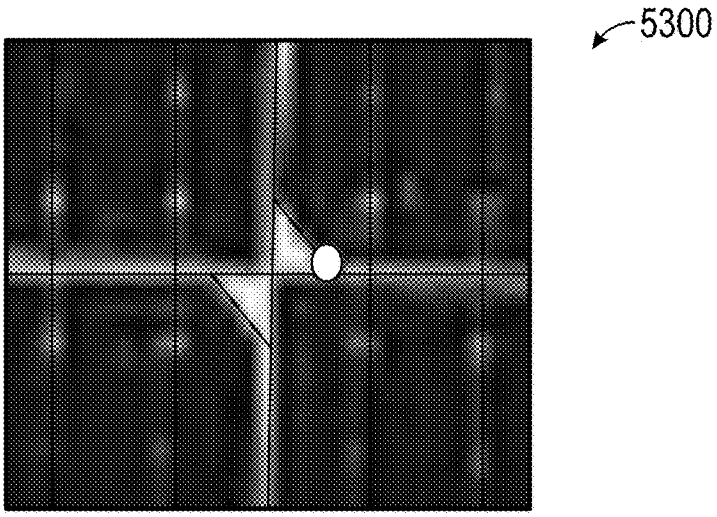
FIG. 53 shows an example application of corner detection algorithm, according to some embodiments.

For (2), other corner-finding algorithms (e.g., Harris-Stephens algorithm) may be used. Note that the grid intersections or "corners" found in (2) may not coincide perfectly with the intersection of grid lines. The reason is that the grid intersections may comprise various shapes (e.g., diamond, two triangles with common vertex) with gradient intensities that result in an off-centered "corner" as detected by the corner-detection algorithm, an example (5300) of which is shown in FIG. 53. However, the (random) off-centeredness of the detected "corners" cancels out, as it were, with increasing number of detected "corners" as input for the homography computation. In FIG. 53, the more pronounced, thicker grid lines (sometimes referred to as "major" grid lines) are useful for the TPH algorithm. "Major" grid lines can be distinguished from (fainter) "minor" grid lines using various computer vision algorithms, such as Gaussian blur with a kernel size of, say, 5.

In some embodiments, AI models may also be used to find grid intersections. AI models may use as input the raw image or the projected (or warped) image based on the ("first-pass") homography matrix $H_1$. In the $H_1$-space, the panel is projected to an approximate top-view. In this view, because perspectival variations are minimized, the AI model may be trained more easily. However, if the AI model takes as input the raw image, and if the inference yields all the grid intersections, then the "two-pass homography" algorithm reduces to a "single-pass" algorithm. The reason is that, with all the grid intersections detected by the AI model, the association in (4), as discussed below, reduces to simple enumeration (i.e., relative positions of grid intersections are identical).

For (3), the ("first-pass") homography matrix $H_1$ may yield a projection of the panel that is not perfectly square in "millimeter-space." The term "millimeter-space" refers to the 2D projective space in which the four (physical) corners of the solar panel have the following (x, y) coordinates: (0,0), (0, L), (W, 0), (W, L), where W and L are the width and length, respectively, of the solar panel. However, homography matrix $H_1$ should be accurate enough to allow an association (in $H_1$-space) of grid intersections found in (2) to where they should be in millimeter-space.

For (4), that association (in $H_1$-space) may be based on Euclidean distance (e.g., a fraction of the shortest cell dimension, such as width) or some other measure. For example, an Euclidean distance of a fraction of the shortest cell dimension, such as cell width, may ensure that the association (between grid intersections found in (2) and where they should be in millimeter-space) is unique. Too large of an associative Euclidean distance (e.g., greater than approximately half the width or height of individual cells) may result in non-unique ambiguous associations or associations that implicate an adjacent panel.

For (5), the ("second pass") homography matrix $H_2$ is recalculated based on more accurate (associated) grid-intersection locations in millimeter-space, as determined in (4).

For (6), the more accurate homography matrix $H_2$ is used to back-project the corners with coordinates (0,0), (0, L), (W, 0), (W, L) in millimeter space to image-space, shown in FIG. 53 as crosshairs.

Figure 54:
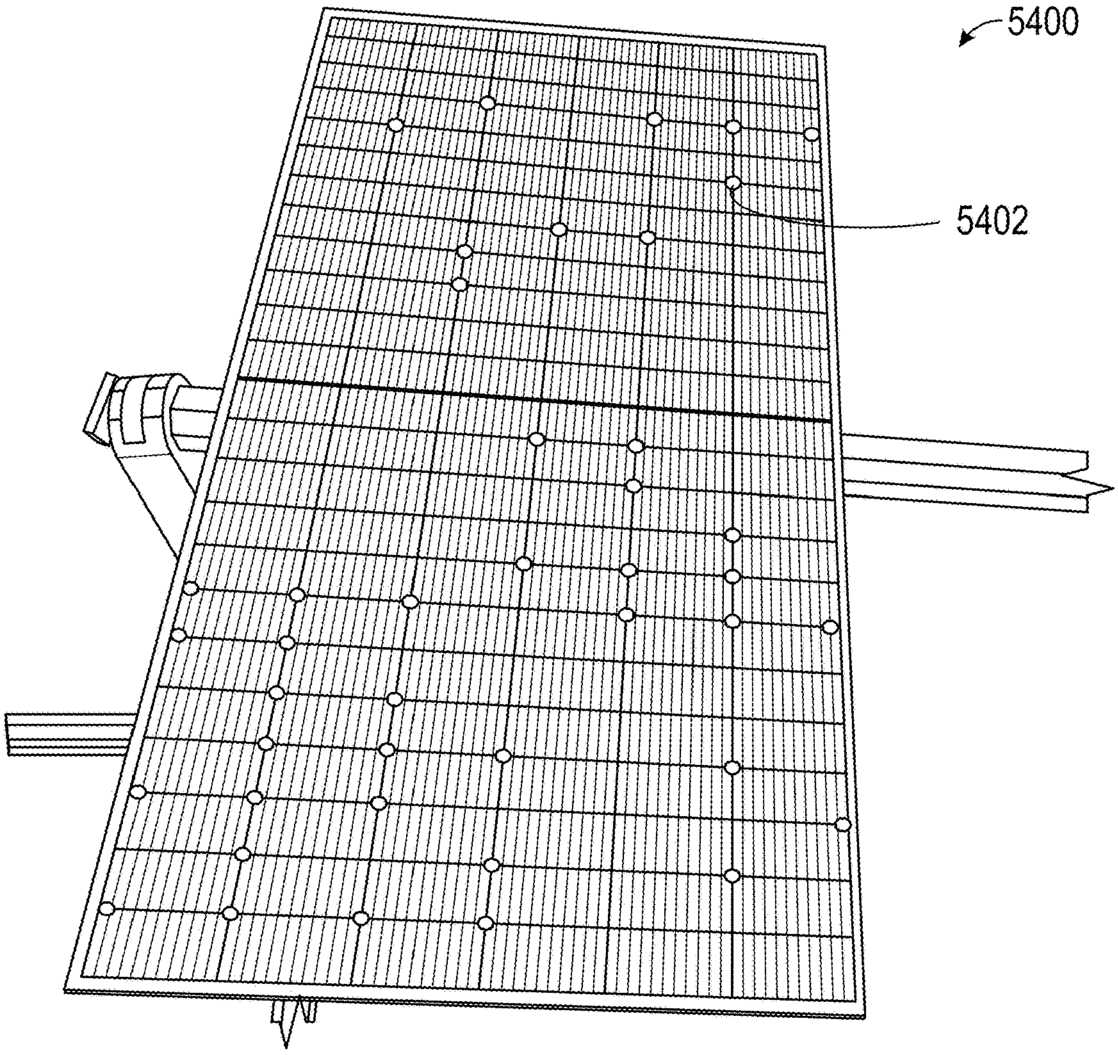
FIG. 54 shows grid intersections that can be detected using a two-pass homography algorithm, according to some embodiments.

FIG. 54 is a schematic diagram of detection 5400 of grid intersections 5402 using the two-pass homography algorithm described herein, according to some embodiments.

Some embodiments use a form of the TPH algorithm that is generalized beyond grid intersections for any panel features as visual fiducials, as follows:

1. Estimate in image-space the four corners of the panel, $k_i$.
2. Find homography matrix $H_1$ from $k_i$ to millimeter-space, i.e., (0, 0), (H, 0), (H, W), (0, W).
3. Find $p_i$ and $q_i$, where $p_i$ are pixel locations of panel features (as fiducials) in image-space and $q_i$ are their corresponding locations in millimeter-space based on $H_1$.
4. Find homography matrix $H_2$ from $p_i$ to $q_i$.
5. Back-project corners (0, 0), (H, 0), (H, W), (0, W) from millimeter-space to image-space based on $H_2^{-1}$.

Note that, in the generalized formulation above, $p_i$ and $q_i$ may be not only grid intersections but also the centroid of a diamond or the common vertex of two triangles, for instance. And $p_i$ and $q_i$ may be some other pixel-structure, not just "corners."

Note further that, in the generalized formulation above, the association of corresponding source and destination pixel locations, as given in (3) and (4), is still ultimately based on the four corners (not "corners") of panel, $k_i$, as given in (1) and (2), as the fundamental datum. Other datums may be used as reference depending on the geometry and features of solar panels.

Pre-Processing with Multi-Baseline Stereo

As discussed above, depth estimation can be used for segmentation. Depth estimation can also be used for determining bounding boxes that encompass the entire extent of a panel. As such, bounding boxes can be used to extract or segment from a raw image a region-of-interest (ROI) for input into an AI pipeline.

Figure 55:
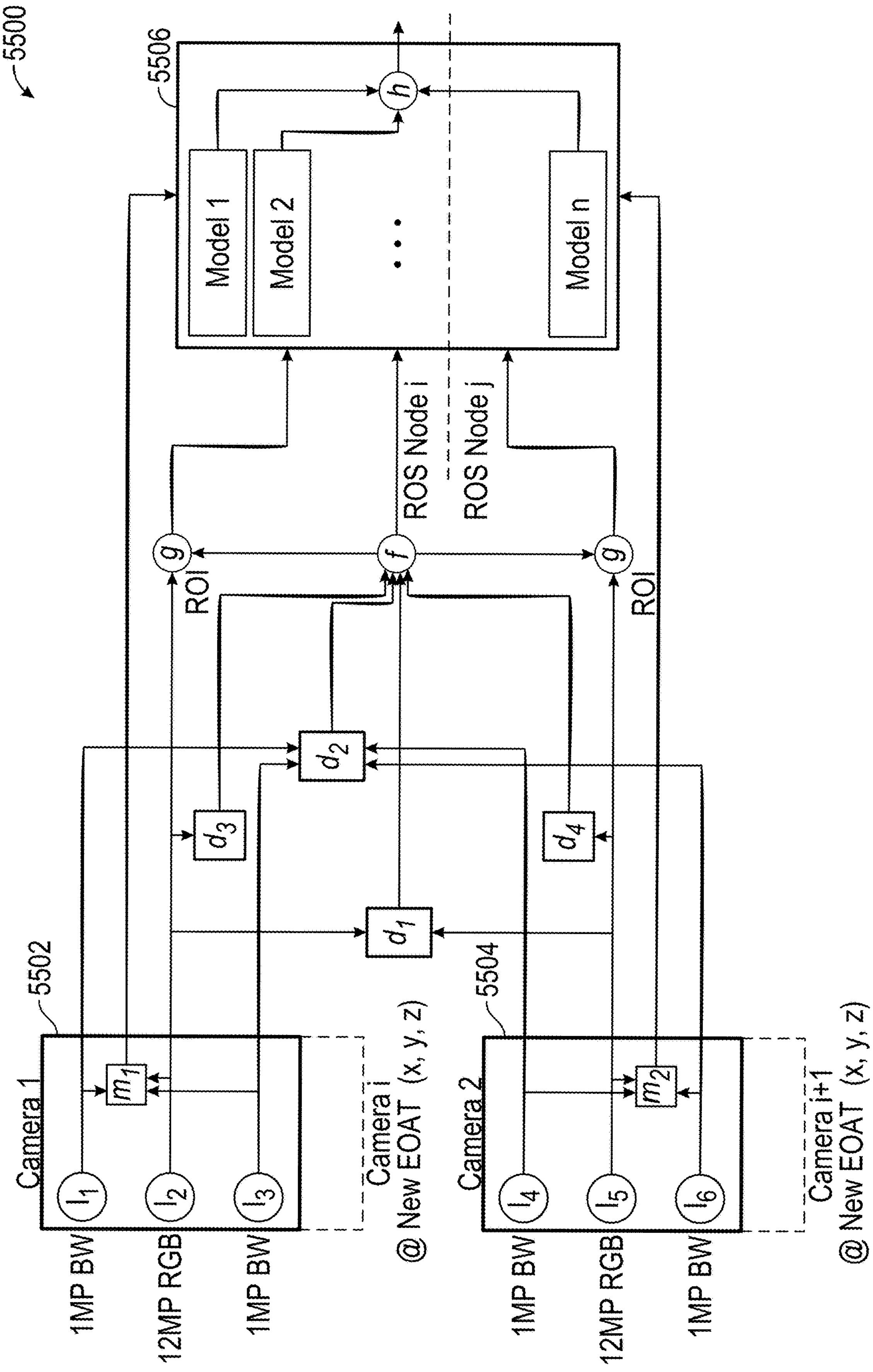
FIG. 55 shows a schematic diagram of region-of-interest segmentation, according to some embodiments.

FIG. 55 shows a schematic diagram of ROI segmentation 5500, according to some embodiments. The ROI segmentation is performed on a raw (full-sized) image from, for instance, two 12 MP RGB cameras (5502 and 5504), before the (segmented) image is passed as input to an AI pipeline 5506.

As pre-processing, the ROI segmentation may be based on any of the following:

$d_1$: a disparity map from a single-baseline stereo.

$d_2$: a disparity map from a multi-baseline stereo.

$d_3$, $d_4$: monocular depth estimation from neural network.

f: any (weighted) combination of the above.

m: onboard processing (e.g., processing provided by Luxonis OAK-D and Stereolabs ZED cameras) that runs bounding-box-as-ROI inferences.

FIG. 55 is an illustration not of a design so much as a design space. FIG. 55 captures the pre-processing design space described above, depicting a maximalist design of all the elements. All the elements need not be used in practice. The design space allows for structure in motion (with movement of the EOAT), ensemble (h) of AI models (model 1, . . . , model n), and a distributed Robot Operating System (ROS) architecture (e.g., ROS node i, . . . ROS node j).

Sensor Fusion with LiDAR and Monocular AI

Described above are embodiments that use computer vision techniques for pre-processing and post-processing with respect to monocular AI (i.e., using images from a single camera). As described below, in some embodiments, computer vision is used for more than a preparation or a corrective step, in the determination of 6DoF pose. Computer vision can be more tightly integrated (or baked-in) with an AI.

Figure 56:
FIG. 56 shows multiple-data-channel capabilities of LiDAR used by some embodiments.

FIG. 56 shows multiple-data-channel capabilities 5600 of LiDAR used by some embodiments. Range 5602 is the distance of a point from the lidar camera, calculated by using the time of flight of the laser pulse. Signal 5604 is the strength of the laser return from an object (commonly represented by the point cloud coloring). Ambient 5606 is the camera return capturing the strength of ambient light at a predetermined wavelength (e.g., 865 nm wavelength). Reflectivity 5608 is the reflectivity of the surface (or object) that was detected by the LiDAR sensor. Some embodiments use LiDAR that provide access to data or images of reflectivity, ambient Near Infrared (NIR), and (2D-projected) range and the LUT mapping between these images. Same pixel sensors may be utilized for the various data channels. A single LUT or look-up table (that captures the physical dimensions of the hardware) may be sufficient. No extrinsic calibration may be needed, and no need to inquire whether the calibrated mapping generalizes. The LUT mapping allows analyses to go fluidly from one image-space to another, from the NIR image to the point-cloud, for instance.

Figure 57:
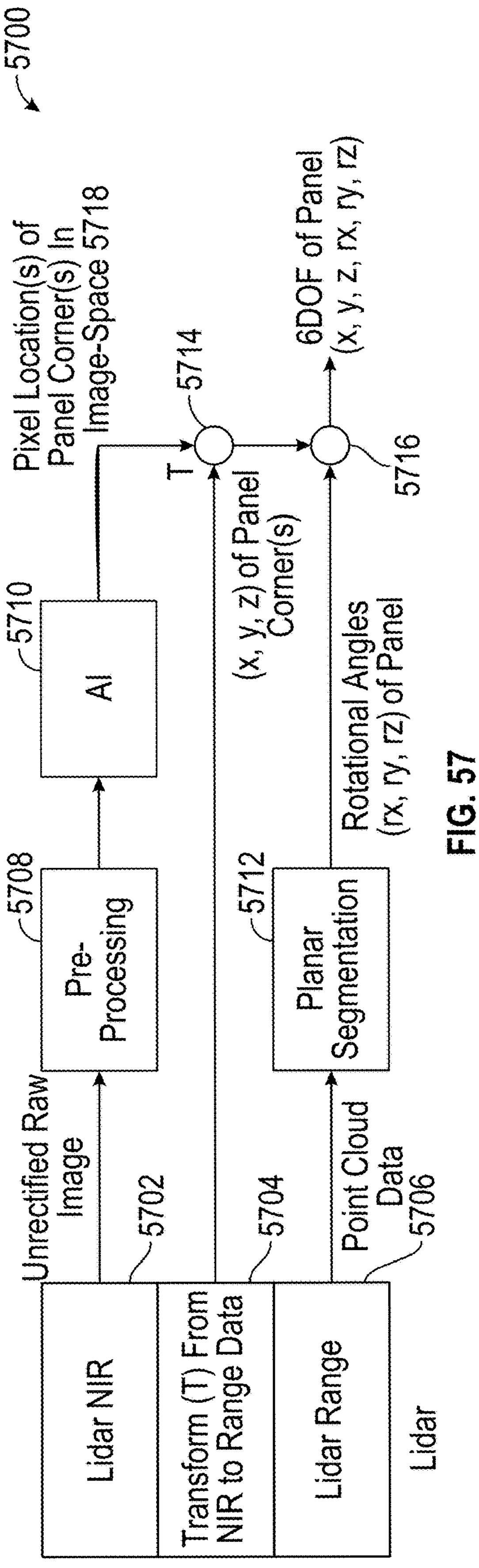
FIG. 57 is a schematic diagram of an example computer vision/artificial intelligence (AI) architecture for estimating six degrees-of-freedom (6DoF) pose of a solar panel, according to some embodiments.

FIG. 57 is a schematic diagram of an example computer vision/AI architecture 5700 for determining the 6DoF pose of a solar panel, according to some embodiments. The CV/AI pipeline 5700 takes as input two sorts of data or images from a LiDAR: an ambient NIR gray-scale image 5702 and range data 5706 in the form of a point-cloud. Transform 5704 transforms NIR to range data. First, the ambient NIR image 5702 is used as input to a CV/AI pipeline (pre-processing 5708 and AI 5710) that locates the coordinates ($x_{pixel}$, $y_{pixel}$) 5718 in the image-space of a keypoint on the panel, such as a corner. The CV/AI pipeline may comprise any of the pre-processing, AI models (e.g., segmentation, keypoint detection, bounding box), and post-processing described above. Also, the point-cloud range data 5706 is used as input to a CV pipeline that identifies the panel by planar segmentation 5712 (i.e., fitting a plane to the points in the point-cloud). The resulting fitted plane, in Hessian normal form, for instance, provides the rotational angles (rx, ry, rz). Additionally, the coordinates ($x_{pixel}$, $y_{pixel}$) 5718 in the NIR image-space of the relevant keypoint is transformed (T) or mapped (via LUT, as discussed above) (5714) to the point-cloud to yield the coordinates (x, y, z) of the keypoint in world-space. The combined (5716) output (x, y, z, rx, ry, rz) is the 6DoF pose of the panel in question.

Figure 58:
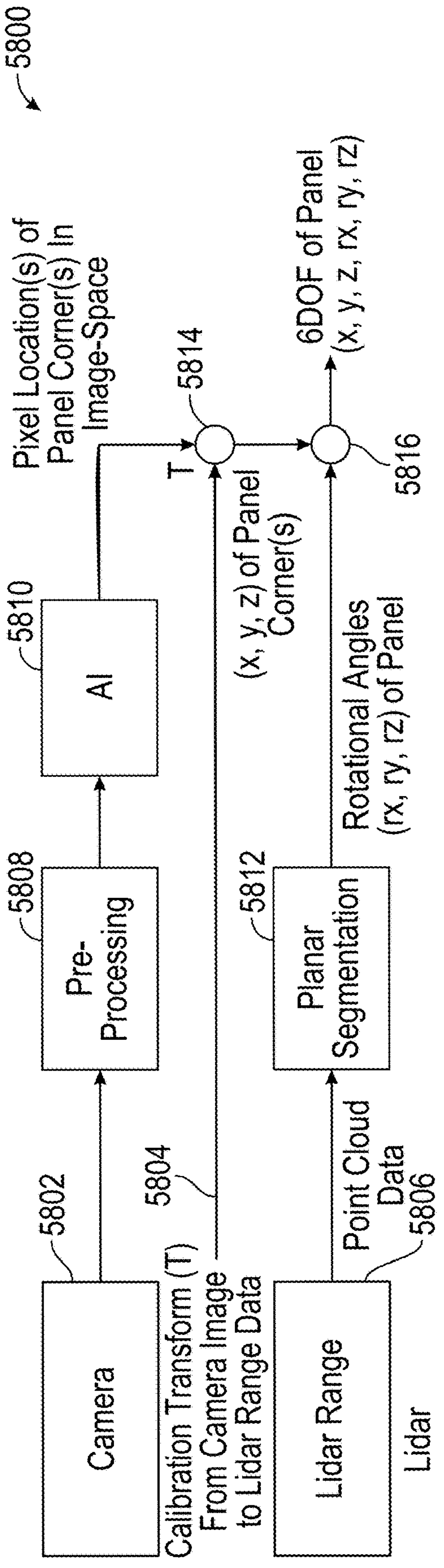
FIG. 58 is a schematic diagram of another example computer vision/AI pipeline for estimating the 6DoF pose of a solar panel, according to some embodiments.

FIG. 58 is a schematic diagram of another example computer vision/AI pipeline 5800 for determining the 6DoF pose of a solar panel, according to some embodiments. This architecture is similar to the one described above in reference to FIG. 57, except that the pipeline 5700 relies only on data or images from the LiDAR. By contrast, the pipeline 5800 relies on both the LiDAR 5806 and another sensor—a camera 5802. The principles of operation and the architecture of the pipelines 5700 and 5800 are similar. For example, the preprocessing steps 5708 and 5808 are similar, the planar segmentation steps 5712 and 5812 are similar, the AI steps 571- and 5810 are similar, and the combinations 5716 and 5816 are similar. The pipeline 5800 similarly combines AI-based keypoint detection with point-cloud segmentation to arrive at a combined 6DoF pose estimation. The only difference is that the CV/AI pipeline depicted in FIG. 58 uses a transform (T) 5814 that is not a lookup-table (LUT) as in pipeline depicted in FIG. 57. Rather, the transform or mapping (T) 5814 between the image-space of the camera and the LiDAR is obtained by calibration.

Figure 59:
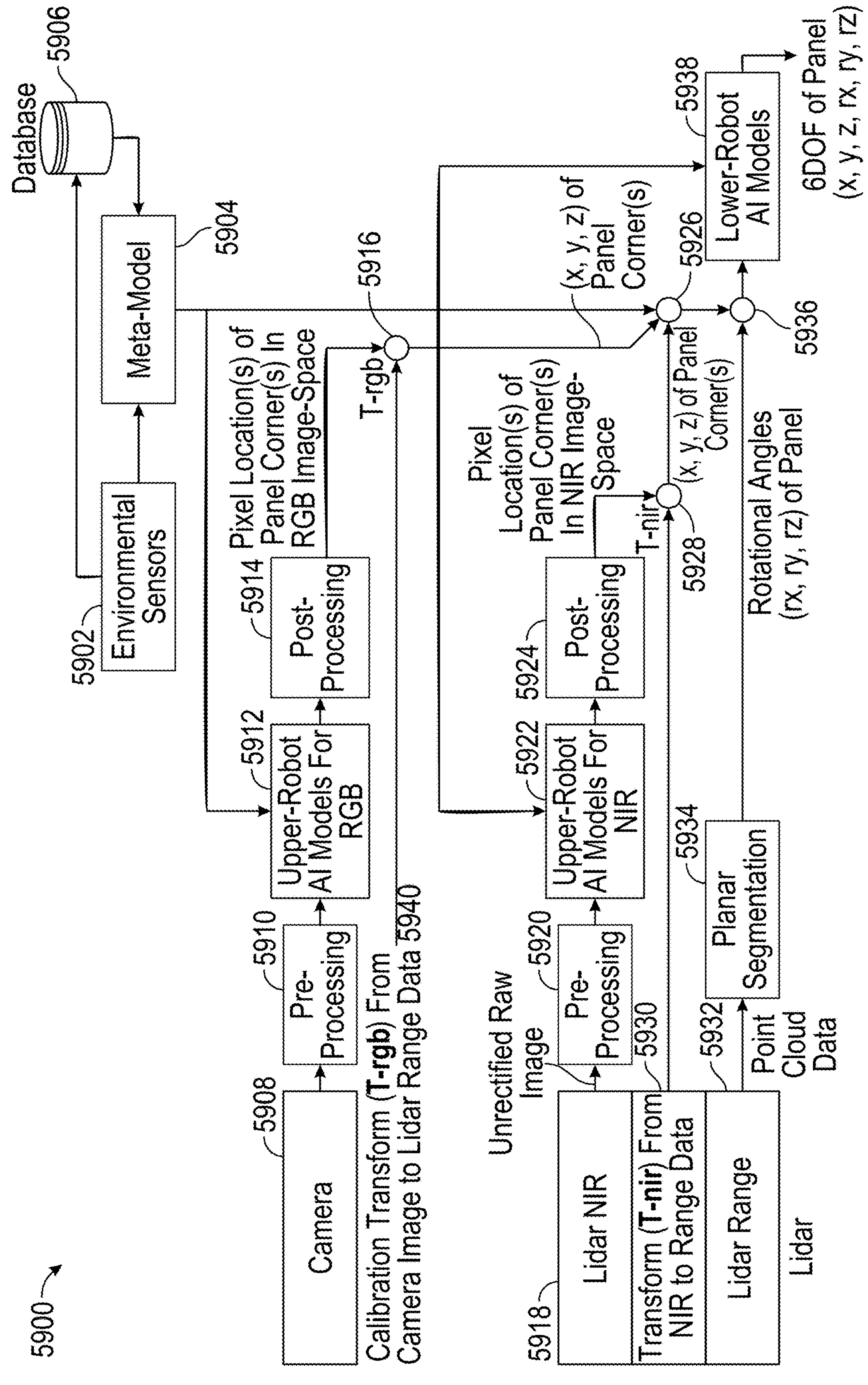
FIG. 59 is a schematic diagram of sensor fusion architecture for determining the 6DoF pose of a solar panel, according to some embodiments.

FIG. 59 is a schematic diagram of sensor fusion architecture 5900 for determining the 6DoF pose of a solar panel, according to some embodiments. The architecture 5900 combine the two building blocks shown in FIGS. 57 and 58. The embodiment combines AI-based keypoint detection for both NIR imagery 5918 from a LiDAR and an RGB image from a camera 5908 with point-cloud segmentation to arrive at a combined 6 DoF pose estimation. The transforms or mapping between image-spaces TNIR (T-nir) 5930 and TRGB (T-rgb) 5940 are obtained from LUT or by calibration, respectively, as described above. The embodiment allows a heuristic or meta-model 5904 to determine how the various components of the 6 DoF pose from different sources (5916, 5928) are combined (5926) to form the final 6DoF pose estimation. Depending on lighting conditions or other environmental information 5902, the meta-model 5904 may use the coordinates (x, y, z) of a panel keypoint that is based on either the camera image 5908 or the LiDAR NIR image 5918 (or some other LiDAR data channel, e.g., Lidar Range 5932). For example, the meta-model 5904 may configure the CV/AI pipeline to rely only on the RGB camera 5908 for indoor operation, the LiDAR reflectivity data channel 6008 (FIG. 60) for night-time outdoor operation, and the LiDAR NIR data channel 5918 for daytime outdoor operation. The meta-model 5904 may also weigh appropriately both sets of keypoint coordinates or even optimize the AI models g., upper robot AI model 5912 for RGB, lower robot AI models 5938) for certain environmental conditions (e.g., by selecting appropriate model weights). The meta-model 5904 may also invoke a post-processing correction 5924 by the lower-robot CV/AI pipeline, as described below. The pre-processing steps 5910 and 5920 and the planar segmentation step 5934 are as described above, according to some embodiments. A database 5906 can store data from the environmental sensors 5902 and provide data to the meta-model 5904.

Figure 60:
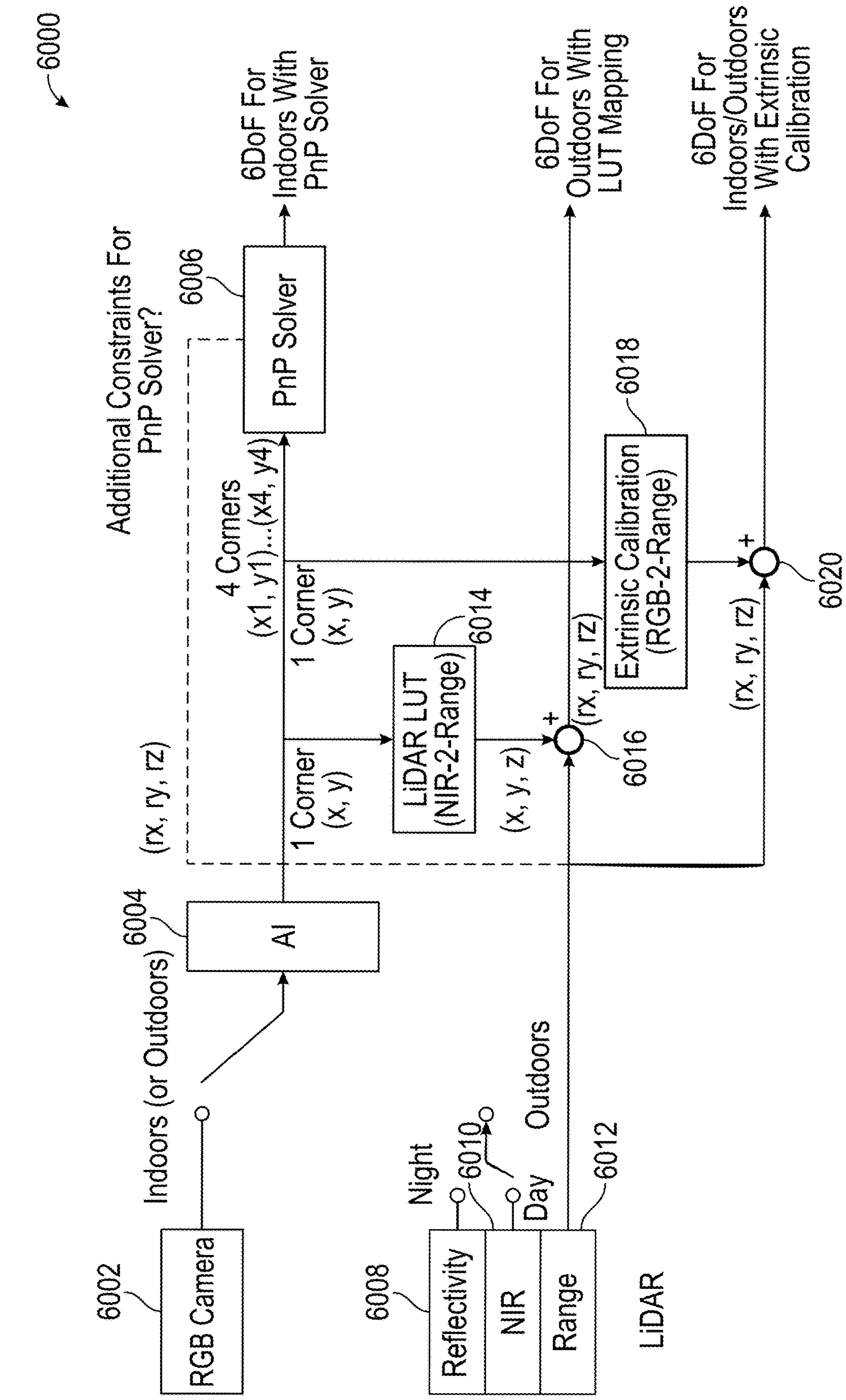
FIG. 60 is a schematic diagram of another sensor fusion architecture for determining the 6DoF pose of a solar panel, according to some embodiments.

FIG. 60 is a schematic diagram of another sensor fusion architecture 6000 for determining the 6DoF pose of a solar panel, according to some embodiments. This example shows a sensor fusion architecture fusing traditional analyses of LiDAR imagery 6008 with monocular AI 6004 based on images from a RGB camera 6002. Three possible methods to calculate the 6DoF pose are shown. One method uses a PnP solver 6006 with the pixel locations of four panel corners (x1, y1), . . . , (x4, y4) as input; this method may be used for indoors. Another method combines rotational angles (rx, ry, rz) with the world-space coordinates (x, y, z) of a panel keypoint based on LUT mapping 6014 (from the NIR or reflectivity image-space of the LiDAR to the point-cloud). This method may be used for outdoors. Yet another method is extrinsic calibration 6018 (for mapping between the image-space of camera to the point-cloud). These different methods of calculating the 6DoF pose may be combined in various ways (e.g., for indoors/outdoors). Reflectivity 6008, NIR 6010, and range 6012 may be used for night, day and outdoors, respectively. Other LiDAR data channels, such as signal and reflectivity, although not shown, may be used additionally or alternatively to the other data channels.

Figure 61:
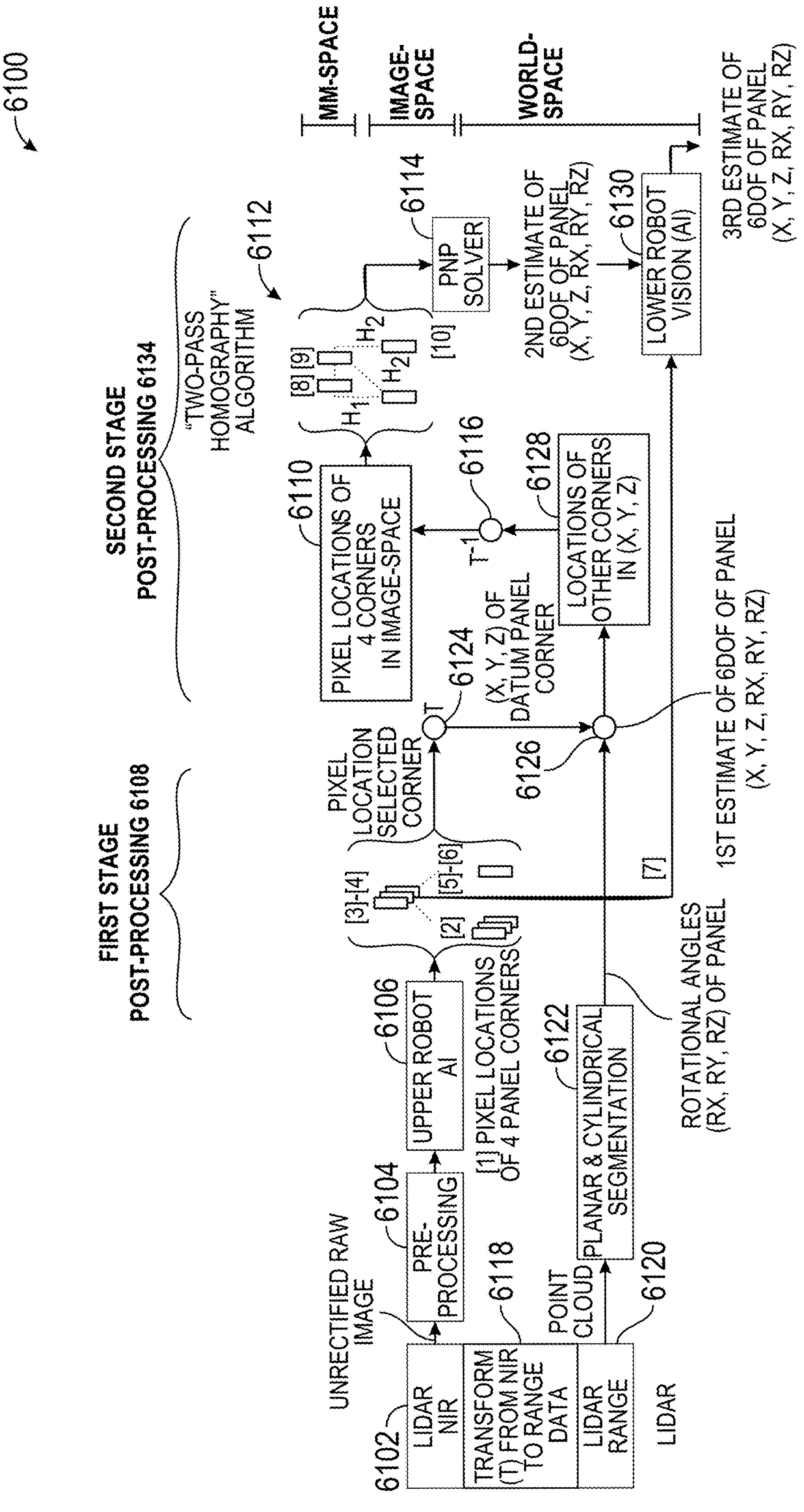
FIG. 61 is a schematic diagram of a sensor fusion architecture, according to some embodiments.

FIG. 61 is a schematic diagram of a sensor fusion architecture 6100, according to some embodiments. Unrestricted raw image from an NIR LiDAR 6102 is pre-processed (6104) using one of the techniques described above, and processed by an upper robot AI 6106. A first-stage post-processing 6108 provides a layer of redundancy. The first stage may include the following steps: [1] determine corners from NIR image (and/or other channels) in pixel space; [2] for each corner in pixel space, transform to world space coordinates and calculate other corners, given panel dimensions; [3] for each set for four corners in world space, transform back to pixel space; [4] for the four sets for (four) corners in pixel space from [3] above, select a single corner based on some metrics of convergence (e.g., Euclidean distance); [5] transform the selected corner from (4) above in pixel space to world space and its associated set of (other corners); and [6] from the set of corners in [5] above, use the datum corner (i.e., near left). In some embodiments, [7] if variance in pixel locations for corners in [3] above exceeds a threshold, then use lower-robot vision for a third estimate of 6DoF. Pixel location for a selected corner is transformed (T) (6124) to obtain (x, y, z) coordinates of a datum panel corner. This may be combined (6126) with the output of a plan and cylindrical segmentation 6122 (which produces the output based on a point cloud output from a LiDAR range 6120), to obtain a first estimate of 6DoF (X, Y, Z, RX, RY, RZ) of the panel. In a second-stage post-processing 6134, based on the first estimate, locations of four panel corners 6128 in coordinates (x, y, z) are refined further based on the two-pass homography algorithm described above. The locations 6128 is inverse transformed $T^{-1}$ (6116) to obtain pixel locations 6110 of four corners in image space. These pixel locations are input to a two-pass homography algorithm 6112 (an example of which is described above). This includes [8] determining a first-pass homography matrix $H_1$, [9] determining a second-pass homography matrix $H_2$ and back-projecting four panel corners based on inverse of $H_2$. The output of step is input to a PNP solver 6114 to obtain a second estimate of 6DoF of the panel. This estimate may be input to a lower robot vision (AI) 6130, according to [7] described above. Shown explicitly in FIG. 61 are layers of redundancy afforded by the first stage and second stage post-processing, and the lower-robot CV/AI pipeline vision. Although not shown in FIG. 61, in some embodiments, the architecture can provide layers of redundancy, including an RGB camera image, other LiDAR data channels, such as signal and reflectivity, and complementary AI models.

The range data-channel from a LiDAR (e.g., an Ouster LiDAR) can be used as depth estimation as a type of segmentation which is, in turn, refined by the “two-pass homography” post-processing before input into a PnP solver. Depth estimation or segmentation may also be performed using stereo cameras—whether in the single-baseline or multi-baseline configuration—as described above.

Whether with stereo cameras or with LiDAR, segmentation of the panel can be achieved by extrinsic calibration of the camera with respect to the robotic system (hand-eye). Calibration can also be performed by mapping two image-spaces with homography transforms. For example, the image-space of the LiDAR range image can be mapped to the image-space of the camera in a calibration process that is purely image-based (i.e., without involving robotic movements).

Alternatively, the 6DoF pose of a panel may be determined solely by LiDAR. The rotational angles (rx, ry, rz) of a panel in question can be determined by planar segmentation of the point-cloud data from a LiDAR. And the (x, y, z) location of a keypoint of the panel (e.g., corner) may be determined by mapping the keypoint found in other data-channels (e.g., NIR, reflectivity). To improve the latter determination of keypoint location (x, y, z), the LiDAR may be calibrated (e.g., by extrinsics or homography, as described above) with respect to a high-resolution camera such that the keypoint(s) found in the camera image may be mapped or translated to the image space of the LiDAR.

Moreover, the various approaches to 6DoF pose estimation (and its associated post-processing) described above can be supplemented by additional post-processing (of the initial 6DoF pose estimation) involving a different CV/AI pipeline with a different senor (e.g., camera) attached to the lower robot, for instance. For example, the CV/AI pipeline for the lower robot may refine or correct an initial estimation of the 6DoF pose of a panel by profiling the surface contour of the torque tube and/or clamp with structured light, such as laser-line or grid-line projections. The profiles of the torque tube, clamp, or other relevant structures, with their known geometry and dimensions, can be the basis by which the initial 6DoF pose of the panel can be refined. Such a refinement assumes that a panel installed on the torque tube is aligned rotationally along the tube and that the midpoint of the clamp coincides with the clamped edge of the installed panel.

Figure 62:
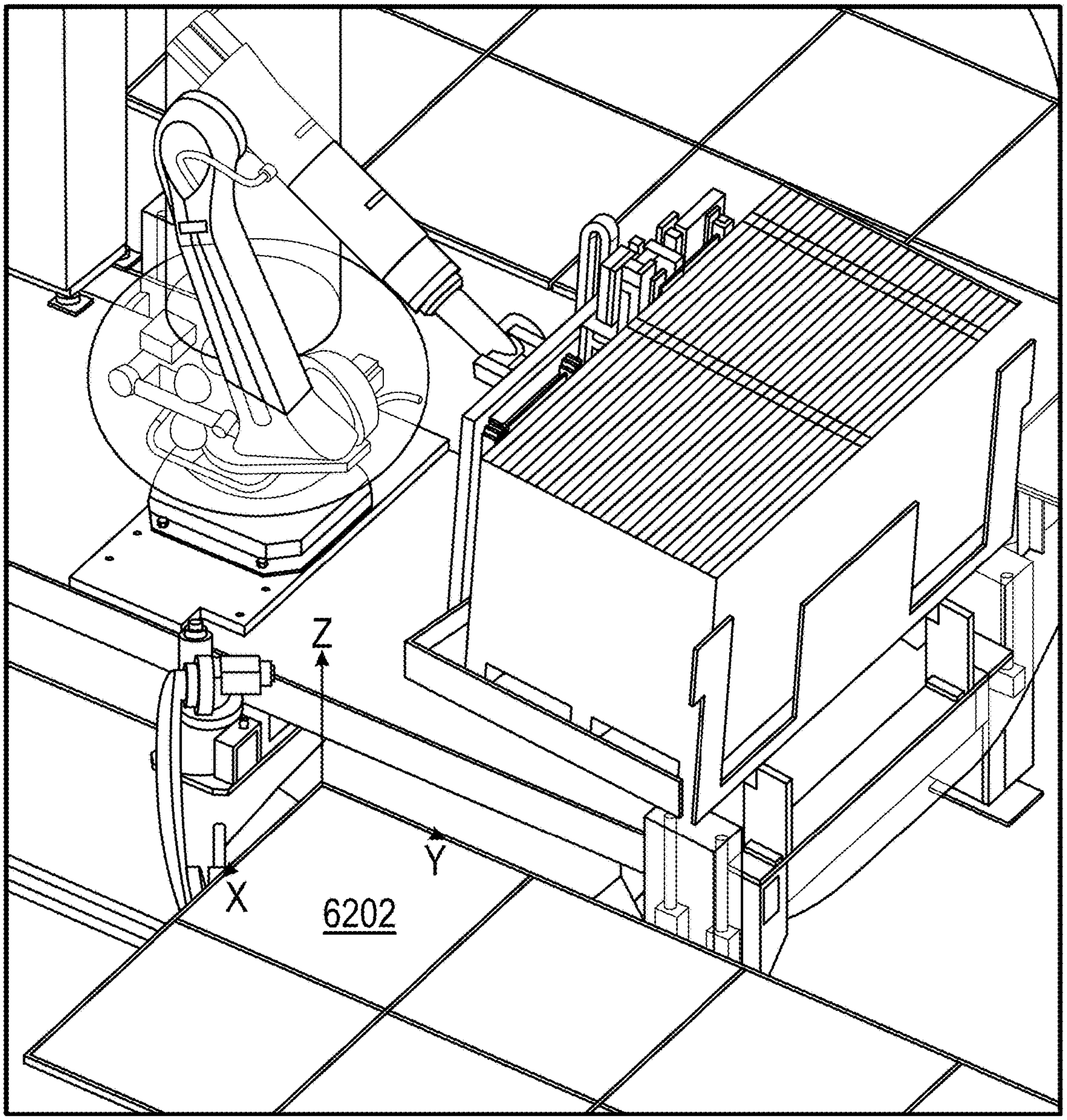
FIG. 62 is a schematic diagram of a solar panel installation, according to some embodiments.

FIG. 62 is a schematic diagram of a solar panel installation 6200, according to some embodiments. Shown are cartesian axes X, Y and Z, and panel datum 6202 for six degrees of freedom (6DoF) pose estimation.

Figure 63:
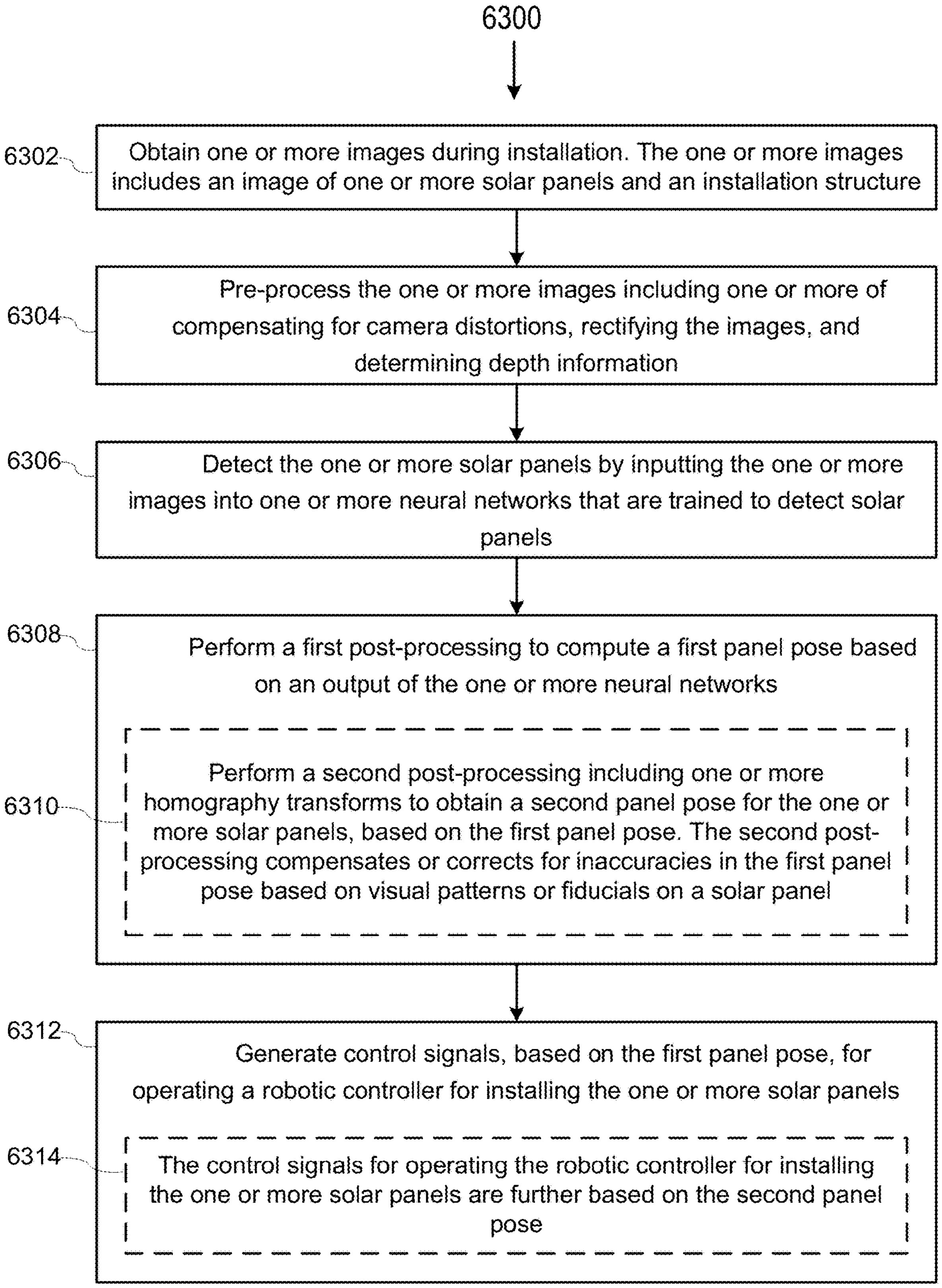
FIG. 63 shows a flowchart of a method for autonomous solar installation, according to some embodiments.

FIG. 63 shows a flowchart of a method 6300 for autonomous solar installation, according to some embodiments. The method includes obtaining (6302) one or more images during installation. The one or more images includes an image of one or more solar panels and an installation structure.

The method also includes pre-processing (6304) the one or more images including one or more of compensating for camera intrinsics or distortions, rectifying the images, and determining depth information. In some embodiments, the pre-processing includes compensating for a camera distortion, rectifying the image, and/or determining depth information based on a single-baseline stereo camera, a multi-baseline stereo camera, a time-of-flight sensor, or a LiDAR sensor. Examples of pre-processing techniques are described above in reference to non-AI methods for pose estimation, and example AI models and inferences, according to some embodiments. AI models may be trained on images that are not compensated for lens distortions and images that are not rectified.

The method also includes detecting (6306) the one or more solar panels by inputting the one or more images into one or more neural networks (in series or in parallel) that are trained to detect solar panels. In some embodiments, the one or more neural networks is trained to output bounding boxes, segmentation, keypoints, depth, and/or a 6DoF pose. These techniques are described above in the section Example AI Models and Inferences, according to some embodiments.

The method also includes a first post-processing (6308) to compute a first panel pose based on an output of the one or more neural networks. The first post-processing may include a different AI/CV pipeline than the one used for pre-processing and/or the neural networks. A goal may be to refine further an initial estimated panel pose.

In some embodiments, the first post-processing includes one or more computer vision algorithms (e.g., Ramer-Douglas-Peucker, Hough Transform, Shi-Tomasi, homography transforms) for processing the output of the one or more neural networks based on invariant structures (e.g., invariant structures include grid lines and other visual fiducials on the panel, shadows between panels, projection perspectival lines, relative position of torque tube and panels) in the images to determine locations of panel keypoints. Examples are described above in reference to FIG. 51, according to some embodiments.

In some embodiments, the first post-processing further includes solving for Perspective-n-Point based on panel dimensions and panel keypoints. In some embodiments, the panel keypoints are four corners of the panel frame.

In some embodiments, the method also includes a second post-processing (6310) including one or more homography transforms (e.g., the two-pass homography algorithm described above) to obtain a second panel pose for the one or more solar panels, based on the first panel pose. The second post-processing compensates or corrects for inaccuracies in the first panel pose based on visual patterns or fiducials on a solar panel. In some embodiments, the visual patterns comprise a grid pattern on the solar panel.

In some embodiments, the output of the one or more neural networks includes panel segmentation. FIG. 52 shows an example application 5200 of segmentation, according to some embodiments. FIG. 55 shows a schematic diagram of ROI segmentation 5500, according to some embodiments. The second post-processing includes filtering out background (leaving only the foregrounded panel) in an image using the panel segmentation as a mask, to obtain a masked panel. The second post-processing also includes identifying grid intersections in the masked panel as corners using a corner finding algorithm (e.g., the Shi-Tomasi algorithm, Harris-Stephens algorithm). The second post-processing also includes computing a homography matrix $H_1$ using the corners. The second post-processing also includes determining locations of grid intersections in millimeter-space, based on $H_1$. The second post-processing also includes computing a homography matrix $H_2$ to transform the grid intersections in image-space to their locations in the millimeter space (a two-dimensional (2D) projective space in which the four (physical) corners of the solar panel have the following (x, y) coordinates: (0,0), (0, L), (W, 0), (W, L), where W and L are the width and length, respectively, of the solar panel). The second post-processing also includes back-projecting corners in the millimeter space to image-space, using inverse of $H_2$.

In some embodiments, the filtering includes a binary AND between the mask and a raw image of the solar panel. In some embodiments, determining locations of the grid intersections includes an association in $H_1$-space based on Euclidean distance (e.g., a fraction of the shortest cell dimension, such as width).

In some embodiments, the second post-processing includes estimating four corners of a solar panel in an image-space $k_i$. The second post-processing also includes computing a homography matrix $H_1$ that maps $k_i$ to a millimeter-space. The second post-processing also includes identifying (i) pixel locations $p_i$ of panel features (as fiducials) in image-space, and (ii) corresponding locations $q_i$ for the pixel locations $p_i$ in millimeter-space, based on $H_1$. The second post-processing also includes computing a homography matrix $H_2$ that maps $p_i$ to $q_i$. The second post-processing also includes back-projecting corners (0, 0), (H, 0), (H, W), (0, W) from millimeter-space to image-space based on inverse of homography matrix $H_2$ ($H_2^{-1}$).

In some embodiments, the $p_i$ and $q_i$ include locations of grid intersections, a centroid of a diamond or a common vertex of two triangles, based on the grid intersections, and/or pixel-structure other than corners of the solar panel.

Various examples of using the homography transforms and sensor fusion architectures for 6DoF pose estimation of solar panels are described above in reference to FIGS. 56 through 61, according to some embodiments. In particular, the pre-processing and post-processing steps described above in reference to FIGS. 56 through 61 may be used in the pre-processing, the first post-processing step and/or the post-processing step of the method 6300. For example, FIG. 61 shows how the two-pass homography algorithm may be used for post-processing in any sensor fusion architecture that is based on corner detection, according to some embodiments.

In some embodiments, the installation structure includes a torque tube and a clamp and the method further includes a third post-processing including processing one or more images of the torque tube and/or clamp. In some embodiments, the one or more images of the torque tube and/or clamp is obtained with a high-resolution camera and structured lighting. In some embodiments, the structured lighting is a laser line that is approximately orthogonal or parallel with respect to the torque tube. In some embodiments, the processing of the one or more images of the torque tube and/or clamp is performed by one or more neural networks and/or a computer vision pipeline. In some embodiments, the method further includes locating a nut associated with the clamp by using high-intensity illumination and computer vision algorithms. In some embodiments, the high-intensity illumination is a ring light.

Referring back to FIG. 63, the method also includes generating (6312) control signals, based on the first panel pose, for operating a robotic controller for installing the one or more solar panels. In some embodiments, control signals are generated (6314) further based on the second panel pose. In various embodiments, the control signals are generated soley based on the first panel pose or soley based on the second pane pose, or the control signal can be generated based on both the first panel pose and the second pane pose.

Figure 35A:
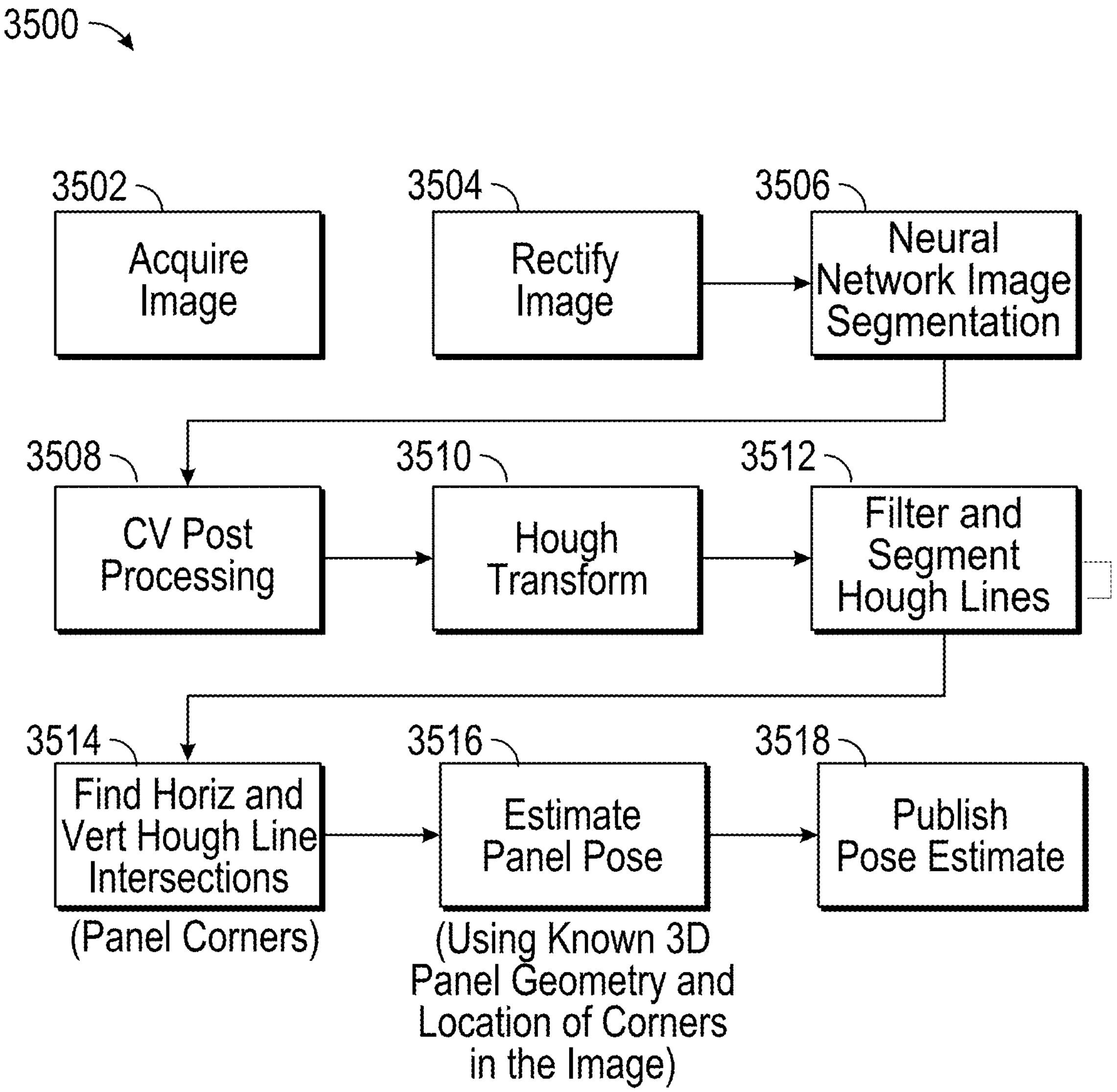
FIG. 35A shows a block diagram of an example image processing pipeline, according to some embodiments.
Figure 35B:
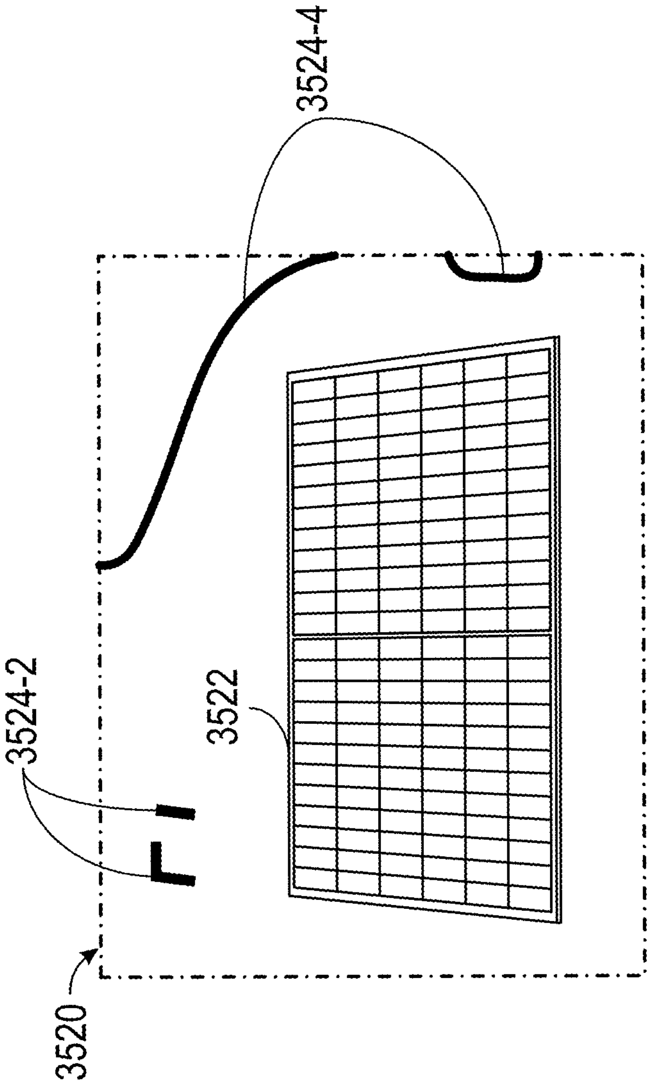
FIG. 35B shows an example rectified acquired image, according to some embodiments.
Figure 35C:
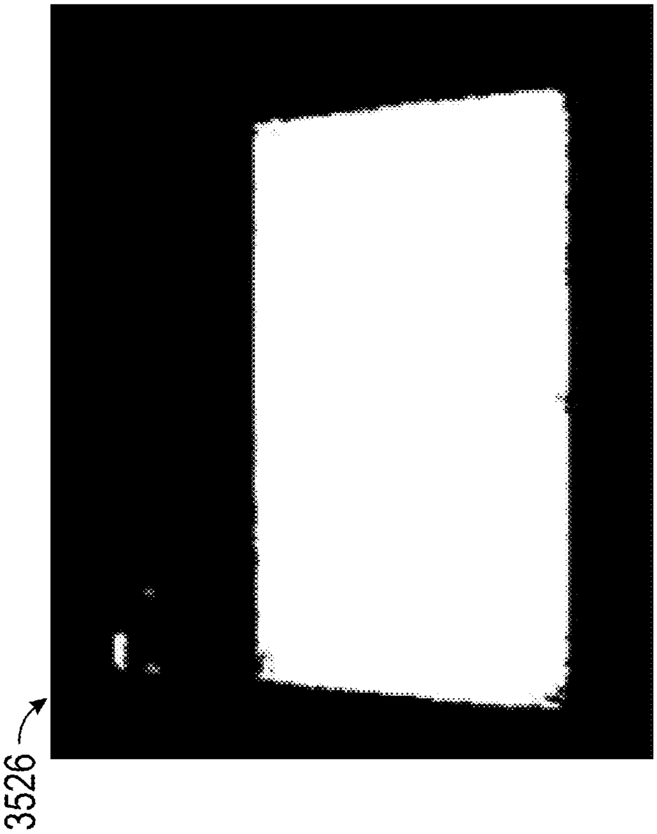
FIG. 35C shows an example output for neural network image segmentation for the acquired rectified image shown in FIG. 35B, according to some embodiments.
Figure 35D:
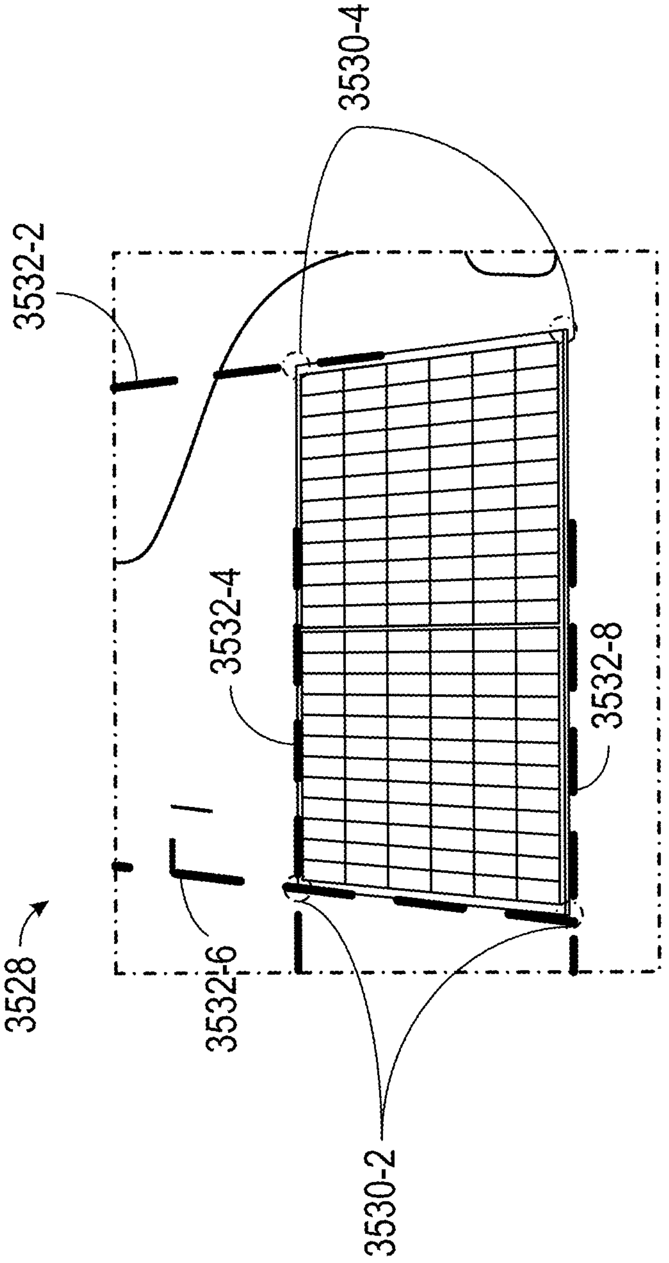
FIG. 35D shows an example panel corner detection, according to some embodiments.

FIG. 35A shows a block diagram of an example image processing pipeline 3500, according to some embodiments. The pipeline 3500 includes a module 3502 for acquiring images, a module 3504 for rectifying the images, a module 3506 for neural network image segmentation of the rectified images, a module 3508 for post-processing the output of the module 3506 using computer vision techniques, a module 3510 for performing Hough transform on the output of the module 3508, a module 3512 for filtering and segmenting Hough lines output by the module 3510, a module 3514 to identify horizontal and vertical Hough line intersections output by the module 3512, a module 3516 to estimate panel poses based on the horizontal and vertical Hough line intersections (e.g., using 3D panel geometry and location of corners in the image), and a module 3518 to publish pose estimates. FIG. 35B shows an example rectified acquired image 3520 (output of the modules 3502 and 3504) that includes an image of a solar panel 3522 and other objects 3524-2 (e.g., tapes) and 3524-4 (e.g., wires). FIG. 35C shows an example output 3526 (output of the module 3506) for neural network image segmentation for the acquired rectified image shown in FIG. 35B, according to some embodiments. FIG. 35D shows an example panel corner detection 3528 (output of the module 3514), according to some embodiments. In this example, corners 3530-2 and 3530-4 are detected based on horizontal lines 32532-4 and 3532-8 and vertical lines 3532-2 and 3532-6.

Figure 36:
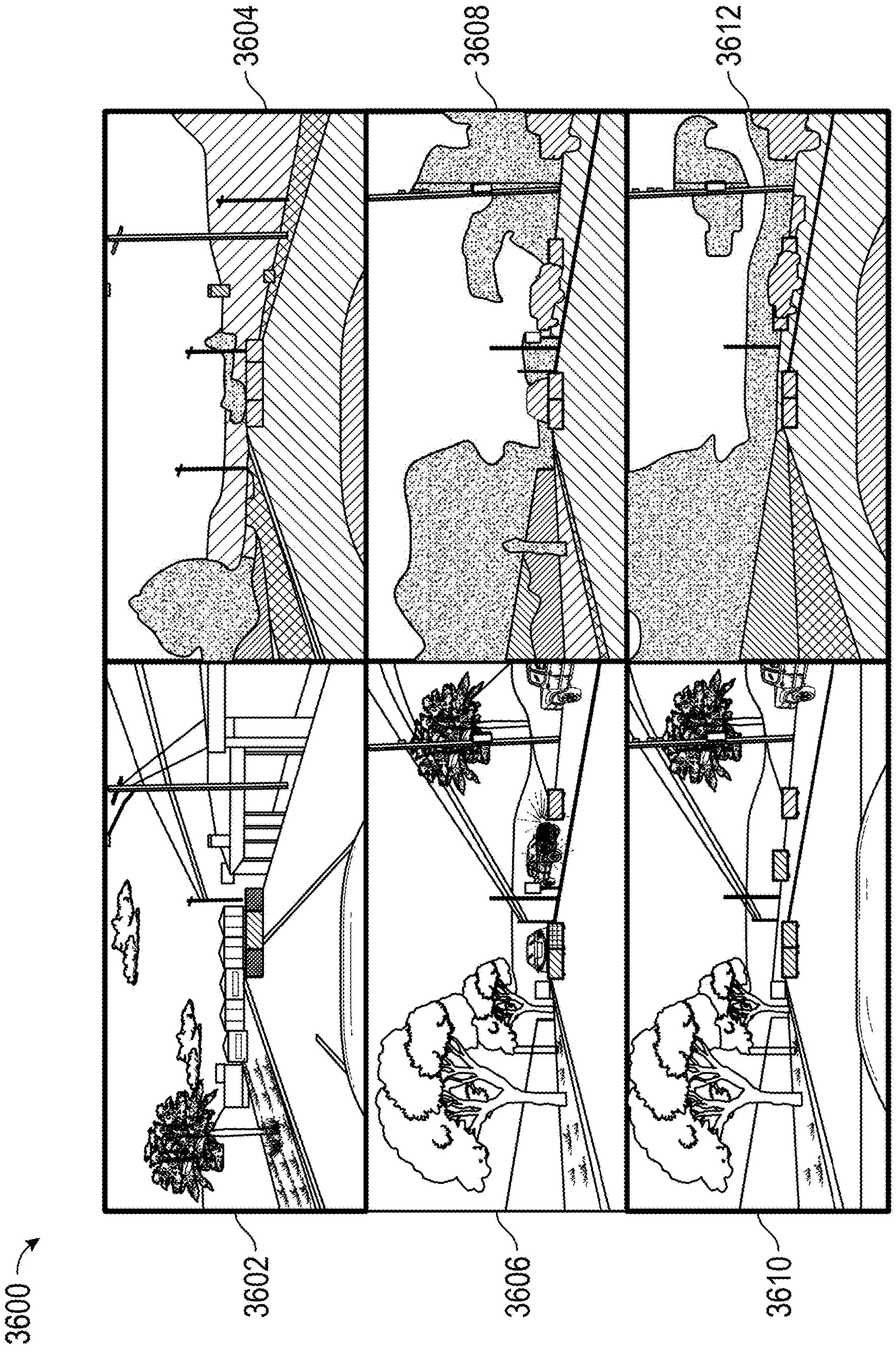
FIG. 36 shows examples for images of a road, under different lighting conditions, and segmentation masks for the images, according to some embodiments.

FIG. 36 shows examples 3600 for images 3602, 3606 and 3610, of a road, under different lighting conditions, and segmentation masks 3604, 3608 and 3612, for the images, according to some embodiments. Conventional computer vision techniques are useful when the environment is ideal. However, glare, over/under exposure can negatively affect object detection algorithms. Machine learning techniques can overcome environmental inconsistencies, learn from examples with glare and illumination issues, and can generalize to new data during inference. Non-AI methods, e.g., using multi-baseline stereo, LiDAR/ToF, may be used for non-ideal conditions. Further, non-AI methods may be combined with AI based methods.

Example Solar Panel Segmentation

Figure 37A:
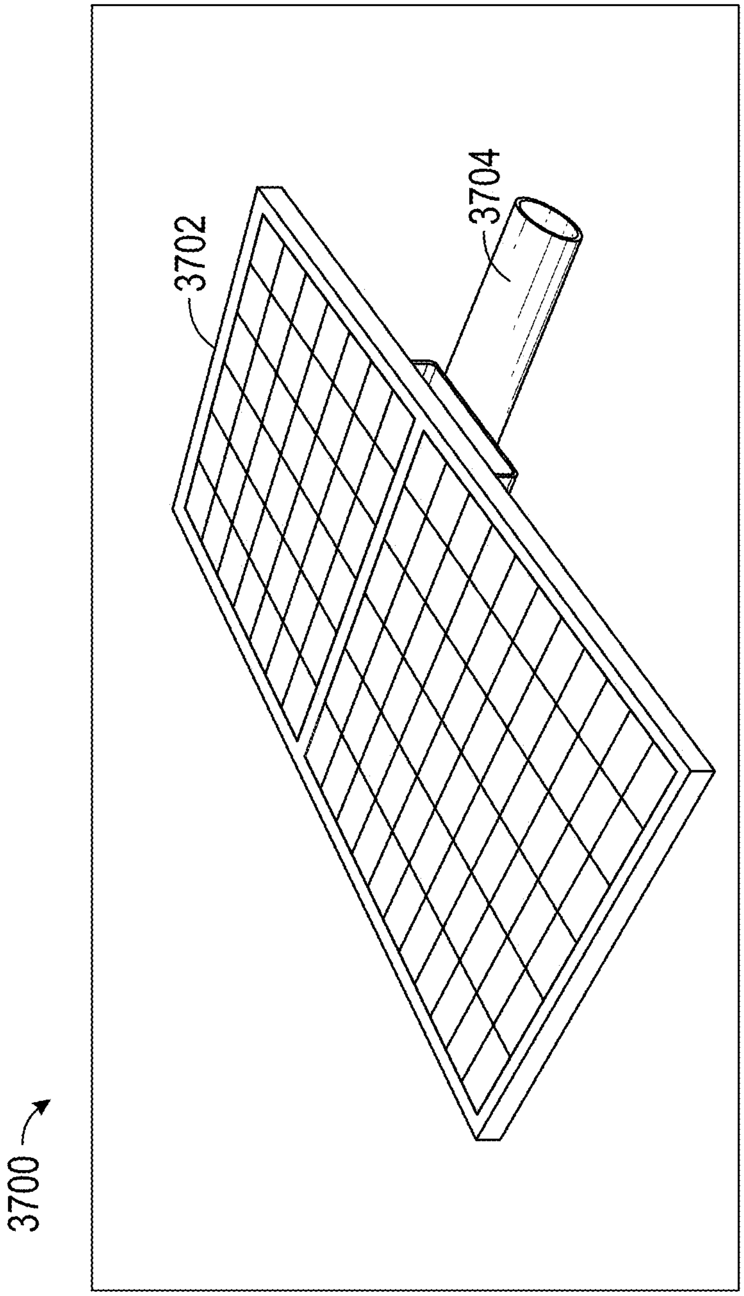
FIG. 37A shows an example of a captured image that includes a solar panel and a torque tube, according to some embodiments.
Figure 37B:
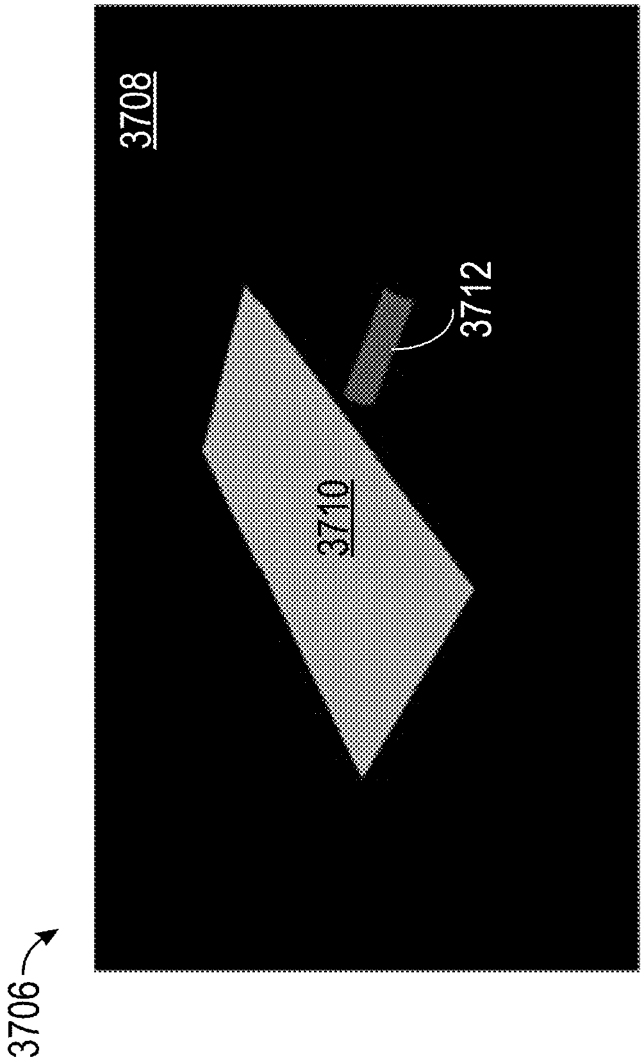
FIG. 37B shows an example of an annotated image for the captured image shown in FIG. 37A, according to some embodiments.
Figure 37C:
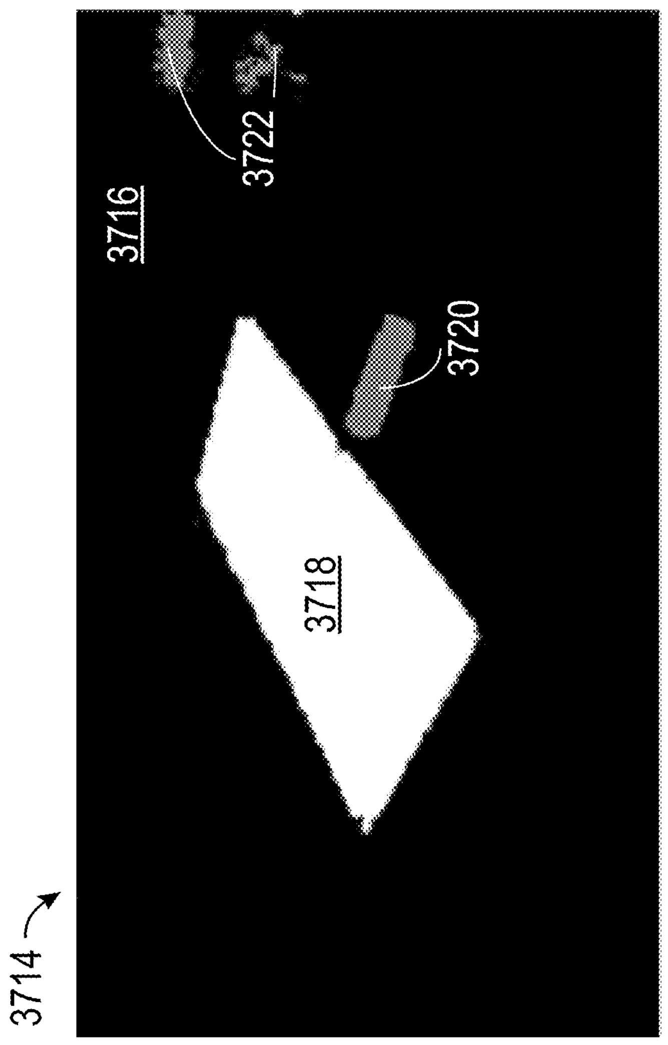
FIG. 37C shows an example prediction by the trained model, according to some embodiments.

Some embodiments perform solar panel segmentation by capturing images of solar panels and torque tubes under varying lighting conditions. FIG. 37A shows an example of a captured image 3700 that includes a solar panel 3702 and a torque tube 3704, according to some embodiments. Some embodiments annotate the captured image of solar panel. FIG. 37B shows an example of an annotated image 3706 (sometimes called an annotated ground truth mask) for the captured image 3700, according to some embodiments. The annotated image includes a black background 3708, contours of a torque tube 3712 shown in dark grey, and contours of a solar panel 3710 shown in light grey. Some embodiments create a dataset based on the annotated images, train an image segmentation model using the dataset, and use the trained model to detect solar panels and torque tubes in poor lighting conditions. FIG. 37C shows an example prediction 3714 by the trained model, according to some embodiments. The trained model predicts the background 3708, the solar panel 3710 and the torque tube 3712, and objects 3716 in the background (not shown in FIGS. 37A and 37B).

Some embodiments continuously collect images (and build datasets) and use the images for improving accuracy of the models. Some embodiments use human annotations to increase accuracy of the models. Some embodiments allow users to tune parameters of the segmentation model.

Figure 38A:
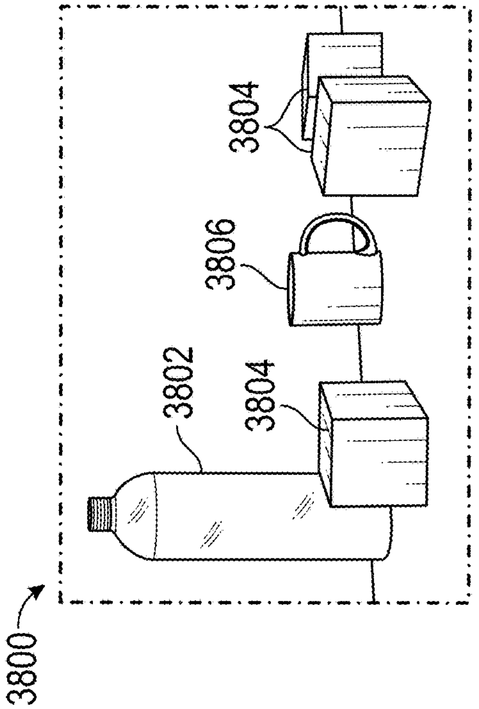
FIG. 38A shows an example of image classification.
Figure 38B:
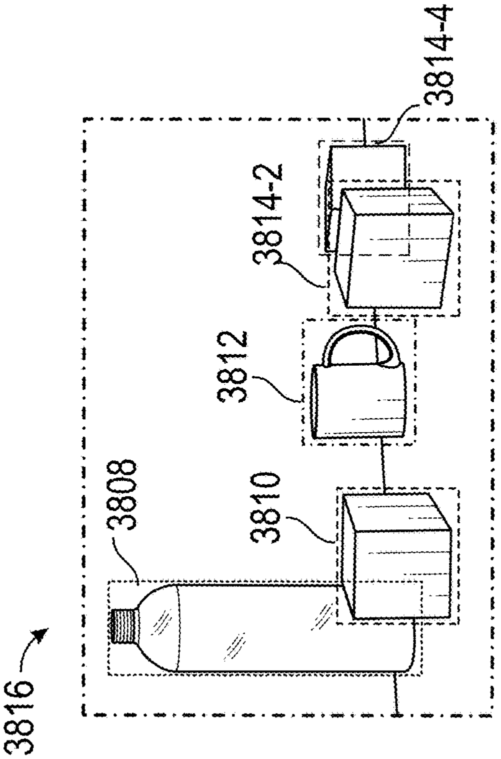
FIG. 38B shows an example of object localization for the image shown in FIG. 38A.
Figure 38C:
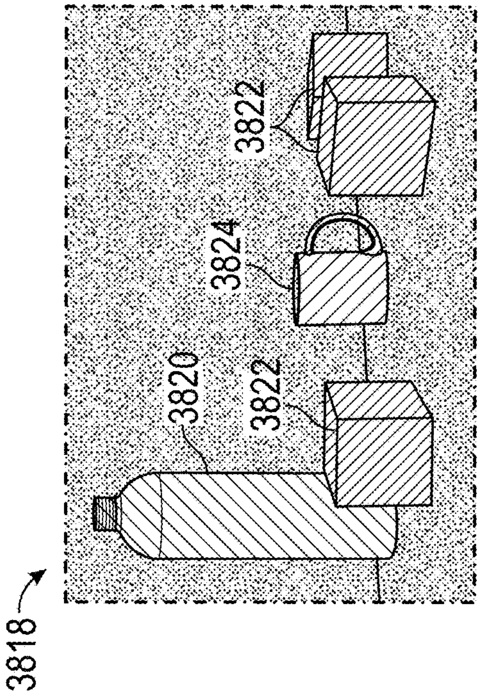
FIG. 38C shows an example of semantic segmentation, according to some embodiments.
Figure 38D:
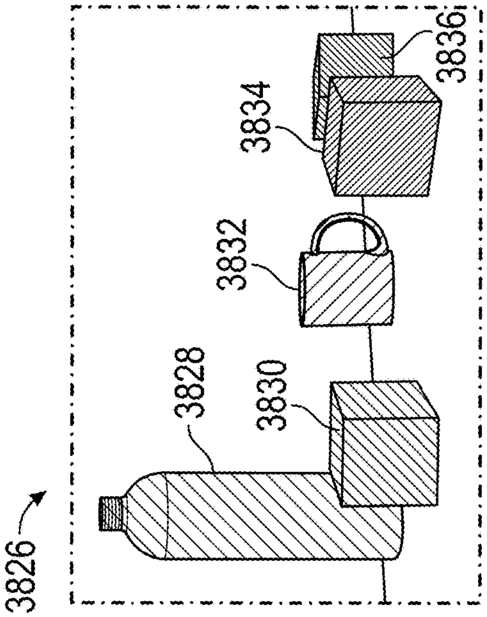
FIG. 38D shows an example of instance segmentation, according to some embodiments.
Figure 39:
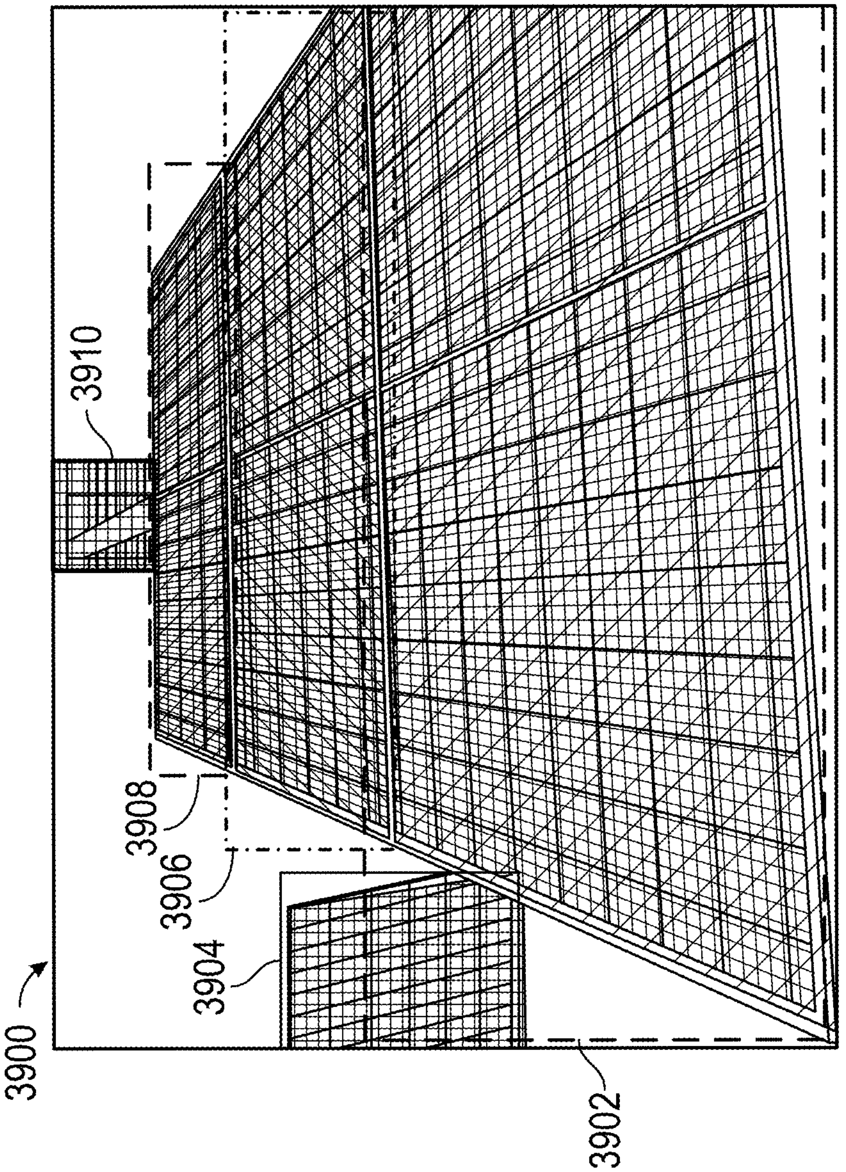
FIG. 39 shows an example of instance segmentation for solar panels, according to some embodiments.

Some embodiments include separate models for semantic segmentation and instance segmentation. FIG. 38A shows an example of image classification. In this example, the image classification detects a presence of a bottle 3802, a cub 2806 and cubes 3804. FIG. 38B shows an example of object localization 3816 for the image shown in FIG. 38A. In this example, a rectangle 3808 localizes the bottle 3802, a rectangle 3810 localizes a first cube, a rectangle 3812 localizes the cup 3806, and rectangles 3814-2 and 3814-4 localize the cubes 3804. FIG. 38C shows an example of semantic segmentation 3818, according to some embodiments. Semantic segmentation helps identify a label 3820 for the bottle 3802, a label 3822 for the cubes 3804, and a label 3824 for the cup 3806. FIG. 38D shows an example of instance segmentation 3826, according to some embodiments. Instance segmentation is able to distinguish between the instances of the cubes 3804, determining labels 3830, 3834, and 3836 for the cubes 3804, apart from identifying labels 3828 and 3832, for the bottle 3802 and 3806, respectively. Instance segmentation can distinguish between multiple solar panel instances in a single image. Instance segmentation generates masks for each class instance in a camera frame, enables individual panel identification and localization, utilizes the same data collected for semantic segmentation, and supports lighting invariance. FIG. 39 shows an example of instance segmentation 3900 for solar panels, according to some embodiments. In this example, panel instances 3902, 3904, 3906, 3908, and 3910 are identified. The example shows instances of the panels (e.g., the instances 3902 and 3904) that have different orientations.

Figure 40:
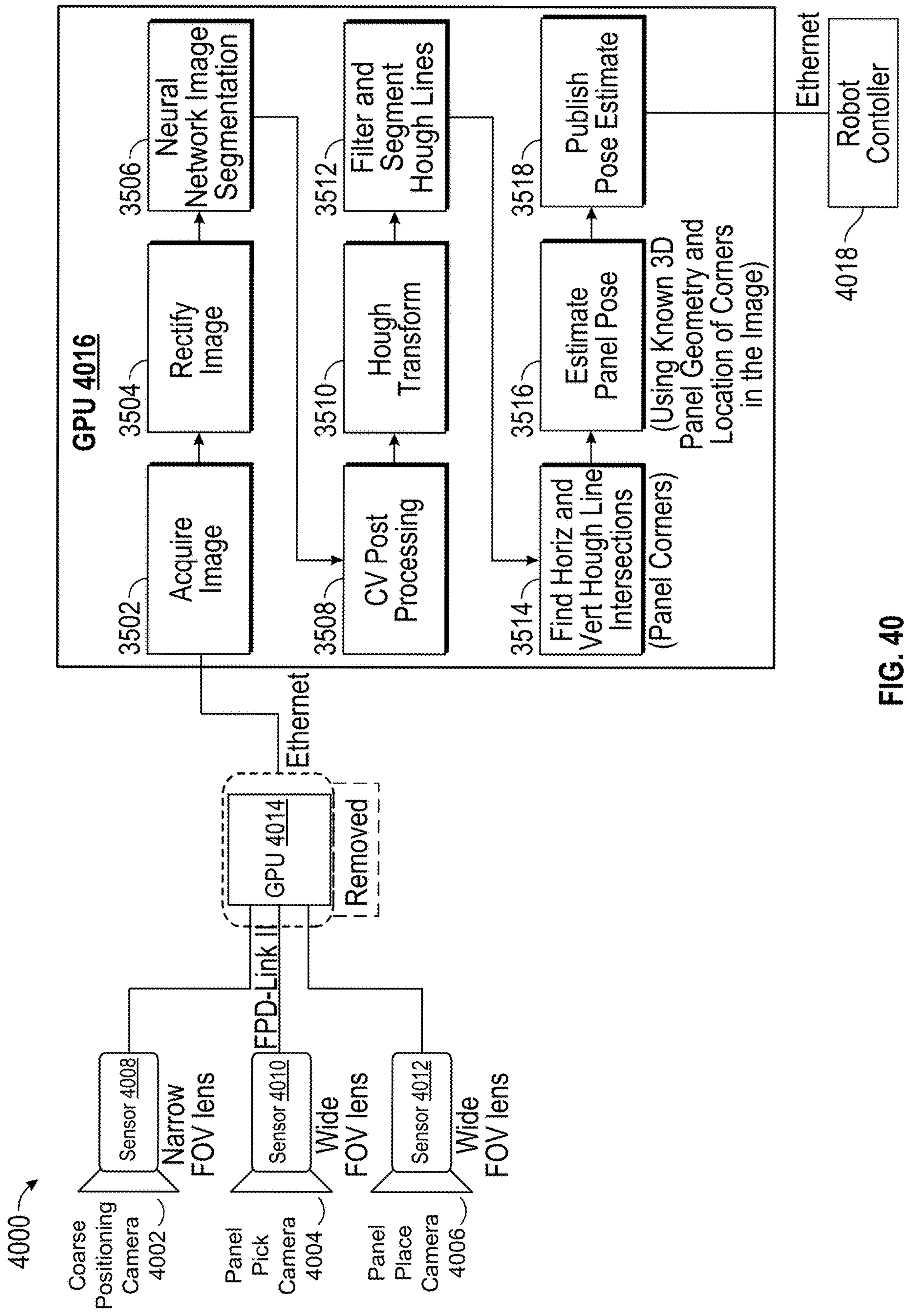
FIG. 40 shows an example image processing system, according to some embodiments.

FIG. 40 shows an example image processing system 4000, according to some embodiments. The system 4000 includes a plurality of cameras including a camera 4002 for coarse positioning, a camera 4004 for capturing images when panels are picked, and a camera 4006 for capturing images when panels are placed. The camera 4002 includes a narrow field of view lens, and the cameras 4004 and 4006 each include a wide field of view lens. The camera 4002 may be used to identify a trailer location and initial robot positions. In some embodiments, the cameras 4004 and 4006 may be the same camera. In some embodiments, the camera 4002 may also be used for locating clamps and center structures, during solar panel installation. The cameras 4002, 4004, and 4006 are coupled to respective image sensors 4008, 4010, and 4012 (e.g., AR0820 sensor). In some embodiments, the image sensors are optimized for both low light and/or high dynamic range performance. In some embodiments, the system 4000 includes a high-speed digital video interface (e.g., FPD-link) and Ethernet for connecting the cameras to one or more GPUs (e.g., a GPU 4014 that is suitable for edge AI processing, such as Nvidia XT, a GPU that is suitable for image processing applications, such as Nvidia AGX Xavier™). The GPU 4016 implements the example image processing pipeline 3500 described above, and is connected to a robot controller 4018 using Ethernet. The GPU 4014 may be removed in some systems, and the output from the sensors may be directly connected to the GPU 4016, according to some embodiments.

Figure 41B:
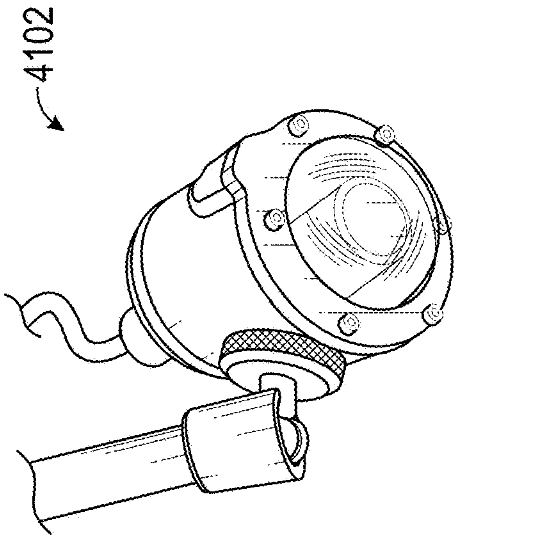
FIGS. 41A and 41B shows a trailer system with a coarse camera, according to some embodiments.
Figure 41A:
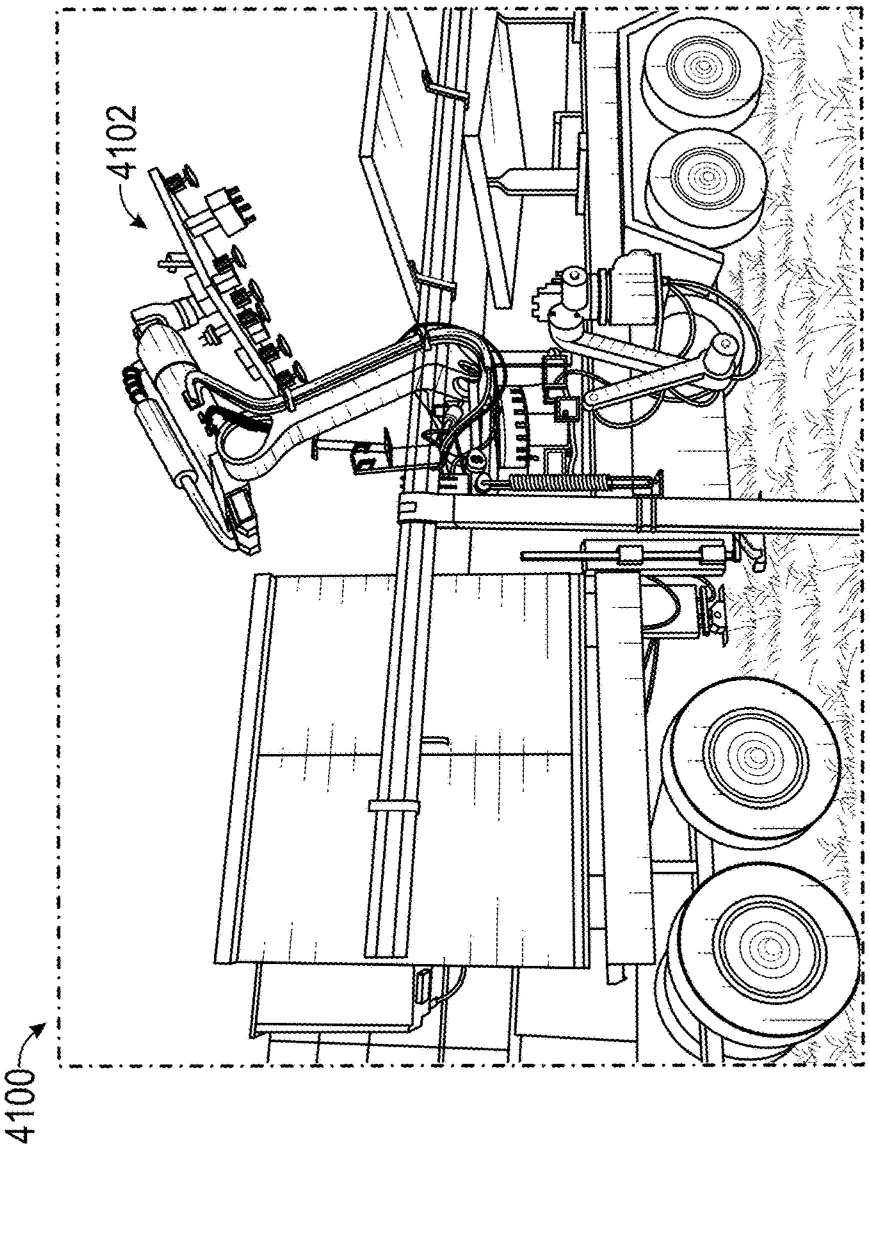

Some embodiments continue to capture training images while installing solar panels. FIG. 41A shows a trailer system 4100 with a coarse camera 4102 (detail shown in FIG. 41B) that may be used for capturing training images, according to some embodiments.

Figure 42A:
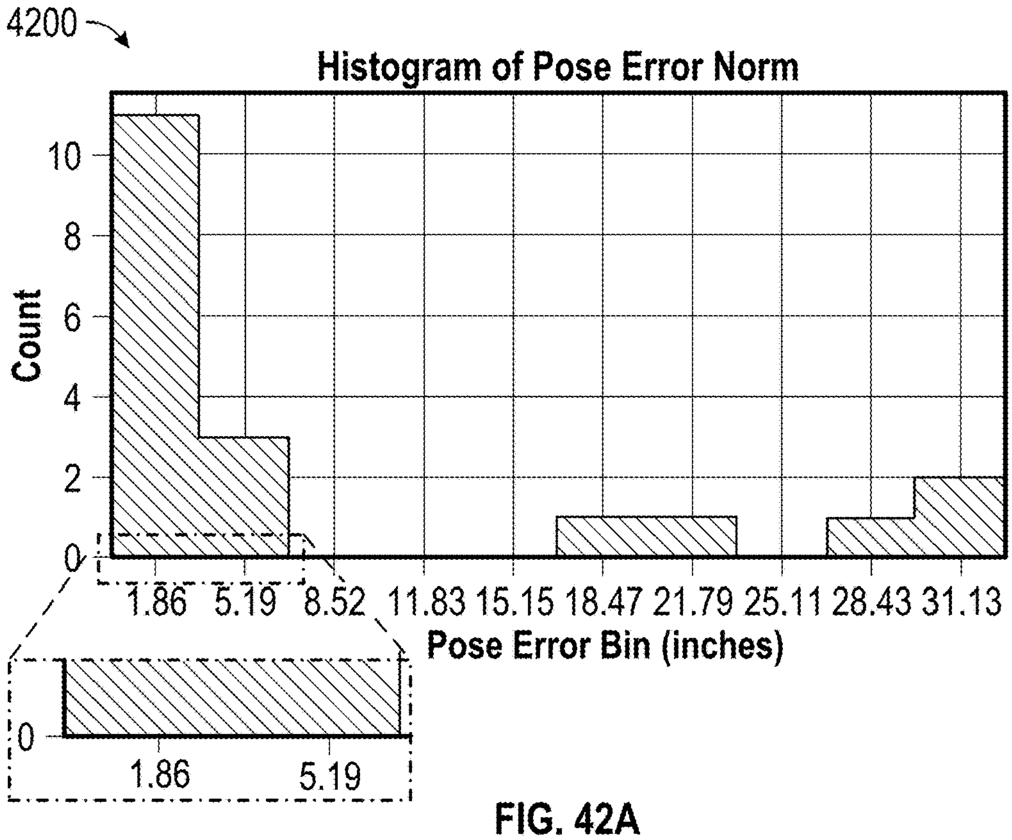
FIGS. 42A and 42B show histograms of pose error norms for the neural network with and without coarse position, according to some implementations.
Figure 42B:
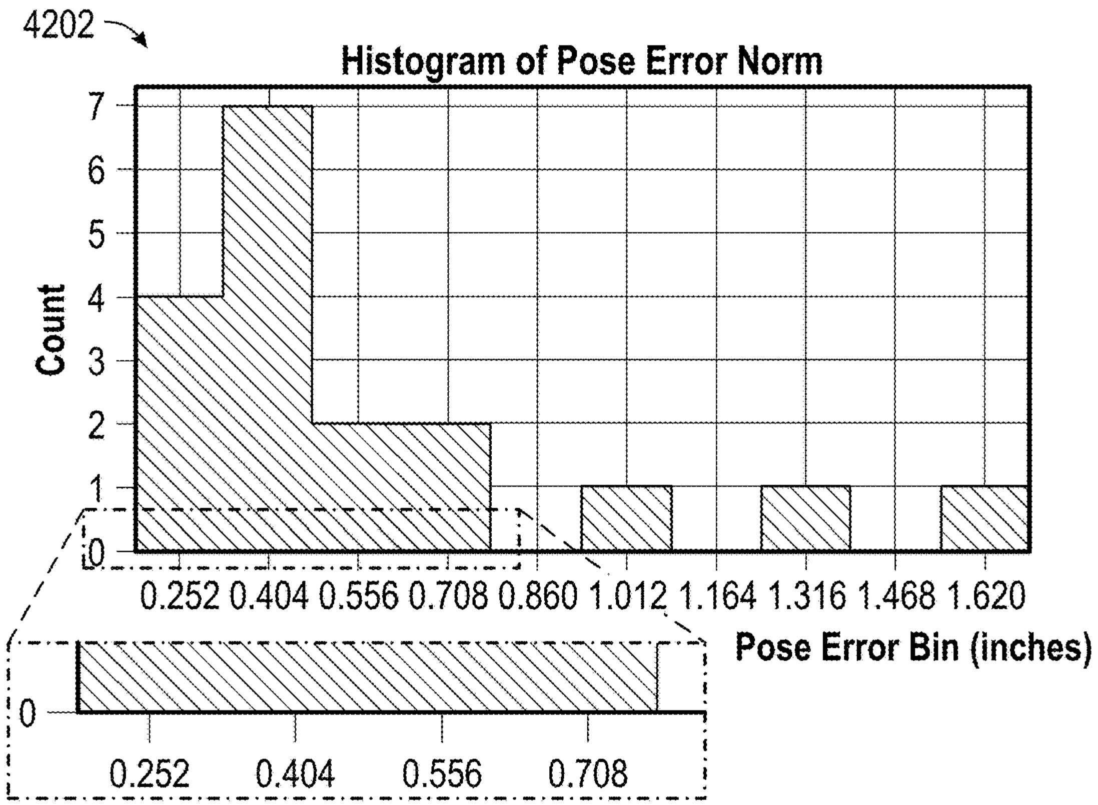

FIGS. 42A and 42B show histograms 4200 and 4202 of pose error norms for the neural network when coarse position is used and when coarse position is not used, respectively, according to some implementations. As shown, with coarse position, neural network error (difference between real position of the corners of a solar panel and estimates from the neural network) is substantially reduced (from close to 5 inches down to 0.7 inches or so, in some instances).

Figure 43B:
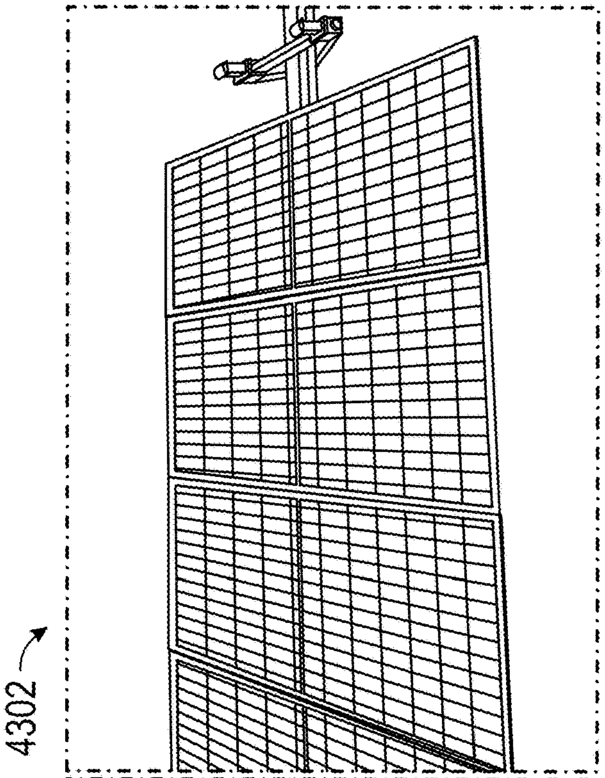
FIGS. 43A and 43B show examples for coarse positions of solar panels using a B Mask R-CNN model, according to some embodiments.
Figure 43A:
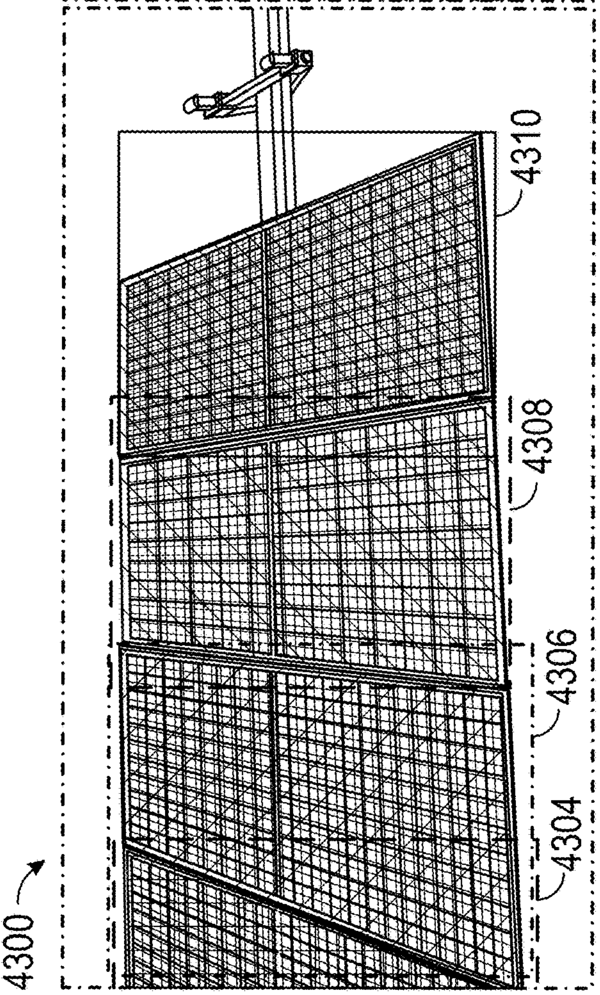

FIGS. 43A and 43B show examples 4300 and 4302 for coarse positions (e.g., positions 4304, 4036, 4308, and 4310) of solar panels using a B Mask R-CNN model, according to some embodiments. Mask R-CNN is a Convolutional Neural Network (CNN) used for image segmentation and instance segmentation. This deep neural network detects objects in an image and generates a high-quality segmentation mask for each instance. Mask R-CNN is based on a region-based Convolutional Neural Network. Image Segmentation is the process of partitioning a digital image into multiple segments or sets of pixels corresponding to image objects. This segmentation is used to locate objects and boundaries (lines, curves, etc.). Mask R-CNN can be used for semantic segmentation and instance segmentation. Semantic segmentation classifies each pixel into a fixed set of categories without differentiating object instances. In other words, semantic segmentation deals with the identification/classification of similar objects as a single class from the pixel level. All objects are classified as a single entity (solar panel). Semantic segmentation is sometimes called background segmentation because it separates the subjects of the image (e.g., solar panels, wires) from the background. On the other hand, instance segmentation (sometimes called instance recognition) deals with the correct detection of all objects in an image while also precisely segmenting each instance. In that sense, instance segmentation combines object detection, object localization, and object classification, and helps distinguish instances of each object in an image. In addition to having two outputs for each candidate object including a class label and a bounding-box offset, in Mask R-CNN, a third branch outputs an object mask. This mask output helps with extraction of a finer spatial layout of an object. Apart from being simpler to train, performant and efficient, when compared to other models, Mask R-CNN is particularly suited for solar panel identification, because of the neural network's ability to perform both semantic segmentation and instance segmentation. Moreover, the mask branch adds only a small computational overhead, enabling fast solar panel detection and rapid experimentation. Mask R-CNN can be used for image segmentation, identifying objects in the image and creating a mask within the boundaries of the object.

Figure 44:
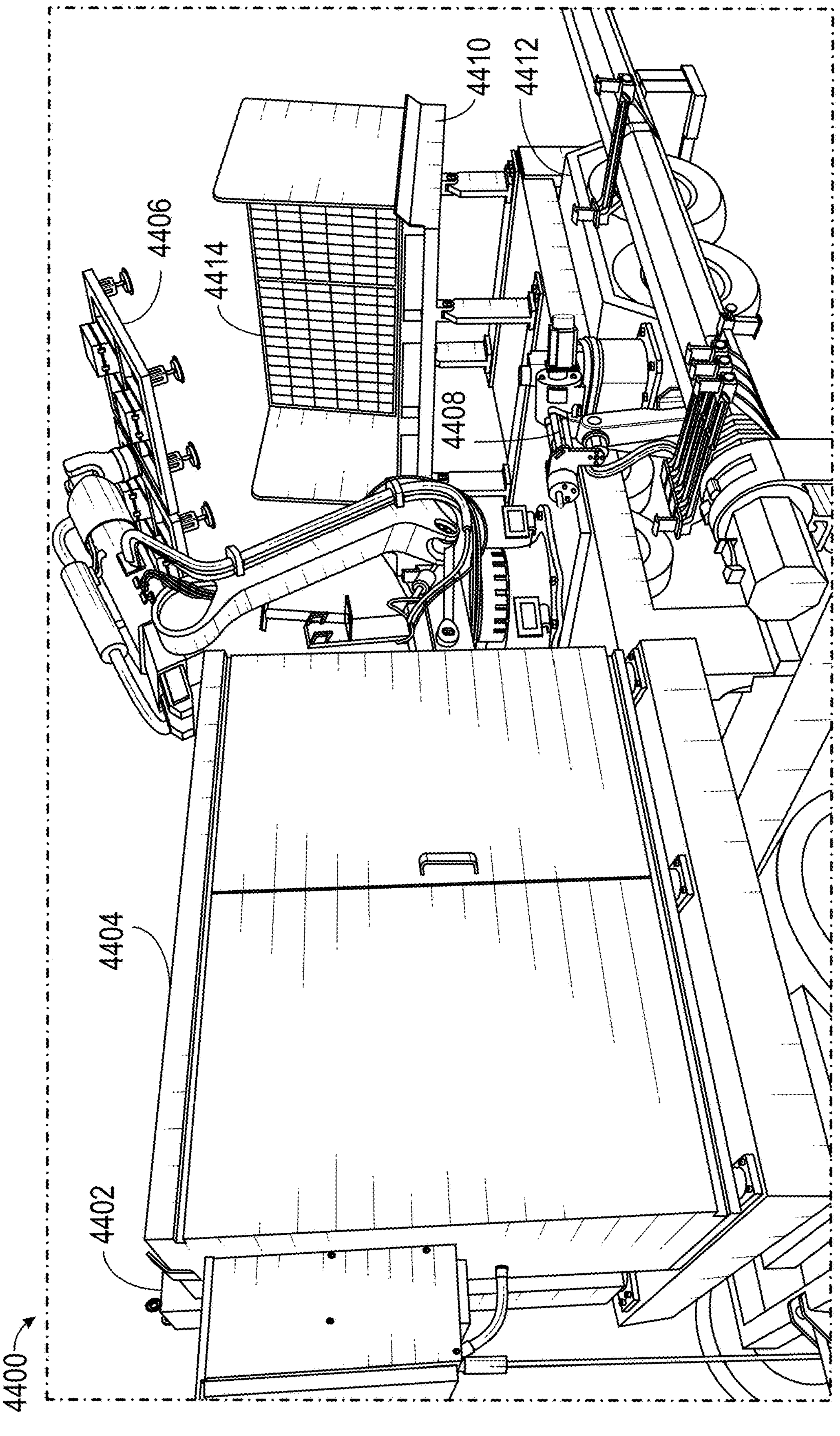
FIG. 44 shows a system 4400 for solar panel installation, according to some embodiments.

FIG. 44 shows a system 4400 for solar panel installation, according to some embodiments. The system 4400 includes a main enclosure 4404, a battery enclosure 4402, an upper robot End-of-Arm Tooling (EOAT) 4406, a lower robot EOAT 4408, a cradle 4410 for holding solar panels 4414, on a trailer 4412, according to some embodiments.

Figure 45B:
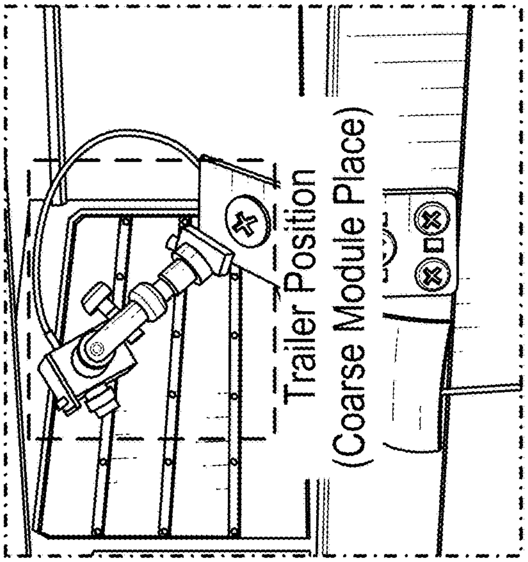
FIG. 45B shows an enlarged view of the vision system, according to some embodiments.
Figure 45A:
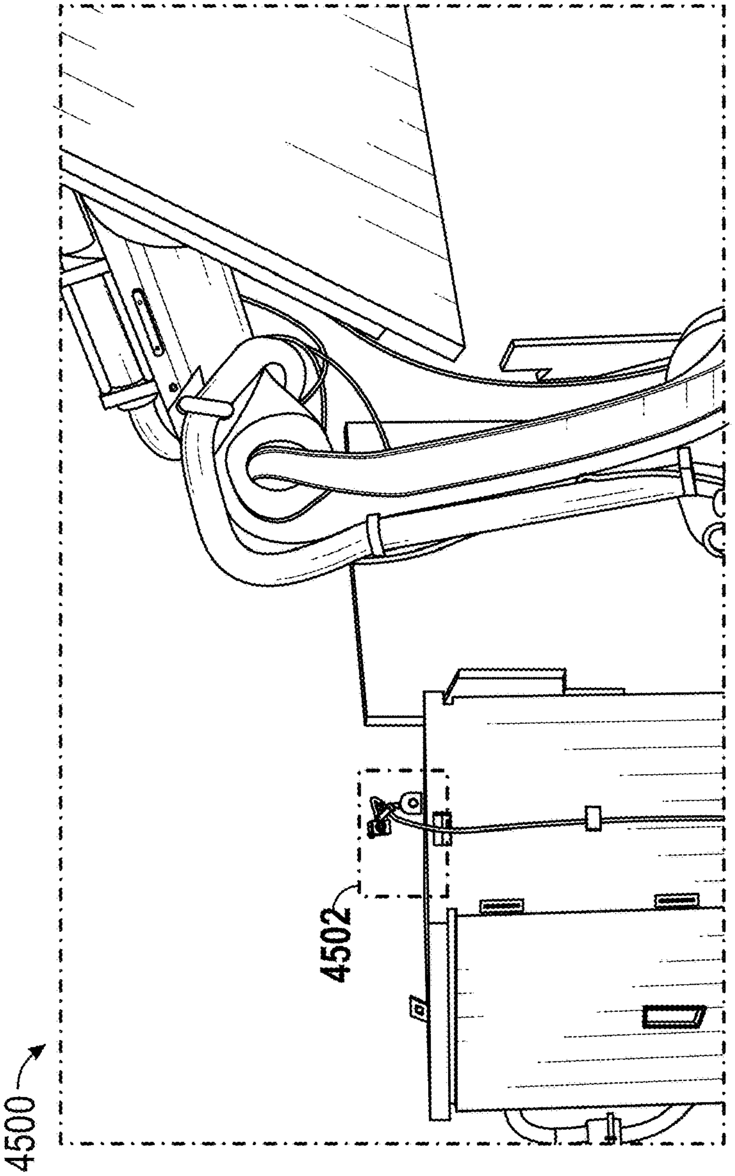
FIG. 45A shows a vision system for tracking trailer position.

FIG. 45A shows a vision system 4502 mounted on the trailer and used to estimate the pose of the structure 4500, and FIG. 45B shows an enlarged view of the vision system 4502, according to some embodiments. Various embodiments may have the vision system mounted on different parts of the ground vehicle, on the robotic arm, or on the end of arm tooling.

Figure 46B:
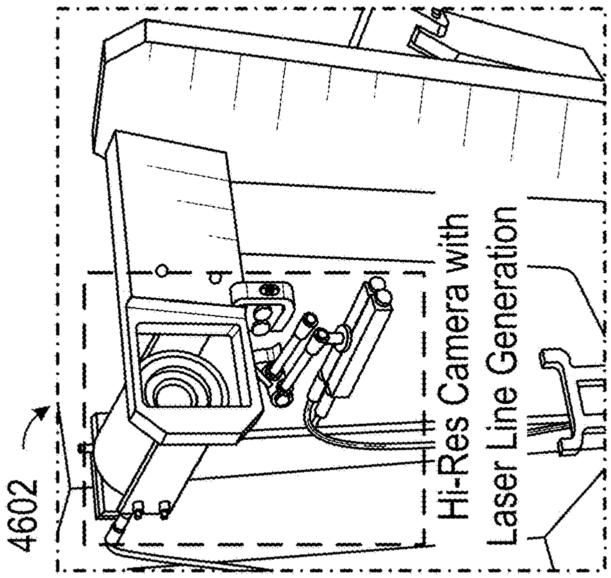
FIG. 46B shows an enlarged view of the vision system, according to some embodiments.
Figure 46A:
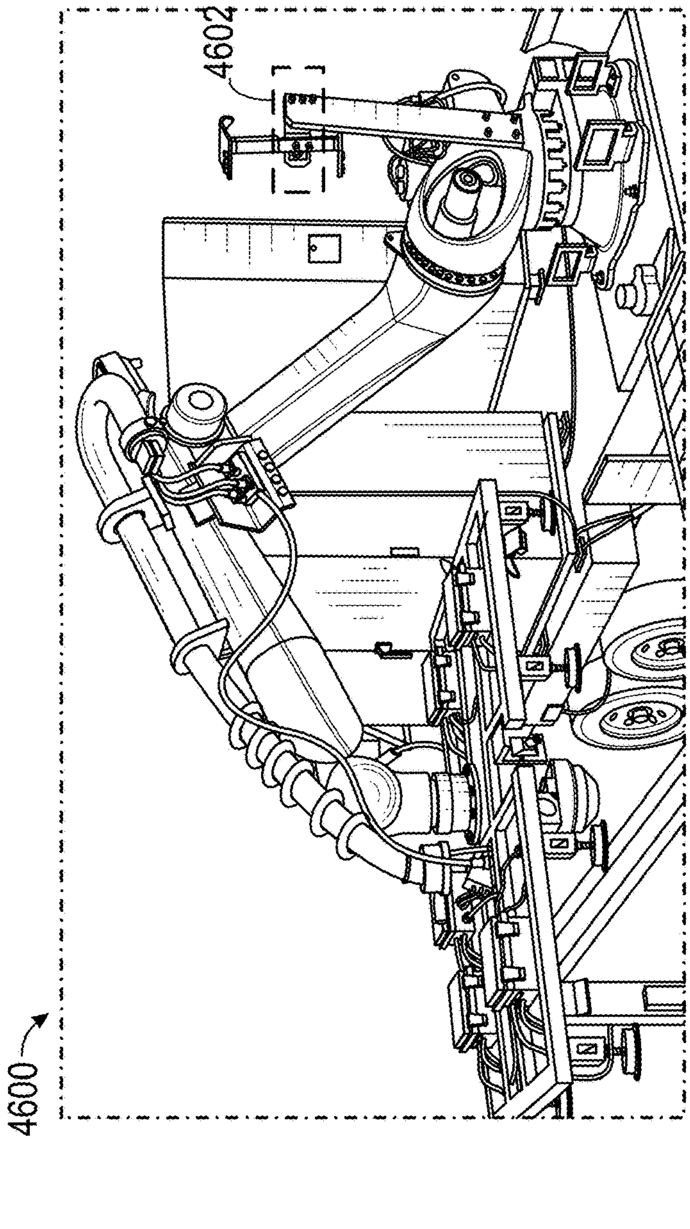
FIG. 46A shows a vision system for module pick.

FIG. 46A shows a vision system 4602 for module pick 4600, and FIG. 46B shows an enlarged view of the vision system 4602, which includes a high-resolution camera with laser line generation, according to some embodiments.

Figure 47B:
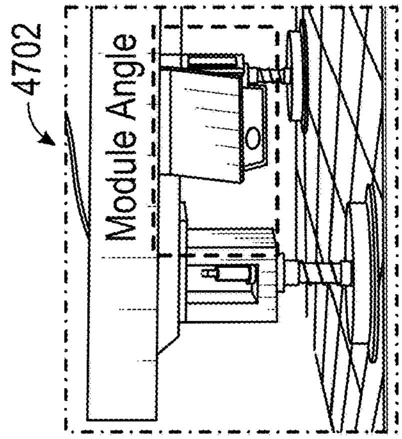
FIGS. 47A, 47B, and 47C show a system 4700 for distance measurement at module angle, according to some embodiments.
Figure 47C:
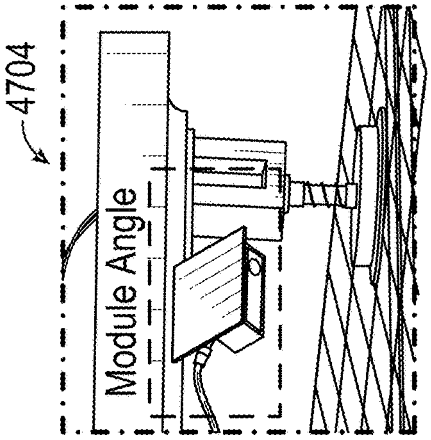
Figure 47A:
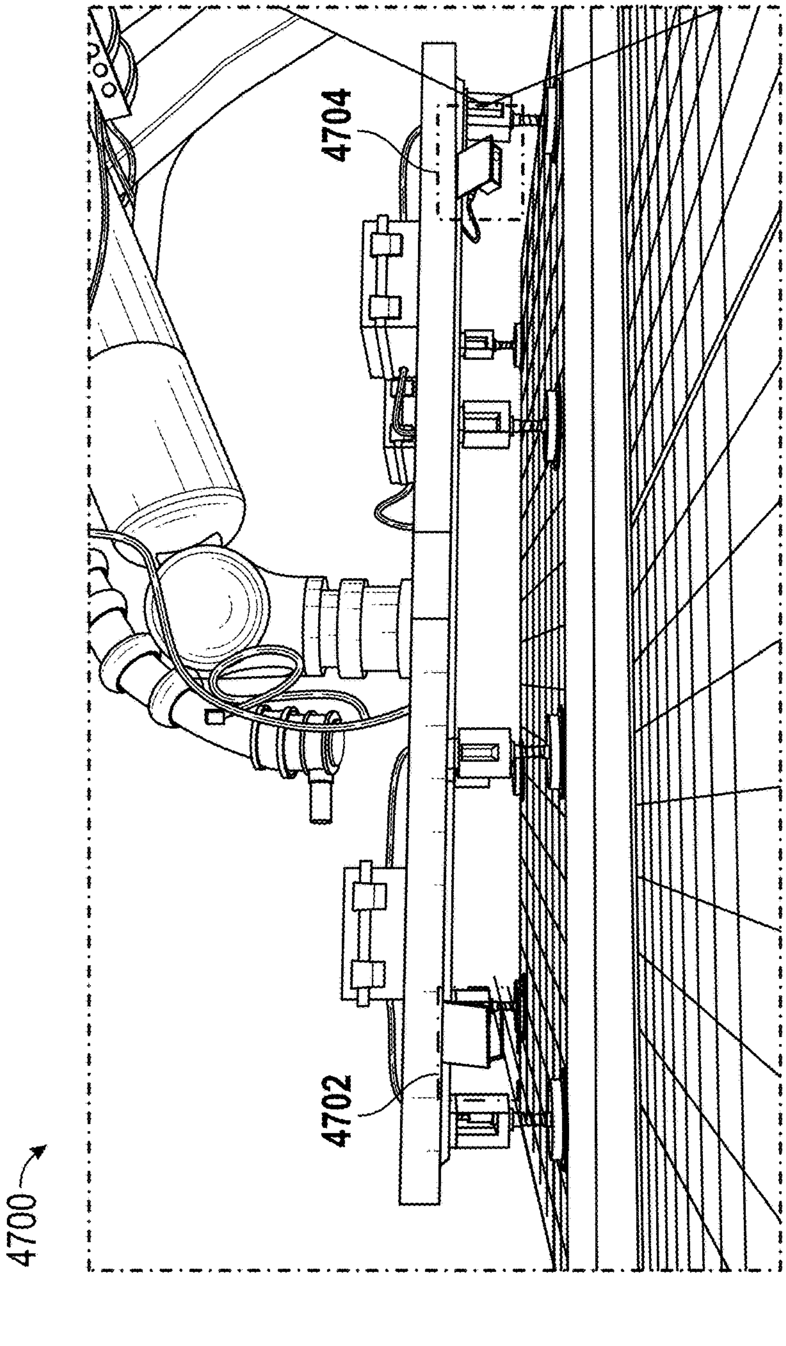

FIG. 47A shows a system 4700 for distance measurement at module angle (i.e., when facing a module) between position 4702 (an enlarged view of which is shown in FIG. 47B) and position 4704 (an enlarged view of which is shown in FIG. 47C), according to some embodiments.

Figure 48A:
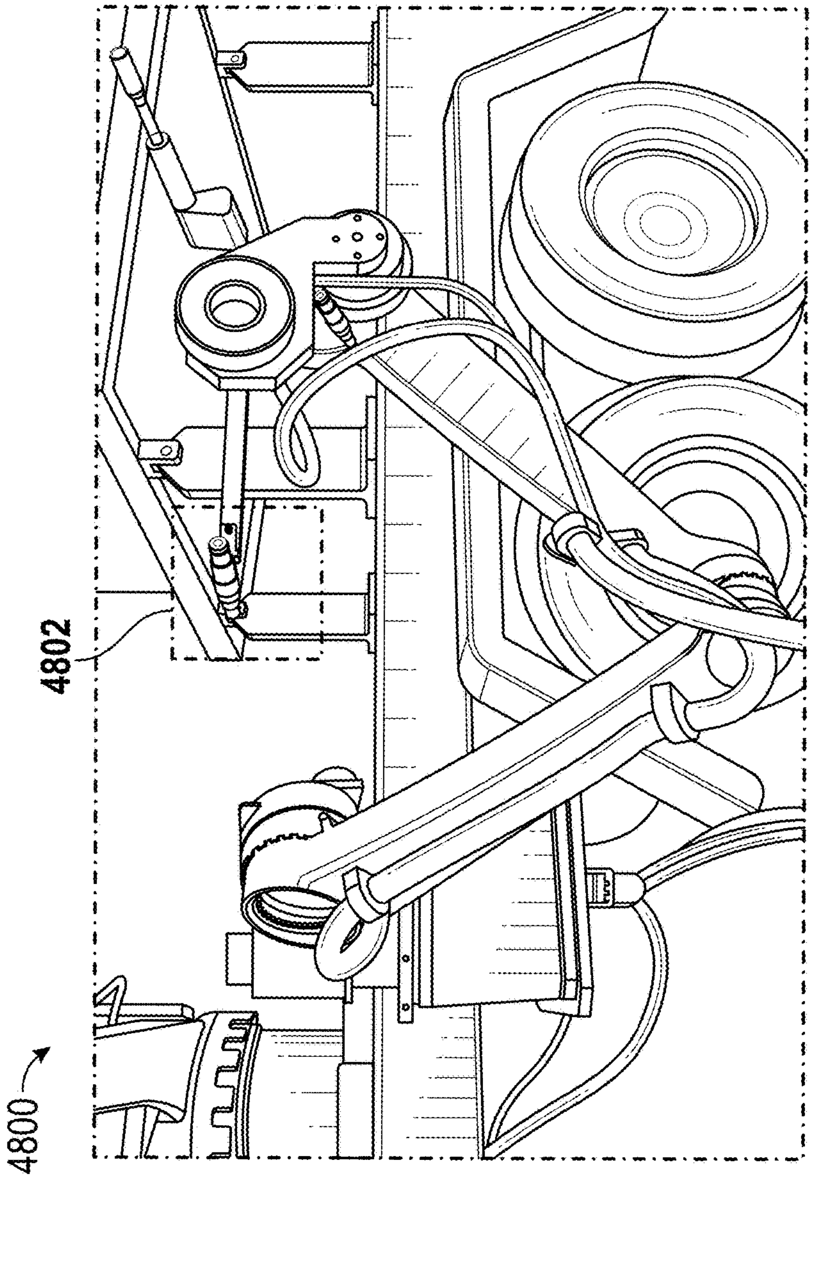
FIG. 48A shows a system for laser line generation for detecting tube and clamp position, according to some embodiments.
Figure 48B:
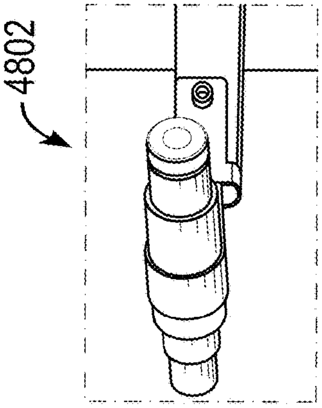
FIG. 48B shows an enlarged view of the laser line generation system shown in FIG. 48A.
Figure 48C:
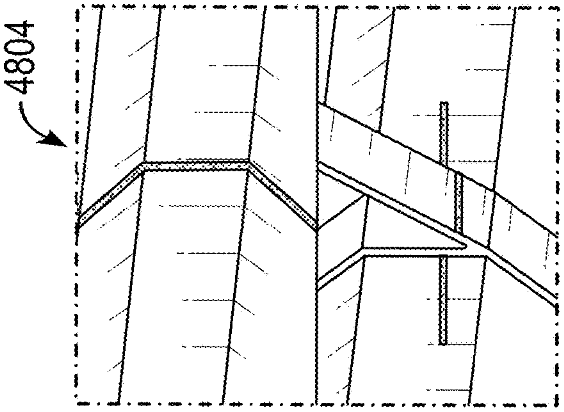
FIG. 48C shows a view of laser line generation (horizontal line detects a clamp, and a vertical line detects a tube), according to some embodiments.

FIG. 48A shows a system 4800 for laser line generation for detecting tube and clamp position, according to some embodiments. FIG. 48B shows an enlarged view of the laser line generation system 4802, and FIG. 48C shows a view 4804 of laser line generation (horizontal line detects a clamp, and a vertical line detects a tube), according to some embodiments.

Figure 49A:
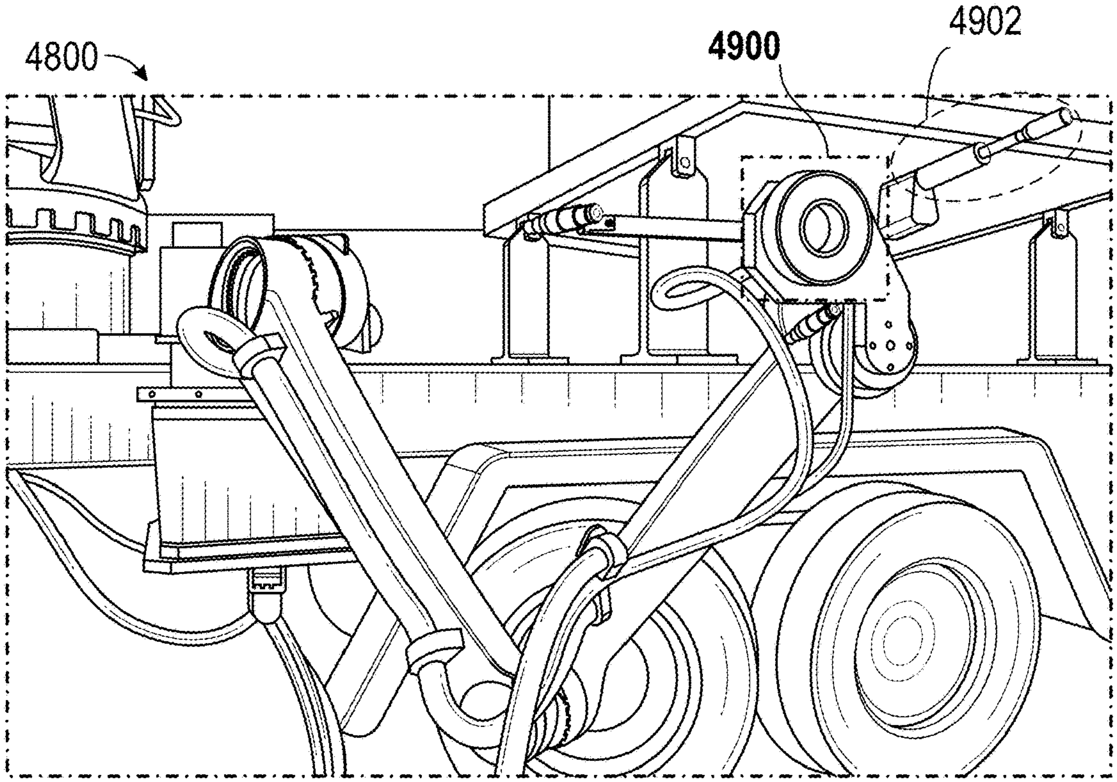
FIG. 49A shows a vision system 4900 for estimating tube and clamp position.
Figure 49B:
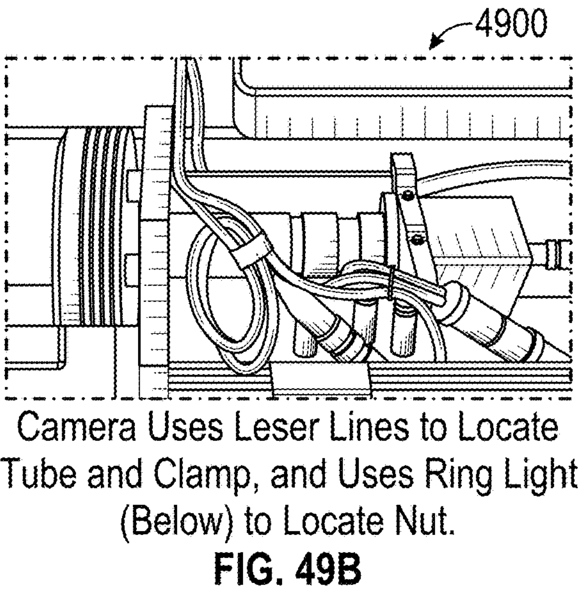
FIG. 49B shows an enlarged view of the vision system.
Figure 49C:
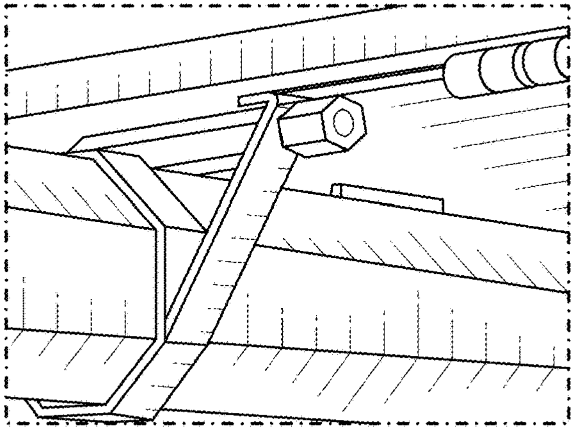
FIG. 49C shows the nut on the clamp that, when tightened, compresses the clamp to keep the panels in place, according to some embodiments.

FIG. 49A shows a vision system 4900 for estimating tube and clamp position and locating the nut on the clamp, according to some embodiments. FIG. 49A also shows a socket wrench 4902 used to tighten the nut. FIG. 49B shows an enlarged view of the vision system. As shown in FIG. 49B, the camera uses the laser lines described above to locate tube and clamp, and uses a flash ring light to locate the nut on the clamp. The lasers provide an accurate estimation of tube and clamp position. The flash ring light is used to locate the nut on the clamp shown in FIG. 49C. This nut, when tightened, compresses the clamp to keep the panels in place.

Example Solar Panel Installation Using Artificial Intelligence

Figure 50A:
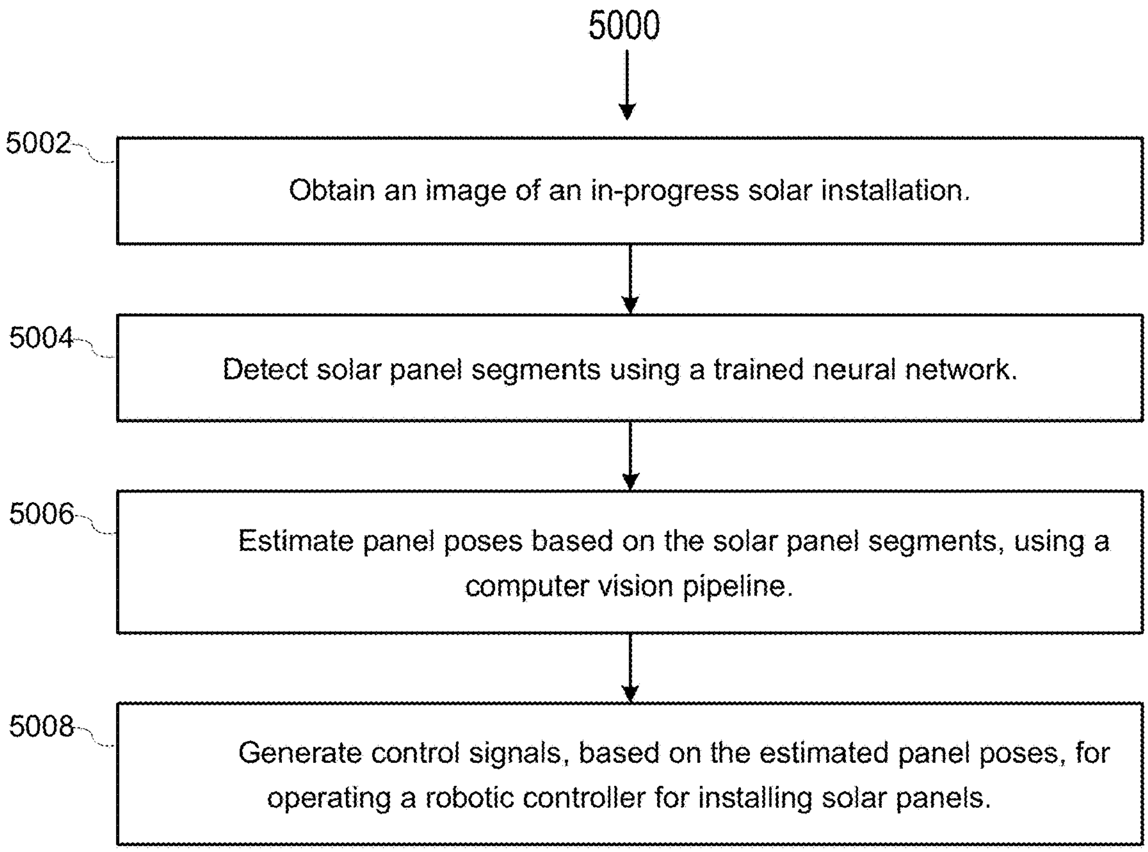
FIG. 50A shows a flowchart of a method for autonomous solar installation, according to some embodiments.

FIG. 50A shows a flowchart of a method 5000 for autonomous solar installation, according to some embodiments. The method includes obtaining (5002) an image of an in-progress solar installation. The image includes an image of one or more solar panels and one or more torque tubes. In some embodiments, obtaining the image includes using one or more filters for avoiding direct sun glare for detecting End-of-Arm Tooling (EOAT). In some embodiments, obtaining the image includes using a high-resolution camera with laser line generation for identifying the one or more torque tubes and/or a clamp position. In some embodiments, the image includes an image of a clamp and/or a center structure for the in-progress solar installation. In some embodiments, the image includes an image of a clamp and/or a center structure for the in-progress solar installation. In some embodiments, a plurality of images is acquired using wide angle fish-eye lens to create a composite HDR (High Dynamic Range) image inside a camera hardware. The images are sent through a Robot Operating System (ROS) which is a high-level software framework for integration of robots and servos, using OpenCV (an image processing framework) modules to rectify the images (e.g., change from fish-eye distortion to flat image). Then a region and a bit depth are selected and used to collapse the HDR image into a standard 8-bit image, thereby effectively cropping the region and bit depth to prepare it as input for a trained neural network. At point of acquisition, a robot pose may be stored (using ROS) to create a transform camera result relative to a trailer (a trailer system used for solar panel installation). This may include a robot location and a camera location to identify where the image is in 3D space.

The method also includes detecting (5004) solar panel segments by inputting the image to a trained neural network that is trained to detect solar panels. Neural networks may be implemented using software and/or hardware (sometimes called neural network hardware) using conventional CPUs, GPUs, ASICs, and/or FPGAs. In some embodiments, the trained neural network comprises (i) a model for semantic segmentation for identifying a solar panel segment, and (ii) a model for instance segmentation for identifying a plurality of solar panel. In some embodiments, the trained neural network uses a Mask R-CNN framework for segmentation. The trained neural networks detect solar panel segments based on features extracted from an image of an in-progress solar installation. In some embodiments, the image obtained is input to the neural network through ROS (e.g., the input image goes from the OpenCV module to a neural network module). Example techniques for training the neural network are described below in reference to FIG. 55B, according to some embodiment. In some embodiments, the neural network performs image segmentation to identify a panel (or panels) without identifying location(s) of the panel(s). In some embodiments, there is one model that does both functions (semantic segmentation and instance segmentation). Some embodiments use two instances of the same model to optimize throughput. In such cases, the camera takes two images, and one image goes through each instance. Running two models allows processing twice as many images in the same time.

The method also includes estimating (5006) panel poses for the one or more solar panels, based on the solar panel segments, using a computer vision pipeline. In some embodiments, the computer vision pipeline includes one or more computer vision algorithms for post-processing, Hough transform, filtering and segmentation of Hough lines, finding horizontal and/or vertical Hough line intersections, and panel pose estimation using predetermined 3D panel geometry and corner locations. In some embodiments, the computer vision pipeline locates the clamps and/or the center structures to estimate the panel poses. In some embodiments, the computer vision pipeline locates the one or more torque tubes and/or the clamp position to estimate the panel poses. In some embodiments, the computer vision pipeline locates the nut. After locating the nut, the socket wrench mounted on a smaller robotic arm may engage with the nut and tighten it to secure the panel in place. Before doing this step, the clamps may be loose and panels may fall off due to wind.

In some embodiments, estimating the panel poses is performed using conventional machine vision hardware for locating where panel(s) are in a 3-D space. In some embodiments, this is a rough identification of round edges, and is not intended to be very precise. Hough transform may be used subsequently to determine precise locations of edges, which is followed by extrapolation of edge lines of panels, determination of where panels cross, and identification of a panel corner. The panel corners are published to identify where the panel is with respect to the robot. For example, based on a panel geometry in 3-D, the panel's pose is calculated based on the location of corners of the panel in the image.

In some embodiments, for estimating the panel poses, the computer vision pipeline uses a PnP (Perspective-n-Point) solver with camera intrinsic parameters (it is aware of its own camera distortion and parallax). Then the extrinsic parameters capture the camera's position relative to the robot using the robotic arm and EOAT pose at the moment of image capture. The robot pose may be captured continuously with a time stamp. That time stamp may then be used to match the robot pose to the camera acquisition time stamp. In some embodiments, the computer vision pipeline uses a known pose of the robotic arm and end of arm tool (where the camera sits) at the time of image capture to calculate a position of one or more corners of a panel.

The method also includes generating (5008) control signals, based on the estimated panel poses, for operating a robotic controller for installing the one or more solar panels. In some embodiments, after the panel is found, the location is projected along the tube to seek clamp pixels to identify the clamp location (e.g., how far away the clamp is, how close it is for the clamp puller). Some embodiments use clamp positions to verify that clamps are within an allowable window required by the clamp puller on EOAT. Some embodiments use the center structures to determine sequence on whether to place one or two panels to avoid collisions with the fan gear. Some embodiments use panel position to make sure that the trailer is in a valid position relative to the tube so that robot is within reach of the work needed to perform. Some embodiments use the pose from the leading panel to then guide the lower robot in its fine tube acquisition, which drives the positions of the upper and lower robot for the panel place and the nut drive. In some embodiments, the fine tube acquisition described above uses a horizontal and vertical laser to create a profilometer system that finds the tube and the clamp positions. This refines the working pose from the coarse tube from 10-20 mm and reduces it to less than plus or minus 5 mm. At the first panel, the coarse tube error is within 5 mm, but as this is projected out, the errors grow and the fine tube is used to constrain that to under plus or minus 5 mm.

Figure 50B:
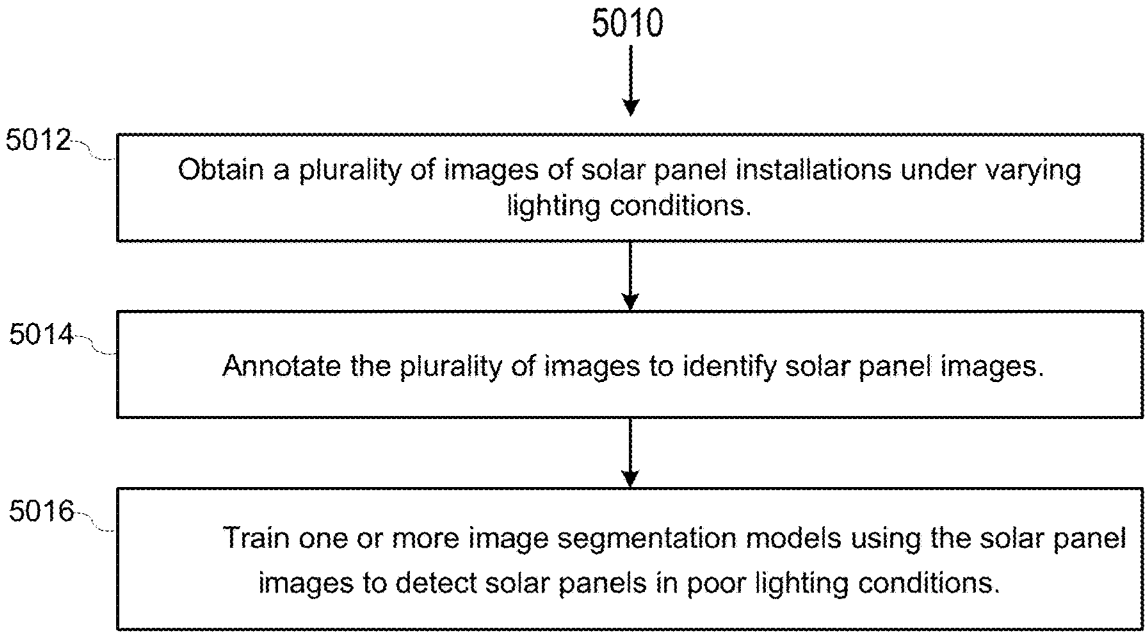
FIG. 50B shows a flowchart of a method of training a neural network for autonomous solar installation, according to some embodiments.

FIG. 50B shows a flowchart of a method 5010 of training a neural network for autonomous solar installation, according to some embodiments. The method includes obtaining (5012) a plurality of images of solar panel installations under varying lighting conditions, annotating (5014) the plurality of images to identify solar panel images (human annotated images may be used instead of or in addition to automatically annotated images), and training (5016) one or more image segmentation models using the solar panel images to detect solar panels in poor lighting conditions. In some embodiments, the neural network is trained manually using various images, such as different backgrounds (e.g., grass, dirt), different quantities of panels, several images of clamps, panels, under various weather conditions (e.g., sunny conditions, rainy conditions). Within the images, lines are drawn to indicate which pixels represent a panel, clamps, tubes, and center structures. These images and their masks are used to create a series of pseudo images (sometimes referred to as image augmentation) that the neural network then uses in the training process. The pseudo images are the input images with distortions to angles in order to be able to train several times using a same input image. For example, 300-1000 real (input) images may be used for training, and for each real image, 10-20 pseudo images may be created.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It will be apparent to those skilled in the art that various modifications and variations can be made in the system for installing a solar panel of the present invention without departing from the spirit or scope of the invention. Thus, it is intended that the present invention cover the modifications and variations of this invention provided they come within the scope of the appended claims and their equivalents. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for autonomous solar panel installation of a respective solar panel by iteratively generating a plurality of panel poses of one or more solar panels based on a plurality of different sets of sensor data obtained as approaching the one or more solar panels, the method comprising:

obtaining a first set of sensor data, of the plurality of different sets of sensor data, that is obtained at a first position during an installation process, wherein the first set of sensor data comprises at least one image of the one or more solar panels;

pre-processing the at least one image including one or more of compensating for camera intrinsics or distortions, rectifying the at least one image, or determining depth information;

detecting the one or more solar panels by inputting the at least one image into one or more networks that are configured to detect solar panels;

generating a first iteration of a panel pose of the one or more solar panels based on an output of the one or more networks;

obtaining a subsequent set of sensor data, of the plurality of different sets of sensor data, that is obtained during the installation process at another position different from the first position;

using the subsequent set of sensor data in order to generate a subsequent iteration of the panel pose of the one or more solar panels, wherein the subsequent iteration of the panel pose updates the panel pose of the one or more solar panels based on one or more visual patterns or fiducials on the one or more solar panels, thereby at least partly correcting the first iteration of the panel pose;

generating control signals, based on the subsequent iteration of the panel pose, for operating a robotic controller for performing the installation process of the respective solar panel; and operating, using the control signals, at least one robotic system in performing the installation process for the respective solar panel.

2. The method of claim 1, wherein the pre-processing comprises one or more of compensating for a camera distortion, rectifying the image, or determining depth information based on a single-baseline stereo camera, a multi-baseline stereo camera, a time-of-flight sensor, or a LiDAR sensor.

3. The method of claim 1, wherein generating the first iteration of the panel pose comprises one or more computer vision algorithms for processing the output of the one or more networks based on invariant structures in the at least one image in order to determine locations of panel keypoints.

4. The method of claim 3, wherein generating the first iteration of the panel pose further comprises solving for Perspective-n-Point based on panel dimensions and the panel keypoints.

5. The method of claim 1, wherein the visual patterns comprise a grid pattern on the one or more solar panels.

6. The method of claim 1, wherein the at least one robotic system is controlled using control signals based on both the first iteration of the panel pose and the subsequent iteration of the panel pose.

7. The method of claim 1, wherein at least the first iteration of the panel pose, the subsequent iteration of the panel pose and another iteration of the panel pose, after the subsequent iteration, for the one or more solar panels are generated in order to perform the installation process for the respective solar panel.

8. The method of claim 1, wherein the subsequent iteration of the panel pose is based on the first iteration of the panel pose.

9. The method of claim 1, wherein the first iteration of the panel pose and the subsequent iteration of the panel pose determine one or more keypoints of the one or more solar panels; and wherein the one or more keypoints comprise a center point of the one or more solar panels.

10. The method of claim 1, wherein the first set of sensor data and the subsequent set of sensor data are obtained from different sensors.

11. The method of claim 1, wherein the first iteration of the panel pose of the one or more solar panels and the subsequent iteration of the panel pose of the one or more solar panels are for controlling the at least one robotic system to install the respective solar panel relative to the one or more solar panels that are already installed.

12. The method of claim 1, wherein the first iteration of the panel pose of the one or more solar panels and the subsequent iteration of the panel pose of the one or more solar panels are for picking, by the at least one robotic system, of a solar panel to be picked.

13. The method of claim 12, wherein the first iteration of the panel pose of the one or more solar panels and the subsequent iteration of the panel pose of the one or more solar panels are for determining at least one pick point on the solar panel to be picked.

14. The method of claim 13, wherein the at least one pick point comprises a center point of the solar panel to be picked.

15. The method of claim 1, wherein the one or more visual patterns or fiducials comprises at least one corner of the one or more solar panels.

16. The method of claim 1, wherein the subsequent set of sensor data comprises sensor data indicative of installation structure on which to install the respective solar panel.

17. The method of claim 16, wherein the subsequent iteration of the panel pose is generated based on information regarding at least one of a torque tube or a clamp of the installation structure.

18. A system for installing a respective solar panel by iteratively generating a plurality of panel poses of one or more solar panels based on a plurality of different sets of sensor data obtained as approaching the one or more solar panels, the system comprising:

at least one sensor configured to generate a first set of sensor data, of the plurality of different sets of sensor data, that is obtained during an installation process at a first position and a subsequent set of sensor data, of the plurality of different sets of sensor data, that is obtained during the installation process at another position different from the first position, wherein the first set of sensor data comprises at least one image of the one or more solar panels;

one or more devices configured to:

pre-process the at least one image including one or more of compensating for camera intrinsics or distortions, rectifying the at least one image, or determining depth information;

detect the one or more solar panels based on the at least one image; and generate a first iteration of a panel pose of the one or more solar panels based the one or more solar panels detected; and generate, using the subsequent set of sensor data, a subsequent iteration of the panel pose of the one or more solar panels, wherein the subsequent iteration of the panel pose updates the panel pose of the one or more solar panels based on one or more visual patterns or fiducials on the one or more solar panels, thereby at least partly correcting for the first iteration of the panel pose; and generate control signals, based on the subsequent iteration of the panel pose, for operating a robotic controller for performing the installation process of the respective solar panel.

19. The system of claim 18, wherein one or more devices are configured to generate at least the first iteration of the panel pose, the subsequent iteration of the panel pose and another iteration of the panel pose, after the subsequent iteration, for the one or more solar panels in order to perform the installation process for the respective solar panel.

20. The system of claim 18, wherein the one or more devices are configured to control at least one robotic system using the first iteration of the panel pose of the one or more solar panels and the subsequent iteration of the panel pose of the one or more solar panels in order to install the respective solar panel relative to the one or more solar panels that are already installed.

21. The system of claim 18, wherein the one or more devices are configured to control at least one robotic system using the first iteration of the panel pose of the one or more solar panels and the subsequent iteration of the panel pose of the one or more solar panels to pick, by the at least one robotic system, a solar panel to be picked.

22. The system of claim 21, wherein the one or more devices are configured to use the first iteration of the panel pose of the one or more solar panels and the subsequent iteration of the panel pose of the one or more solar panels to determine at least one pick point on the solar panel to be picked.

23. The system of claim 18, wherein the one or more visual patterns or fiducials comprises at least one corner of the one or more solar panels.

24. The system of claim 18, wherein the subsequent set of sensor data comprises sensor data indicative of installation structure on which to install the respective solar panel.

25. The system of claim 24, wherein the subsequent iteration of the panel pose is generated based on information regarding at least one of a torque tube or a clamp of the installation structure.

26. A system for installing solar panels, the system comprising:

a camera system for obtaining one or more images during installation, wherein the one or more images comprises an image of one or more solar panels and an installation structure;

one or more devices for (i) pre-processing the one or more images including one or more of compensating for camera intrinsics or distortions, rectifying the one or more images, and determining depth information, estimating panel poses for the one or more solar panels, based on one or more solar panel segments; (ii) detecting the one or more solar panels based on the one or more images; and (iii) a first post-processing to compute a first panel pose based on an output of one or more neural networks; and a controller for generating control signals, based on the first panel pose, for operating a robotic controller for installing the one or more solar panels;

wherein the one or more devices for a second post-processing comprises one or more homography transforms to obtain a second panel pose for the one or more solar panels, based on the first panel pose, wherein the second post-processing at least partly compensates or corrects for inaccuracies in the first panel pose based on visual patterns or fiducials on a solar panel, and wherein the control signals for operating the robotic controller for installing the one or more solar panels is further based on the second panel pose.

* * * * *